United States Patent [19]
Fant et al.

[11] Patent Number: 5,355,496
[45] Date of Patent: Oct. 11, 1994

[54] METHOD AND SYSTEM FOR PROCESS EXPRESSION AND RESOLUTION INCLUDING A GENERALLY AND INHERENTLY CONCURRENT COMPUTER LANGUAGE

[75] Inventors: Karl M. Fant; Scott A. Brandt, both of Minneapolis, Minn.

[73] Assignee: Theseus Research, Inc., Minneapolis, Minn.

[21] Appl. No.: 837,641

[22] Filed: Feb. 14, 1992

[51] Int. Cl.$^5$ .............................................. G06F 9/00
[52] U.S. Cl. ............................... 395/700; 364/DIG. 1; 364/280; 364/281.3; 364/281.4
[58] Field of Search .................................. 395/700, 650

[56] References Cited

PUBLICATIONS

Kauser, Gail E., et al., "Rapid Prototyping of Concurrent Programming Languages, 8th International Conference on Distributed Computing Systems," IEEE Computer Society Press, 1988, pp. 250–255.

DeFrancesco, Nicoletta, et al., Nicoletta, et al., "Description of a Tool for Specifying and Prototyping Concurrent Programs," IEEE Transactions on Softwave Engineering, vol. 14, No. 11, Nov. 1988, pp. 1554–1564.

Roman, Gruia-Catalin, et al., "The Synchronic Group: A Concurrent Programming Concept and Its Proof Logic," 10th International Conference on Distributed Computing Systems, IEEE Computer Society Press, 1990, pp. 142–149.

Lui, Simon P. H., et al., "Data Driven C—A Concurrent Programming Language," IEEE Region 10 Conference on Computer and Communications Systems, Sep. 1990, pp. 165–169.

"Concurrent Programming" Edited by Narain Gehani & Andrew D. McGettrick.

Primary Examiner—Paul V. Kulik
Attorney, Agent, or Firm—Merchant, Gould, Smith, Edell, Welter & Schmidt

[57] ABSTRACT

A method and system for process expression and resolution is described. A first language structure comprising a possibility expression having at least one definition which is inherently and generally concurrent is provided. Further, a second language structure comprising an actuality expression including a fully formed input data name to be resolved is provided. Furthermore, a third language structure comprising an active expression initially having at least one invocation, the invocation comprising an association with a particular definition and the fully formed input data name of the actuality expression is provided. Subsequently, the process of resolving invocations begins in the active expression with fully formed input data names in relation to their associated definition to produce at least one or both of the following: (1) an invocation with a fully formed input data name and (2) a result data name.

20 Claims, 27 Drawing Sheets

PRELIMINARY VARIABLE EXPRESSION OF EXAMPLE PROCESS

TABLE FORM        CHARACTER STRING FORM
                   AX(0)   XA(0)
                   BX(1)   XB(1)
|   | A | B | C |  CX(2)   XC(2)
|---|---|---|---|  AY(3)   YA(3)
| X | 0 | 1 | 2 |  BY(4)   YB(4)
| Y | 3 | 4 | 5 |  CY(5)   YC(5)      FIG. 15
| Z | 6 | 7 | 9 |  AZ(6)   ZA(6)
                   BZ(7)   ZB(7)
                   CZ(9)   ZC(9)

ARBITRARY PURE VALUE EXPRESSION

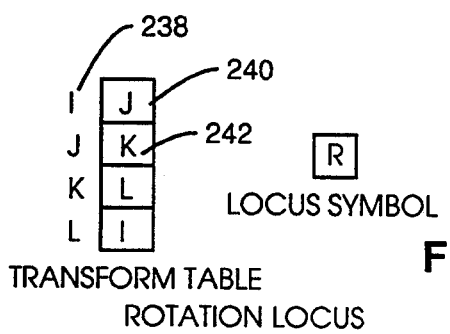   IIIL (JK)   ILII (JK)
                       IJIL (JL)   ILIJ (JL)
                       IKIL (KI)   ILIK (KI)
                       IIJI (KJ)   JIII (KJ)
                       IJJI (KK)   JIIJ (KK)      FIG. 16
                       IKJI (KL)   JIIK (KL)
                       IIJJ (LI)   JJII (LI)
                       IJJJ (LJ)   JJIJ (LJ)
                       IKJJ (LK)   JJIK (LK)

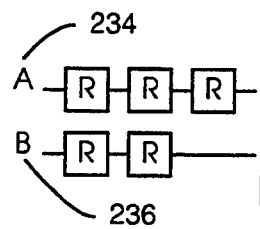

LOCUS SYMBOL          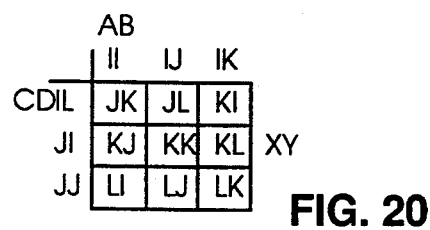

FIG. 17           FIG. 18

TRANSFORM TABLE
ROTATION LOCUS

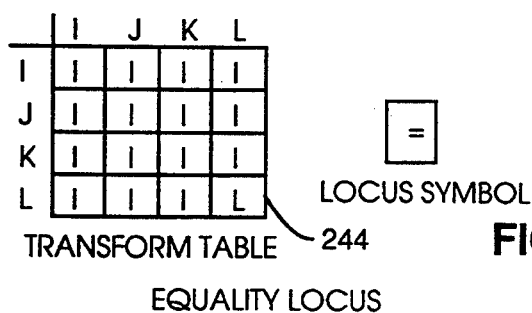

LOCUS SYMBOL

TRANSFORM TABLE
EQUALITY LOCUS        FIG. 19        FIG. 20

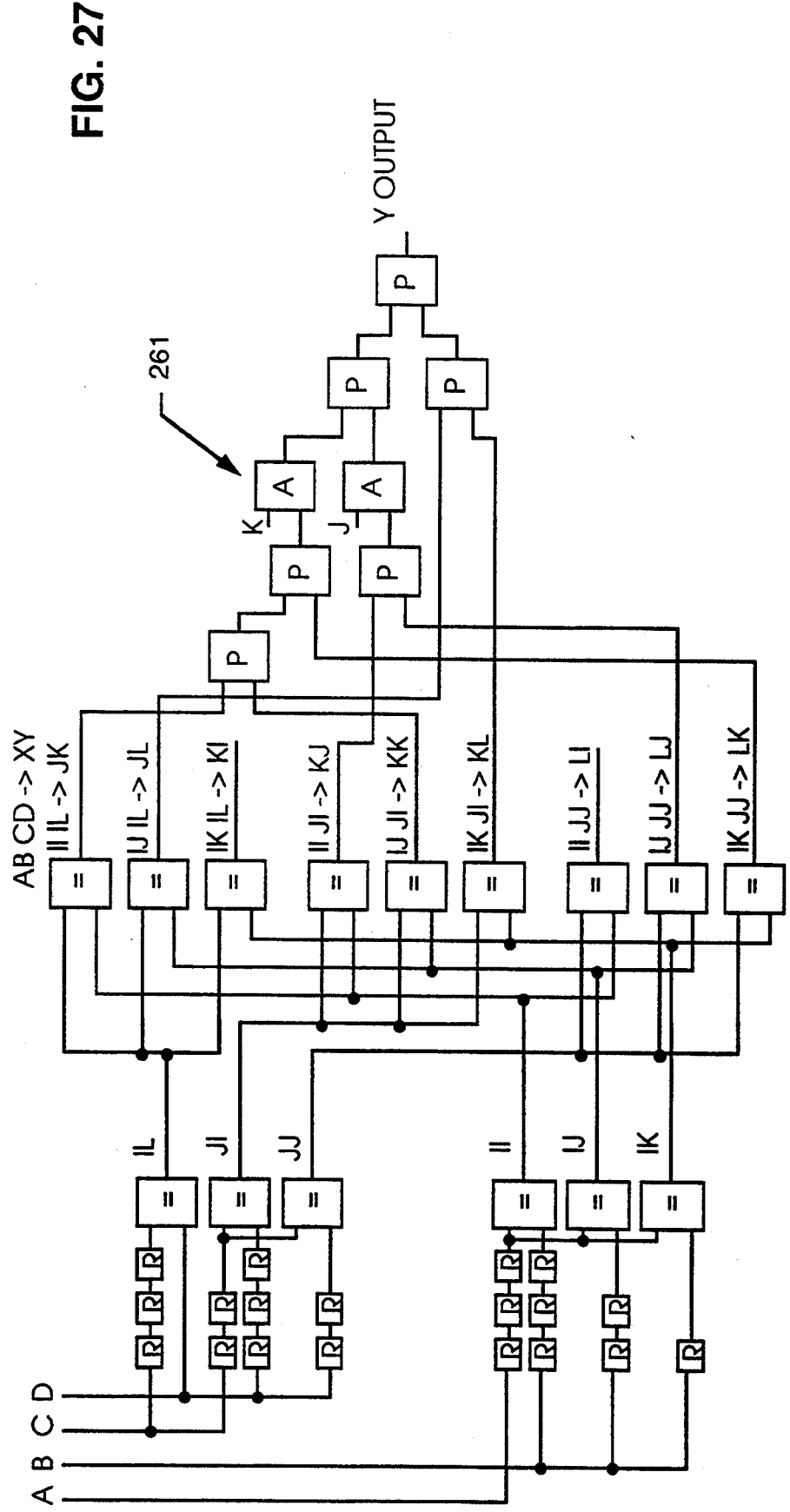

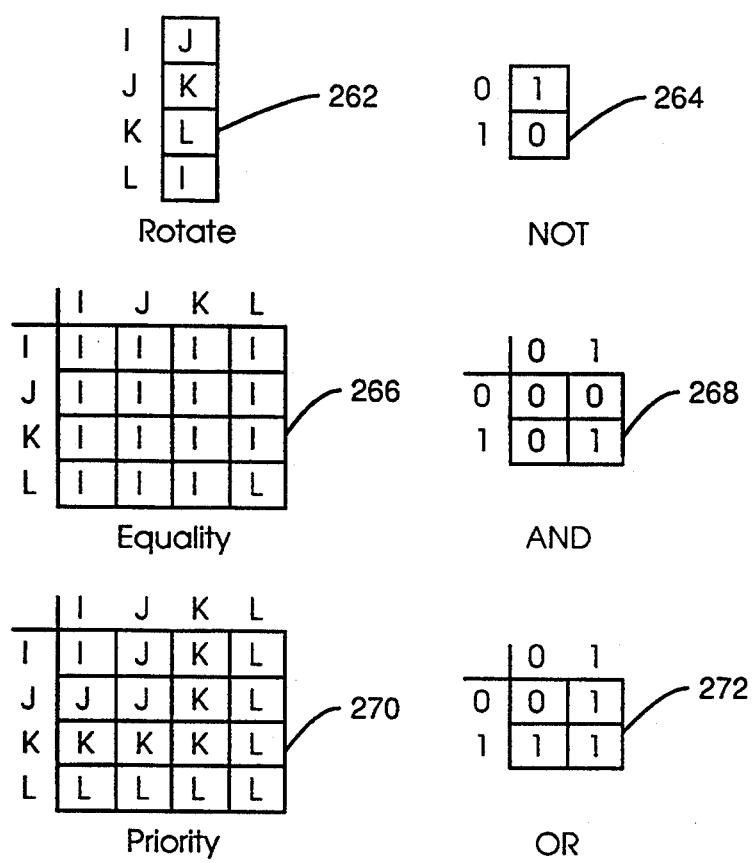
FIG. 28
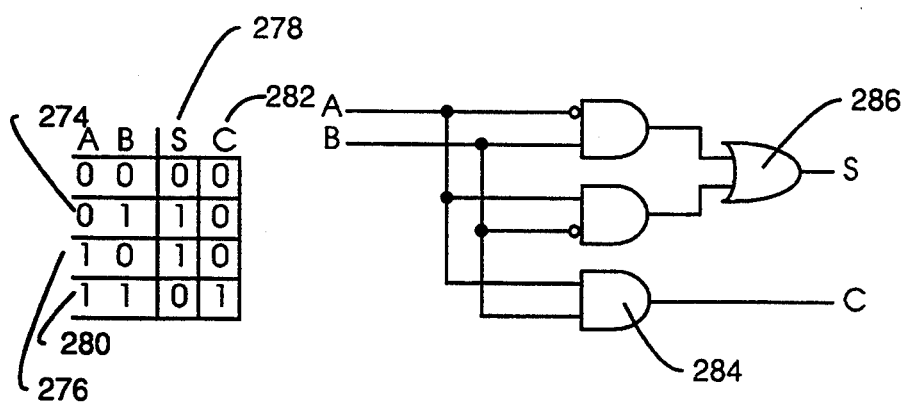
FIG. 29
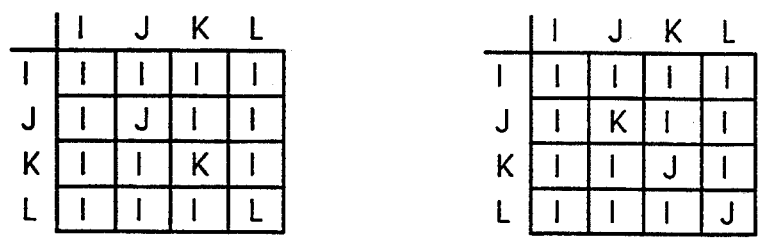
FIG. 30     FIG. 31

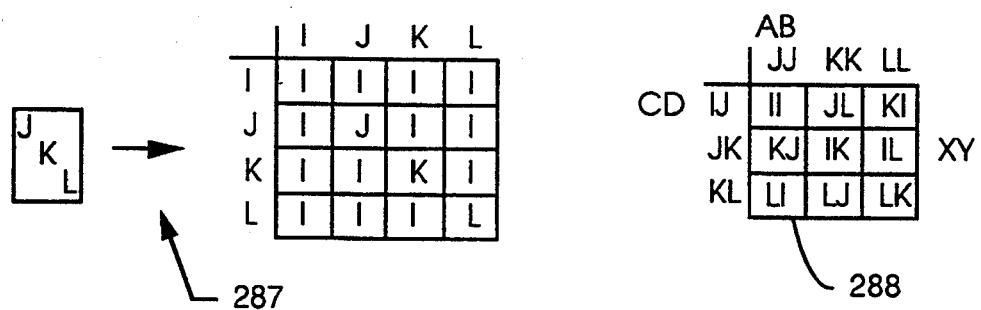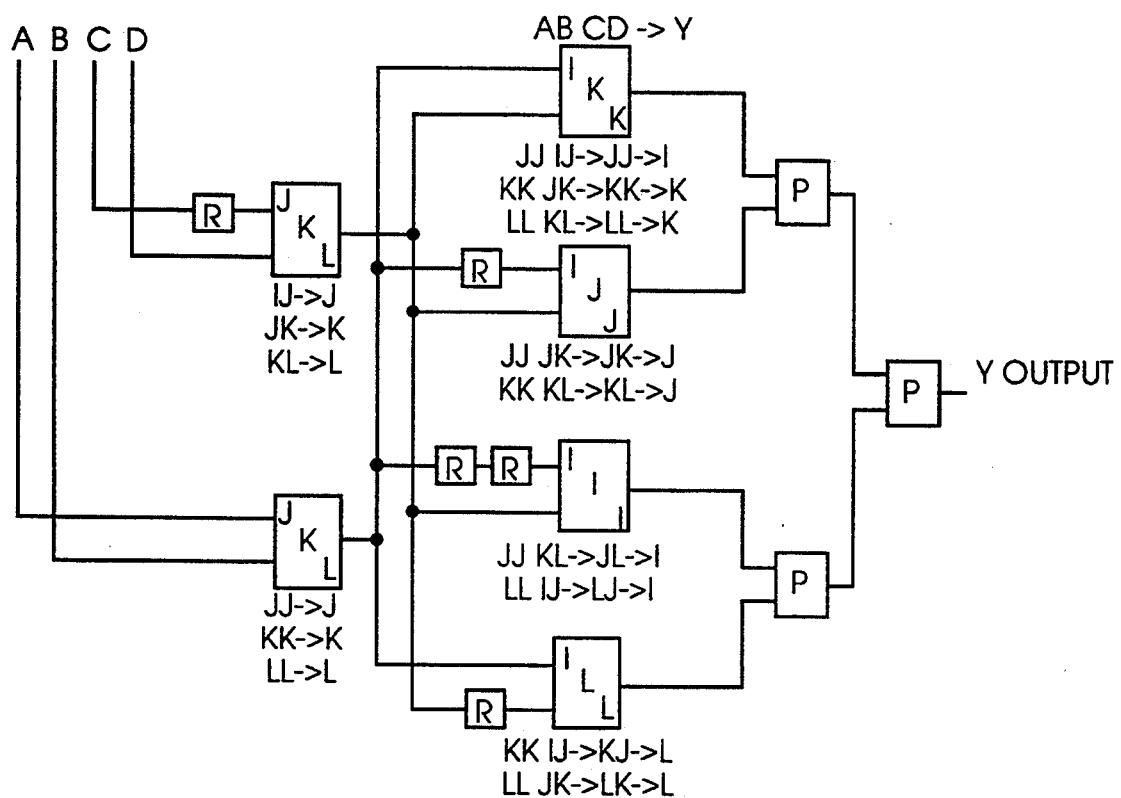
FIG. 32

LOGIC CIRCUIT OF EXAMPLE MEANING

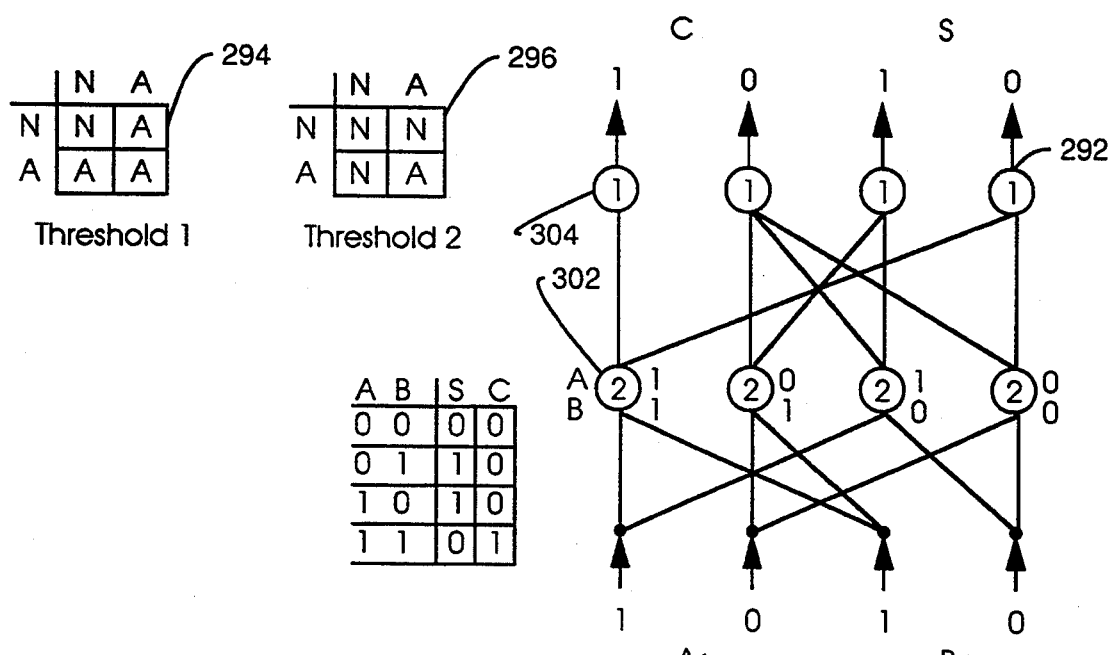
FIG. 40
FIG. 41
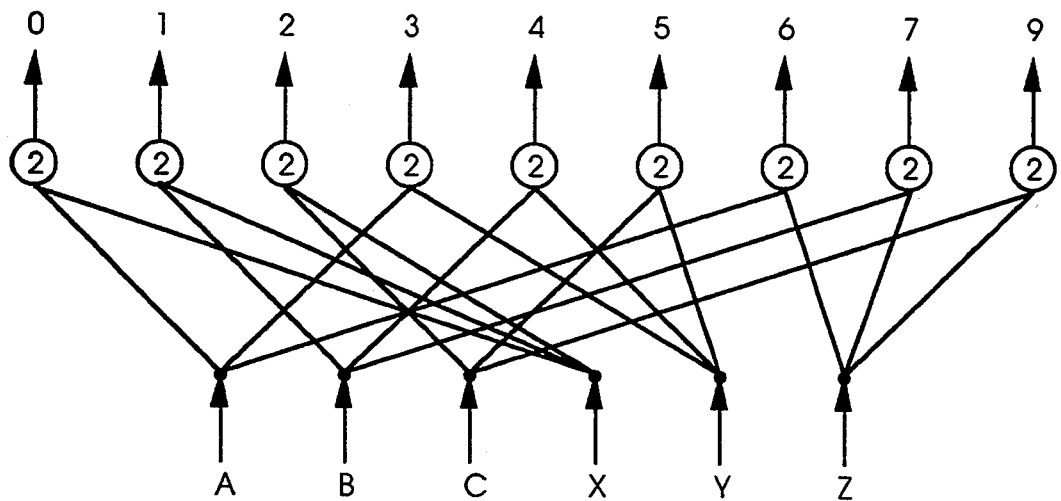
FIG. 42

MEMORY ELEMENT EXPRESSION

SELECTOR ELEMENT

COMPOSITE INPUT NAME

CASCADED SELECTOR TREE

DISTRIBUTOR ELEMENT

DISTRIBUTOR GROUP

EXPRESSION WITH CONFIGURABLE ASSOCIATION RELATIONSHIPS

BOUNDARY ELEMENT STRUCTURE

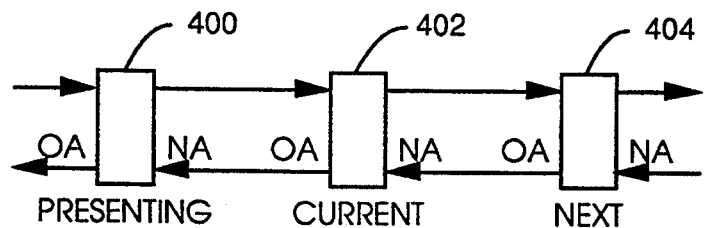

FIG. 54

| INPUT NAME | EN | N | | | | | | | | V | | | | | | | |
|---|---|---|---|---|---|---|---|---|---|---|---|---|---|---|---|---|---|
| | PNV | N | | | | V | | | | N | | | | V | | | |
| | ANV | N | | V | | N | | V | | N | | V | | N | | V | |
| | NA | N | V | N | V | N | V | N | V | N | V | N | V | N | V | N | V |
| RESULT | OA | N | N | N | N | N | N | N | N | N | N | N | N | N | N | V | V |
| | DN | N | N | V | N | N | N | V | N | N | N | N | N | N | N | N | N |
| | EN | N | N | N | V | N | N | N | N | N | N | N | V | N | V | V | V |
| STATES | | 1 AWAITING PNV VALID | 2 RESET DN AWAITING NA VALID | 3 AWAITING NA VALID | 4 SET DN AWAITING ANV NULL | 5 SET EN | 6 RESET DN AWAITING NA NULL | 7 AWAITING NA VALID | 8 SET DN AWAITING ANV NULL | 9 INACCESSIBLE | 10 INACCESSIBLE | 11 RESET EN AND OA | 12 RESET EN AND OA | 13 AWAITING ANV VALID | 14 INACCESSIBLE | 15 SET OA AWAITING PNV NULL | 16 SET OA AWAITING PNV NULL |

BOUNDARY PROTOCOL VALUE TRANSFORM SET

FIG. 55

PIPELINE OF BOUNDARY ELEMENTS

FAN IN CONFIGURATION OF BOUNDARY ELEMENTS

FAN OUT CONFIGURATION OF BOUNDARY ELEMENTS

GENERALLY CONFIGURABLE PROCESS

EXAMPLE BINARY REPRESENTATION

SAME REPRESENTATION WITH
MORE FAMILIAR VALUES.

BINARY FULLADDER EXAMPLE EXPRESSION

METHOD AND SYSTEM FOR PROCESS EXPRESSION AND RESOLUTION INCLUDING A GENERALLY AND INHERENTLY CONCURRENT COMPUTER LANGUAGE

FIELD OF THE INVENTION

The present invention relates to a process expression and resolution system and more particularly, to a computer language which is generally and inherently concurrent thereby enabling concurrent processing within a computer system.

BACKGROUND OF THE INVENTION

The last several years of the computer age have been years of dramatic technological progress. Computers have permeated the fabric of society and become indispensable to commerce and government. They have rapidly become more powerful while at the same time becoming smaller and cheaper. Computer system technology has evolved through four generations. Innumerable programming languages have been implemented and the discipline of programming has gone through at least one revolution.

During this era of dramatic technical progress one aspect of computing has progressed imperceptibly if at all. The theoretical understanding of computers and computing remains pretty much as it existed 45 years ago and it has had very little influence on the general progress of other aspects of computing. Almost all of this progress is due to improved technology, direct experience and native inventiveness.

"The theory of computer science" is largely a collection of mathematical models and conceptual viewpoints, most of which existed before the first digital computer was built. These different models such as, automata theory, the Turing machine and formal languages all ask questions about issues of computability and revolve around the notion of the algorithm. The questions of computability address the foundations of mathematics itself and deal with the limits of what can be computed with various symbol manipulation rule systems embodied in computational devices such as machines and languages. To understand "the theory of computer science" it is necessary to understand the notion of the algorithm.

The notion of the algorithm is fundamental to mathematics. To understand the significance of the notion to mathematics it is necessary to understand the history of its development. The term itself derives from the name of ninth century Persian mathematician named Mohammed ibn Musa al-Khowarizmi. In about 825 A.D., he wrote a small book describing how to calculate with a new ten symbol, positional value number system developed in India. The book described simple procedures for carrying out addition, subtraction, multiplication and division in the new system. Around 1120 A.D., this small book was translated into Latin under the title *Liber Algorismi de numero Indorum* (The Book of al-Khowarizmi on the Hindu number system). This translation of the book was widely distributed in Europe and it introduced the Hindu-Arabic number system to Europe. By the mid thirteenth century, al-Khowarizmi had been forgotten but the term algorism (Latin for al-Kowarizmi's book) had come generally to refer to computation in the new number system. At this time, an algorism was any book related to the subject. The algorisms were the four arithmetic operations. An algorist was a person who calculated in the new number system as opposed to an abacist who used an abacus. By 1500 A.D., the algorists had prevailed and the abacists had largely disappeared.

These algorisms were strictly mechanical procedures to manipulate symbols. They could be carried out by any person by mechanically following simple rules, even though the person had no understanding of the theory of operation, the person needed no cleverness to determine a correct answer. Computing with Roman numerals on the other hand required considerable skill and ingenuity. At this time, other examples of mechanical formulation existed such as Euclid's method to find the greatest common denominator of two numbers. The use of simple mechanical computation fascinated the medieval mathematicians. They wondered if it was possible that the whole of mathematics or even all of human knowledge could be mechanically formulated and calculated with simple rules of symbol manipulation.

Leibniz failed in an attempt to complete just such a formulation in the 1660s with his calculus ratiocinator or characteristica universalis. The object of Leibniz was to "enable the truths of any science, when formulated in the universal language, to be computed by arithmetical operations". Insight, ingenuity and imagination would no longer have been required in mathematics. After Leibniz's failure the idea lay fallow for two hundred years.

When the dream of formalizing thought with mechanical procedures in symbols reemerged with the symbolic logic of George Boole in 1854, it had stiff competition to overcome in the form of Euclidian geometry. Euclidian geometry, with its axioms and rules of reasoning from the simple to the complex was the established model of intellectual thought in the western world. In the 1680's, after the discovery of analytical geometry and having made new discoveries with his own invention of fluxional calculus, Newton was careful to cast all the mathematical demonstrations in his presentation of these new discoveries in classical Greek geometry. At the time, a symbolic analytical presentation would neither have been understood nor accepted.

Late into the nineteenth century symbolic computation was distrusted and discounted. Geometry, dealing with relationships among points, lines and surfaces, was intuitive, obvious and clear whereas algebra dealt with arbitrary symbols related by arbitrary rules that did not relate to any specific reality. The attitude is exemplified by a nineteenth century astronomer who remarked that he had not the "smallest confidence in any result which is essentially obtained by the use of imaginary symbols".

Toward the end of the nineteenth century Euclidian geometry lost its philosophical preeminence and symbolic computation emerged as the model of intellectual thought. The fall of geometry was precipitated by Bolyai, Gauss, Lobachevski and Riemann with the development of non Euclidian geometries which were internally consistent and therefore just as valid a mathematical system as Euclidian geometry. The rise of symbolic computation was nurtured by Boole, Peirce, Schroder, Peano and Frege who were trying to establish acceptable foundations for symbolic logic. These two streams of endeavor culminated in Hilbert's rigorization of Euclidian geometry in terms of algebra in *Grundlagen der Geometrie* (Foundations of Geometry) published in 1899 which emphasized the undefined nature of the axioms.

"One must be able to say at all times-instead of points, straight lines and planes- tables, chairs and beer mugs". Euclidian geometry was after all just one of many possible axiomatic symbolic computation systems.

As the twentieth century dawned, symbolic computation had been established as the arena of mathematical theorizing and axiomatic systems provided the rules of the game. The mathematicians were hot on the trail of settling the game once and for all. They seemed to be on the verge of fulfilling Leibniz's dream of the universal symbolic language that would proffer absolute certainty and truth.

This quest was led by David Hilbert, who outlined a program to settle once and for all the foundational issues of mathematics. The program focused on the resolution of three questions.

1. Was mathematics complete in the sense that every statement could be proved or disproved?
2. Was mathematics consistent in the sense that no statement could be proved both true and false?
3. Was mathematics decidable in the sense that there existed a definite method to determine the truth or falsity of any mathematical statement?

This definite method of decidability was the modern incarnation of Leibniz's arithmetical operations of his universal symbolic language.

Hilbert firmly believed that the answer to all three questions was 'yes', and the program was simply one of tidying up loose ends. Hilbert was convinced that an unsolvable mathematical problem did not exist, "every mathematical problem must necessarily be susceptible to an exact statement, either in the form of an actual answer to the question asked , or by the proof of the impossibility of its solution".

In 1931, Kurt Godel demonstrated that any axiom system expressive enough to contain arithmetic could not be both complete (there existed statements that could not be proved either true or false) and consistent (free of contradictions) in the terms of the axiom system. This result was the death knell for Hilbert's program. The answers to the first two questions were no. There remained the question of decidability. The entscheidungsproblem as Hilbert termed it. After Godel proved that unsolvable problems (unprovable theorems) could exist in an axiom system, the decidability problem became a search for a definite method to determine if a given problem was solvable or unsolvable in a given axiom system.

The decidability problem appealed directly to the notion of a definite method which was also referred to as an effective procedure or a mechanical procedure. This notion had always been fundamental to mathematics but had been intuitively accepted and had not been a subject of investigation itself. In essence, a person should know an effective procedure when that person sees one. But, to demonstrate something about the nature of effective procedures there must be a precise characterization of what constitutes an effective procedure.

Hilbert made it clear what constituted an acceptable mathematical solution in his 1900 paper posing 23 problems which he considered important to the future of mathematics.

"that it shall be possible to establish the correctness of a solution by means of a finite number of steps based upon a finite number of hypotheses which are implied in the statement of the problem and which must always be exactly formulated"—David Hilbert.

Satisfactorily characterizing this notion of effective or mechanical procedure became an important foundational issue in mathematics and several mathematicians applied themselves to the problem. Among them were Herbrand and Godel, Post, Turing, Church and Markov. Each had a totally different characterization of effective computability which were all shown later to be logically equivalent. In 1936, both Church with his lambda calculus and Turing with his machine proved that no effective procedure existed to determine the provability or unprovability of a given mathematical problem. Therefore, the answer to Hilbert's third question was also 'no' Leibniz's calculus ratiocinator with its arithmetical resolution of all questions was not possible. Thus, ingenuity, insight and imagination cannot be done away with in mathematics after all.

Questions of effective computability have continued to be a fundamental concern of mathematicians. Through the 1940s and 1950s A. A. Markov tried to consolidate all the work of the other mathematicians on effective computability by introducing the term algorithm with its modern meaning as a name for his own theory of effectively computable functions. In the translated first sentence of his 1954 book *Teoriya Algorifmov* (Theory of Algorithms) he states:

"In mathematics, "algorithm" is commonly understood to be an exact prescription, defining a computational process, leading from various initial data to the desired result"—A. A. Markov.

The term algorithm was not, apparently, a commonly used mathematical term in America or Europe before Markov, a Russian, introduced it. None of the other investigators, Herbrand and Godel, Post, Turing or Church used the term. The term however caught on very quickly in the computing community. In 1958 a new programming language was named ALGOL (ALGOrithmic Language). In 1960 a new department of the *Communications of the ACM* (Association for computing machinery) was introduced called "Algorithms".

Historically, the notion of the algorithm was developed to investigate the foundations of mathematics and has evolved in relation to the needs of mathematicians. The algorithm in mathematics is a limiting definition of what constitutes an acceptable solution to a mathematical problem. It is the foundational notion of what mathematics is all about and Turing's machine emerged as the preferred definition of the algorithm for mathematicians.

When the computer emerged in 1945, its birth was attended by two professional groups; electrical engineers and mathematicians. It was inevitable that the theoretical aspects of this newly emerging phenomena would be established by the mathematicians. One of these mathematicians, John Von Neumann, was a student of Hilbert's and a significant contributor to his program to resolve the foundations of mathematics.

The computer did mathematical computation, it computed one step at a time and each step was precisely defined. Mathematics already had an established theory of computability and a machine model of computation (the Turing machine) that proceeded one precisely defined step at a time. The notion of the algorithm was quite naturally adopted by those theorizing about computers as a fundamental paradigm. This activity eventually came to be called "the theory of computer science."

Many attempts have been made to define computer science. These definitions view computer science as a heterogeneous group of disciplines related to the creation, use and study of computers. A typical definition simply offers a list of included topics such as: computability, complexity, algorithm theory, automata theory, programming, high level languages, machine languages, architecture, circuit design, switching theory, system organization, numerical mathematics, artificial intelligence, other applications, etc. One definition attributed to H. Zemanek is relatively concise and suggests that computer science consists of four distinct theoretical domains. He said that computer science is:

1. A theory of programming, with emphasis not mainly on the problems of distinguishing the computable from the noncomputable, but rather on a practical theory of algorithms concerned with the construction of economical and efficient programs;
2. A theory of process and processor organization, which takes into account the finite dimensions of existing memories, the availability of storage hierarchies of varying access speeds and costs, and the desire for a reduction in computation and program production time;
3. A theory of description for processes and computational structures in terms acceptable to the processor; and
4. A theory of computer applications which would include all features common to most numeric and nonnumeric applications.

The most recent and comprehensive survey of the attempts to define computer science is an article in the *Annals of the History of Computing*.

Computer science appears to consist of a quite disparate group of disciplines. There is the theorist concerned with formalized machines, the hardware engineer concerned with logic circuits, the software engineer concerned with symbolic expressions, the architect concerned with dynamic interpreting structures, the systems programmer concerned with interacting processes and the user concerned with his own unique problem. This fragmented face of computer science seems to be a generally accepted inevitability.

Can an underlying commonality of concern be discovered among these several disciplines and possibly, a conceptual focus for computer science? Item (1) in the above list is concerned with programming, which is the rendering of symbolic process expression. Item (2) is concerned with processor organizations, which is an expression of a process to interpret symbolically expressed processes. Item (3) is directly concerned with symbolic process expressions. Item (4) is concerned with process expression in general. All of the disciplines that are included under the heading of computer science in any list are concerned in one way or another with the creation, expression, or actualization of process expressions. A logic circuit is an expression of a process that can happen all by itself. An architecture is an expression of a continuously acting process to interpret symbolically expressed processes. A program is a symbolic expression of a process. A programming language is an environment within which to create symbolic expressions. A compiler is an expression of a process that translates between symbolic expressions in different languages. An operating system is an expression of a process that manages the interpretation of other process expressions.

Computer science can be viewed as primarily concerned with questions about the expression of processes and the actualization of those expressions. What are the all the possible ways a process can be expressed? Are some expressions superior in any sense to other expressions? What are all the possible ways of actualizing an expression. Are there common conceptual elements underlying all expressions? What is the best programming language? How can the best program be formulated? How can the best architecture be built? What is the best implementation environment? These are the questions that occupy computer scientists and they all revolve around the nature of process expression.

Mathematicians, on the other hand, are primarily interested in exploring the behavior of specific processes or classes of process. They bypass general problems of expression by appealing to a very formal and minimalized model of expression; the algorithm as characterized by the Turing machine. They are only interested in whether an expression is possible and whether it conforms to certain specific properties. They are not interested in all the possible ways of rendering an expression of the process and actualizing it. This, however, is precisely what computer scientists are interested in.

Mathematics is primarily concerned with the nature of the behavior of process regardless of how that process is expressed. Computer science is primarily concerned with the nature of the expression of processes regardless of what particular process might be expressed. This core concern with the nature of expression itself is the unique conceptual focus that distinguishes computer science from the other sciences and from mathematics. Computer science is the science of expression.

One published definition of computer science comes near the mark.

"computer science itself becomes no more (and no less) than the discipline of constructing appropriate descriptive languages"—Harold Abelson, Geraly Jay Sussmann, and Julie Sussmann.

The notion of the algorithm has become firmly established as a fundamental conceptual paradigm of "the theory of computer science."

"The notion of the algorithm is basic to all computer programming . . . "—Donald E. Knuth.

" . . . the basic concept of problem solving on the computer—the algorithm"—M.S. Carberry, H. M. Khalil, J. F. Leathrum and L. S. Levy.

" . . . the notion of the algorithm is essential to computer programming"—Kurt Maly and Allen R. Flanson.

"One of the concepts most central to computer science is that of an algorithm"—Zenon W. Pylyshyn.

Introductory texts on computer science often begin with a chapter on the notion of the algorithm. The following generally covers the etymology of the word and a definition of the notion which consists of a belabored list of properties which an expression must satisfy to qualify as an algorithm. An issue conspicuously absent from these introductory chapters is how the notion contributes to the resolution of significant problems of computer science. In the remaining chapters of these texts, there is typically no further appeal to the notion of the algorithm and rarely even a usage of the word itself. The notion is never or very rarely appealed to in texts on logic design, architecture, operating systems, programming, software engineering, programming languages, compilers, data structures and data base systems.

Is the notion of the algorithm really a fundamental concept of computer science? Is it just pretentious but harmless window dressing or has the notion actually been detrimental to the growth and development of computer science? Does "the theory of computer science" have anything to do with computer science?

Computer science texts typically define the notion of the algorithm by simply presenting a list of qualifying properties for an algorithm. In particular, an algorithm:

1. Must be a step by step sequence of operations
2. Each operation must be precisely defined
3. It must terminate in a finite number of steps
4. It must effectively yield a correct solution
5. It must be deterministic in that given the same input it will always yield the same solution These properties are substantially similar to what Hilbert proposed in 1900 and it is easy to see how this list of restrictive characteristics serves to define what is acceptable as a mathematical solution, but what is its significance in computer science?

The notion of the algorithm demarcates all expressions into algorithm and non-algorithm but, what purpose does it serve to know that one program is an acceptable mathematical solution and another is not? Is the expression of one fundamentally different from the expression of the other? Is one interpreted differently from the other? Is a different machine required for one than the other? Do operations ordered in strict sequence somehow work better than operations ordered with concurrency? Are algorithms first class citizens in some sense and non-algorithms second class citizens? Most existing programs are considered "unacceptable" mathematical solutions.

Important types of programs in computer science do not qualify as algorithms. An operating system is not supposed to terminate nor does it yield a singular solution.

It cannot be deterministic because it must relate to uncontrolled inputs from the outside world. Any program utilizing random input to carry out its process such as a monte carlo simulation or fuzzy logic simulation is not an algorithm. Many programs and computers utilize concurrency where many operations are carried out simultaneously. Are these not algorithms? If a formerly sequential program qualifying as an algorithm is parallelized by a vectorizing compiler, is it no longer an algorithm? No program with a bug can be an algorithm and it is an accepted truism that no significant program can be demonstrated to be bug free.

Does determining whether a given expression is an acceptable mathematical solution or not, help to identify the expression that is most readable, most efficient, fastest or easiest to interpret? Does such a distinction aid in building better computer systems or in writing better programs?

These difficulties with the notion of the algorithm have not gone unnoticed. The following observations about algorithms are quotations from various sources.

" . . . there is an extension of the notion of algorithm (called nondeterministic algorithms)"—M. S. Carberry, H. M. Khalil, J. F. Leathrum and L. S. Levy.

"Any computer program is at least a semi-algorithm and any program that always halts is an algorithm'-'—R. R. Karthage.

"There is another word for algorithm which obeys all of the above properties except termination and that is computational procedure"—Ellis Horowitz and Sartaj Sahni.

"An algorithm A is a probabilistically good algorithm if the algorithm "almost always" generates either an exact solution or a solution with a value that is "exceedingly close" to the value of the optimal solution"—Benjamin W. Wah and C. V. Ramamoorthy.

"The procedure becomes an algorithm if the Turing machine always halts"—Kurt Maly and Allen R. Hanson.

"By admitting probabilistic procedures in algorithms . . . "—F. S. Beckman.

" . . . if, after executing some step, the control logic shifts to another step of the algorithm as dictated by a random device (for example, coin tossing), we call the algorithm random algorithm"—E. V. Krishnamurthy.

"An algorithm which is based on such convergence tests is called an infinite algorithm"—E. V. Krishnamurthy.

"Algorithms that are not direct are called indirect-"—John K. Rice and John R. Rice.

"We drop the requirement that the algorithm stop and consider infinite algorithms"—John K. Rice and John R. Rice.

These people have sensed an inappropriate discrimination or simply an incompleteness and proposed a remedy. Programs that do not terminate, are not deterministic and do not give specific solutions are now "included." They are no longer simply non-algorithmic they have positive labels, but what has been achieved by this labeling? Do these new labels provide any useful conceptual discrimination? A non-algorithm by any other name is still just an expression that, however useful it might be in other contexts, is unacceptable as a mathematical solution.

Computer science does not have the same view points as mathematics. Computer science is not in pursuit of solely mathematical solutions, it is in pursuit of a general understanding of process expression. Algorithm, non-algorithm is simply not the kind of conceptual discrimination that is useful in computer science. The notion of the algorithm has not discouraged anyone from creating nondeterministic, nonterminating, incorrect or otherwise unacceptable expressions nor has it aided anyone in creating better programs or computers.

The problem is that the notion of the algorithm taken out of its mathematical context has been used for duties it was never intended to fulfill. The notion of a sequence of operations was considered by the mathematicians as an adequate and simple rendering of process expression and for their purposes indeed it was adequate. It was never intended to be a paradigm of process expression in general. Unfortunately, this is the role it came to serve in computer science.

So how does the notion of the algorithm fare purely as a model of process expression? The definition of the algorithm states that a process expression should be a strict one with a time sequence of precisely defined operations. It does not suggest what an operation is or how one should be precisely defined. It is, however, in this precise definition of the operation that the basic questions of expression must be addressed. How is the input data and output data characterized? Just how does the input data turn into output data? How does the data of one operation relate to the data of another operation? The notion of the algorithm addresses none of these issues. It just states that operations must be precisely defined. This unsupported imperative is at once an admission of expressional incompleteness and a refusal to be complete.

In whatever manner operations manage to get defined the notion of the algorithm specifies that they should be arranged in strict sequence. The only formal relationship between operations that the notion of the algorithm admits is that of sequential order. Is this notion of arranging operations in sequence fundamental or necessary in any sense?

The notion of a sequence of precisely defined operations is more familiarly known as the sequential process model. The sequential process is the informal version of the algorithm without the operational strictures of termination, effectiveness and determination. Sequentiality is generally considered a necessary theoretical primitive of process expression. Concurrency, for instance, is viewed as a secondary property derived from sequentiality. Several of the following quotes convey the general attitude on concurrency.

"It (a concurrent program) consists of several sequential processes whose execution sequences are interleaved."—Ben-Ari M. Ben-Ari.

"We will build concurrent programs out of sequential processes that are executed simultaneously."—Per Brinch Hansen.

"(sequential) Processes are called concurrent if their execution overlap in time."—Per Brinch Hansen.

"... parallel composition of communicating sequential processes is a fundamental program structuring method."—C. A. R. Hoare.

There is much that is sequential in dealing with computers, but is this sequentiality conceptually fundamental or just an artifact of the way we happen to currently be building computers and thinking about mathematics?

In actuality, single event sequentiality is derived from continuously functioning concurrent elements. Computers are built from logic circuits which in turn are built of networks of continuously and concurrently operating logic gates. There is nothing sequential about a combinational logic circuit. Many circuits operate concurrently to carry out one sequential operation of a computer. The most primitive operations of any process expression must occur concurrently. Consider the construction of a logic circuit in which the logic gates operate strictly one at time sequentially. The logic gates cannot sequentialize themselves so a sequential controller must be postulated. But this controller itself must also be constructed in terms of strictly sequential operational units which will in turn need a sequence controller. The most primitive operations of any process must be expressed in concurrently proceeding relationships. They cannot be expressed strictly sequentially.

The notion of the algorithm fails on all counts to be a viable model of process expression. Termination, determination and effectiveness are not necessary properties of process expression. There can be nonterminating, nondeterministic and incorrect expressions of useful and valid processes. "Precisely defined operation" is not a sufficient characterization of an expressional unit of process. The strictly sequential composition of expressional units is neither expressionally necessary nor sufficient.

When computer science was born, it borrowed substance from a particularly appropriate branch of mathematics, computability, which was founded as a discipline of pure mathematics at the beginning of the century and which studied mechanical computation using state machines, Turing machines and formal languages before the computer even existed. For the mathematicians, a sequence of operations was the simplest canonical form of expression that allowed the comparisons that they were interested in. They could directly compare computations by comparing the number of operations and the forms of the operations themselves. They were perfectly aware of the possibility of concurrent operations and purposely factored such irrelevant complications out of their expressions. The mathematicians did not need anything beyond the sequential process model of expression.

The mathematicians, with their rigorous formality were the certified theorists among a community of mostly engineers. The algorithmic sequential process model was available, it was adequate, it had authority and it had no competition. The model of computation for mathematics became the very firmly established model of expression for what was quite reasonably considered to be the foundational efforts in the theory of computers. This discipline of mathematics came to be called "the theory of computer science" while retaining all the flavor of pure mathematics and the notion of the algorithm came to be accepted as a fundamental paradigm of computer science.

The computer builders and users on the other hand were developing a sense that the computer might actually be conceptually intractable. It was pointed out early on that a computer and any program for it were arbitrary human artifacts. Since a human could build the computer and program it any way he chose the endeavor could not possibly be subject to any inherent limitations in the same sense that nature is subject to its laws or that mathematics is subject to its rules. Continuing experience further suggested that computing did indeed exhibit intractable degrees of freedom of expression. Given this perception the only approach to understanding so intractable a subject seemed to be experience and experiment and the only approach to managing it to be imposed rationale and convention. A comprehensive theory of process expression may not in fact be possible and the mathematicians were probably doing about as much as could be done even though it wasn't very useful.

As the field of computers grew, each area of computing developed its own isolated set of concepts and conventions and largely ignored "the theory of computer science". These areas attempt to interface with each other. For instance, architectures are designed to facilitate operating system functions. Compilers are optimize to specific architectures. Languages and architectures accommodate specific applications. But, there has not emerged from these local efforts a unified theory that pretends to be comprehensive and that can challenge the mathematical models for the title "The Theory of Computer Science".

Even though the mathematical theories have had little practical influence, the territory is still generally considered to be mathematical in nature and the mathematical perspective as well as the mathematical approach have permeated the disciplines of practical computing. However, the mathematical perspective is the wrong point of view. It is asking the wrong questions. The mathematical point of view is concerned with the behavior of classes of processes, the mapping of the domain to the range, the limits of behavior and anomalies of behavior? A mathematician is not greatly concerned with how a process is expressed. It may be expressed in any convenient language and executed on any convenient machine.

The computer scientist on the other hand is concerned about questions of expression. He wants to know, in general, how to define the optimal programming language, the best architecture to interpret programs in that language and how best to write those programs. He is not greatly concerned with what processes might be programmed on the computer and even less concerned about how any particular process might behave in terms of its domain and range.

A computer scientist is concerned about all of the possible ways to express a process regardless of what process is expressed. In contrast, a mathematician is concerned with the behavior of a specific class of processes regardless of how that process is expressed. Mathematicians and computer scientists are pursuing fundamentally different questions. The mathematicians tools are not as appropriate, as once supposed, to solve the questions of the computer scientist. The primary questions of computer science are not of computational possibilities but of expressional possibilities. Computer science does not need a theory of computation rather, it needs a theory of expression.

One pioneer of "computer science" elegantly summarizes the situation:

"In particular, in theoretical computer science we have been guilty of behaving too much like pure mathematicians; The mathematicians' compass has not always guided us well in exploring computer science. Time and again, we have valued the difficulty of proofs over the insights the proved results give us about computing; we have been hypnotized by mathematical elegance and pursued abstraction for its own sake. Frequently we have practiced "intellectual counter punching" by staying with small, previously defined (and possibly irrelevant) problems instead of searching for new formulations and development of theories more directly related to computing. . . . I believe that as we explore information processing further, there will be startling surprises and that our current ideas about computing will have to be modified substantially.'-'—Juris Harmanis.

The following description attempts to formulate a comprehensive theory of computer science that can compete directly with the established mathematical theory of computer science. In particular, an exploration of process from the point of view of its expression is attempted. In addition, the description details some of the fundamental principles of expression and explains how these principles produce the enormous diversity of process expression in the physical and abstract world. By putting forth the proper questions from the proper perspective, it can be shown that computers are not as artifactual and intractable as once thought but simply one manifestation of a fundamental natural phenomenon.

SUMMARY OF THE INVENTION

A method and system for process expression and resolution is described. A first language structure comprising a possibility expression having at least one definition which is inherently and generally concurrent is provided. Further, a second language structure comprising an actuality expression including a fully formed input data name to be resolved is provided. Furthermore, a third language structure comprising an active expression initially having at least one invocation, the invocation comprising an association with a particular definition and the fully formed input data name of the actuality expression is provided. Subsequently, the process of resolving invocations begins in the active expression with fully formed input data names in relation to their associated definition to produce at least one or both of the following: (1) an invocation with a fully formed input data name and (2) a result data name.

BRIEF DESCRIPTION OF THE DRAWINGS

FIG. 15 illustrates an example process in which six distinctions can interact in nine possible ways to produce one of nine possible results.

FIG. 16 illustrates an arbitrary assignment of encodings.

FIG. 17 illustrates an example rotate locus.

FIG. 18 illustrates a configuration of rotation loci to convert a given input name to a standard recognition name.

FIG. 19 shows a set of transform rules.

FIG. 20 illustrates an example expression.

FIG. 27 shows the complete optimized expression to recognize four variable-four value input names and assert four variable-four value result names.

FIG. 28 illustrates interaction loci as Boolean logic functions.

FIG. 29 illustrates a half adder circuit and corresponding truth table.

FIG. 30 illustrates a transform set which will unambiguously recognize three input names that are rotation neighbors.

FIG. 31 illustrates a locus which will generate the appropriate result values directly.

FIG. 32 illustrates how the expression of the example process can be expressed if custom interaction loci are allowed.

FIG. 40 shows transform value sets with the NULL convention added.

FIG. 41 shows the two value NULL convention expression of the simpler example process of FIG. 12.

FIG. 42 shows the basic example process expressed as two value NULL convention logic.

FIG. 54 shows how boundary elements communicate to synchronize value flow.

FIG. 55 is the transform table for the protocol section of the boundary element.

DETAILED DESCRIPTION

1 A Model of Process Representation

Figure 1:
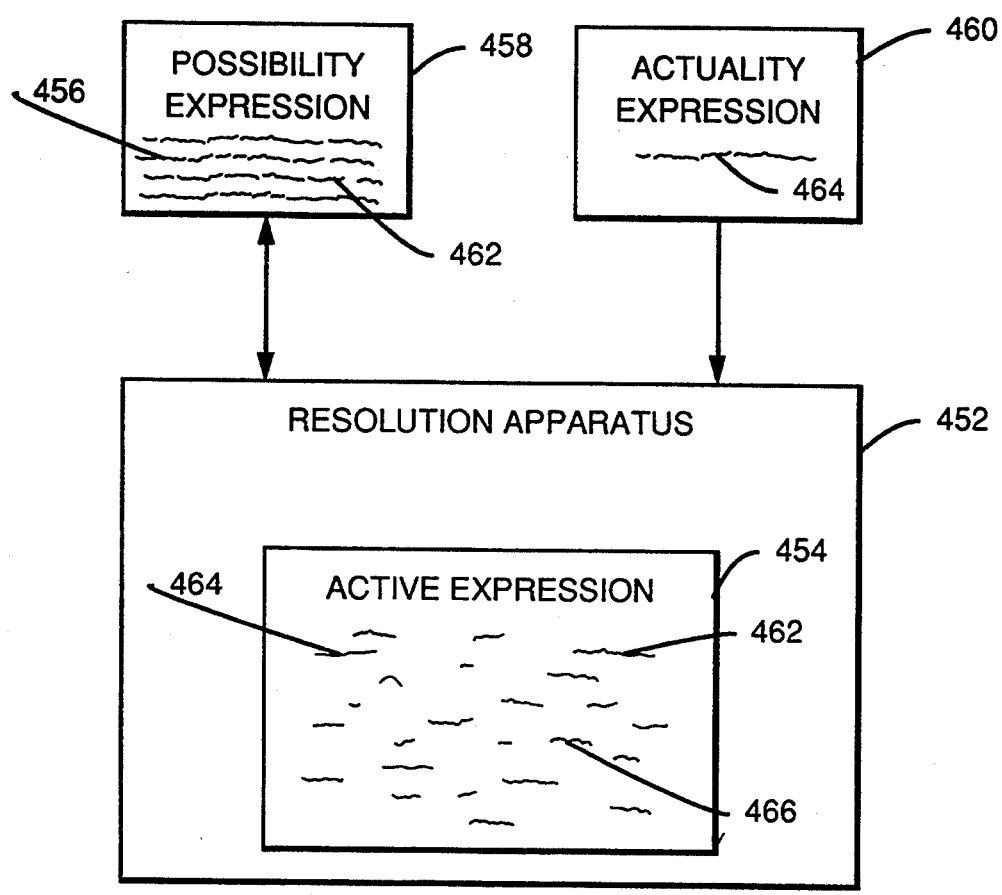
FIG. 1 is a diagram showing high level description of the preferred embodiment process expression and resolution system.

The following section of this detailed description introduces a model of process expression that focuses on the nature of process itself. The model will lay a foundation for exploring the fundamental questions of process expression. Some of the concepts explored include: what are the possible forms of process expression, what are the relationships among these various forms, and what are the limits of process expression.

For the purpose of this detailed description, process shall be defined in very general terms, and then, the invocation model of process expression shall be introduced. A series of examples present two domains of expression within the invocation model and illustrate some fundamental principles of process expression.

1.1 Process

Process is characterized as the actual occurrence of interactions among distinctions from among a set of possible interactions resulting in a new set of distinctions and a new set of possible interactions. Each distinction is an interacting element different and distinct from all other interacting elements. Each possible interaction is determined by a unique combination of distinctions. An actual combination of distinctions determines which possible interaction actually occurs. Each interaction results in a new set of distinctions with new interaction possibilities.

When a combination is formed each distinction in the combination must be present at the place of combination and it must differentiate itself as a unique distinction in relation to the other distinctions at the place of combination. So each distinction must express a property of place as well as a second differentiating property.

Process is a confluence of possibility and actuality. All of the details of each possible interaction, what combinations of distinctions can form and what new distinctions result from each combination, must be expressed in detail before occurrence, but which possible interaction will actually occur cannot be expressed until the time of occurrence when a combination of distinctions is actually formed. The possibility of process and the actuality of process are inherently separate aspects of process and can be considered to be expressed separately as a possibility expression and as an actuality expression.

The possibility expression is an inherently incomplete specification of a process. It must defer as an open question which of the possible interactions will occur. The actuality expression provides the answer to this question and by combining with a possibility expression completes the specification of a particular occurrence of a process. The form of the possibility and actuality expressions must correspond in the sense that the answer of the actuality expression must fulfill the question of the possibility expression. The combination of distinctions of the actuality expression must be one of the possible combinations expressed by the possibility expression.

Process expression is essentially a matter of differentiation and association. The possibility expression must differentiate each distinction in relation to the other distinctions and then associate distinctions to express each possible interacting combination and the new distinctions resulting from each interaction. The actuality expression actually associates distinctions in an interacting combination.

The possibility expression of physics is the natural laws and the existence of matter. Exactly which matter will get together when and where is the realm of the actuality expression. The laws of chemistry is the possibility expression and the interpenetrating flux of chemicals is the actuality expression. Cellular machinery and DNA is the possibility expression and nutrients, hormones and intercellular transmitters is the actuality expression. A computer and program is the possibility expression and data is the actuality expression.

1.2 The Invocation Model

The invocation model consists of variables, values, variable association rules and value transform rules. A variables expresses the place of a distinction. Every variable constantly asserts a value. The value is the second differentiating property of a distinction. A variable asserting its value expresses a unique distinction of the process. Variable association rules specify which variables are interactively associated with each other. Value transform rules specify which values are interactively associated with each other and what values will result from the interaction.

1.2.1 Variable Association Rules

The variable association rules specify which variables can interact. If two or more variables are associated then those variables are interactively proximate. If variables are not associated by any association rule then they are not proximate and cannot interact.

The association rules differentiate the variables by specifying exactly how each variable is interactively proximate with one or more other variables. Each variable has a place in the process universe and each is differentiated by its place of association in relation to the other variables. If an association rule states that all variables are or may be in interactive proximity then each variable has no particular place in relation to the other variables and there is no way to differentiate one variable from another. If an association rule states that no variables are associated then it doesn't matter whether variables can be differentiated, they cannot interact and are not expressionally significant.

1.2.2 Value Transform Rules

The value transform rules specify what values can interact. A value transform rule specifies a combination of values as the name of the rule and a set of result values. The combination of values that forms the name of a value transform rule specifies that the combination of values is interactively proximate and will interact. If a combination of values does not form the name of any value transform rule then that combination of values is not proximate and they will not interact. The result values of the rule specify the values that will result from the interaction.

Similarly to variables, values receive their differentiation and place in the interaction universe from the value transform rules. Only values that appear in value transform rule names are interactively proximate and then only in the combinations specified by the names. Values appearing both in value transform rule names and also as result values in other value transform rules form relationships among value transform rules that forge the structure of the value interaction universe and establish each value's place in it. A value is differentiated by its place in relation to all the other values in the process universe as specified by the set of value transform rules for the process.

1.2.3 Primitive Process Interaction

Associated variables (the variables are interactively proximate) asserting their values form a combination of distinctions. If the combination of asserted values forms the name of a value transform rule (the values are interactively proximate) then an interaction will occur. If two variables are in interactive proximity but their values are not in interactive proximity (the values do not form a value transform rule name) no interaction will occur. Conversely values can be interactively proximate but if their asserting variables are not interactively proximate no interaction will occur.

Like the sorcerer invoking his demons by name to perform his magical transformations a combination of distinctions forms the name of a transform rule name, the rule is invoked and the transformation occurs. Hence the invocation model.

1.2.4 Interaction Composition

The next stage of process expression beyond a single interaction among several possible interactions is the expression of a progression of dependent interactions each interaction being at a place in relation to all other interactions with each place of interaction having a set of possible interactions. The dependency relationships among the places of interaction are expressed as name formation dependency relationships. The name formed for one place of interaction depends on the result distinctions of one or more other places of interaction. The dependency relationship can be expressed as direct association relationship between the formable name at one place of interaction and the result distinctions from other places of interaction. It is still not possible to predetermine which distinctions will be asserted and which transform name will be formed at each place of interaction but it can be predetermined where the distinctions forming the transform name for each place of interaction will come from within the expression.

These dependency relationships form a network of association relationships of result distinctions to transform name forming combinations of distinctions among the places of interaction. It is this network of association relationships that provides each place of interaction with its place in relation to all the other places of interaction.

Figure 2:
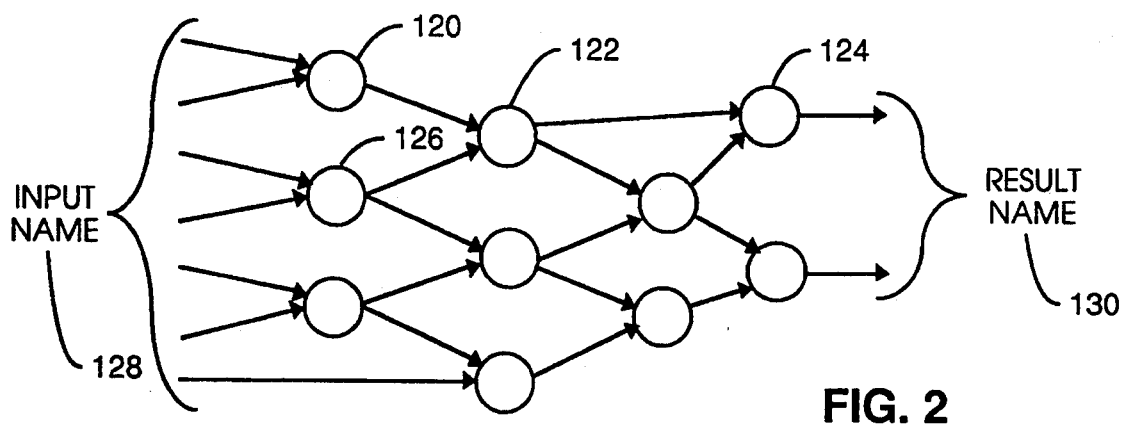
FIG. 2 shows a network of association relationships with no cycles.

FIG. 2 shows a network of association relationships with no cycles. Although any configuration of association relationships is possible this discussion will consider only directed association networks with no cycles.

Each individual place of interaction is expressed by its own possibility expression (e.g.,120,122,124 and 126) consisting of a set of value transform rules. These individual possibility expressions are combined into a larger composite possibility expression through the name formation dependency relationships. For example, possibility expressions 120 and 126 combine to form possibility expression 122. Most of the interactions receive their transform name distinctions from specified local places in the structure of associations. A few name forming distinctions, however, are not associated to any local places and they must come from someplace external to the structure of association relationships. These unassociated name values taken collectively are called the input name and are the composite actuality expression 128 for the composite possibility expression. A composite actuality expression 128 will also be referred to as the input name 128 for the composite possibility expression. The result values of the composite possibility expression will be referred to as the result name 130.

The composite possibility expression, including for example 120, 122, 124 and 126 is a complete stand alone specification of possibilities dependent only on its composite actuality expression. It is a larger self contained unit of expression (a possibility expression and an actuality expression) than the interaction.

These name formation dependency relationships among places of interaction can be expressed within the invocation model either in terms of value transform rules or in terms of variable association rules. This means that the model possesses two quite different but complementary domains of expression.

1.3 Two Domains of Expression

The value transform rules and the variable association rules provide the model with two domains of differentiation and interactive association. A process can be expressed almost exclusively in terms of differentiation and interactive association of values by value transform rules or almost exclusively in terms of differentiation and interactive association of variables by variable association rules. Between these two extremes there is a large intermediate landscape of cooperative expression with gradations of expression from each domain.

1.3.1 Pure Value Expression

At one extreme is the pure value expression for which all differentiation and interactive association is expressed in terms of values and is specified by value transform rules. Each distinction is a unique value and possesses a unique place in value space in relation to all other values. All interactive association is expressed by correspondence among combinations of these unique values, i.e., every value transform rule name in the process expression is unique. There is no differentiation in terms of variable association rules. Variables are all simultaneously associated or they associate indiscriminately. There is no way from the point of view of the variables to discriminate one interaction from another.

A natural example of this form of expression is a chemical reaction. The molecules are variables. The composition of each molecule determines its interaction possibilities and is its value. A liquid or gas is natures version of the association rule that specifies that there is no differentiation of variables. The variables (molecules) will indiscriminately associate in the liquid or gas and there is no way to tell one variable from another except by the value it asserts. The molecules get together forming transform rule names and interact to form new molecular values.

1.3.2 Pure Variable Expression

At the other extreme is the pure variable expression for which all differentiation and interactive association is expressed in terms of variables and is specified by variable association rules. Each distinction is a unique variable and possesses a unique place in variable space by virtue of its association relationships with other variables. All interactive association is specified by specifically associated variables. There is no differentiation in terms of value transform rules. There is a set of values and a set of spanning value transform rules, i.e., there is a transform rule for every possible combination of values. This means that all values in the expression are constantly in interactive proximity. There is no way from the point of view of the values to discriminate one interaction from another.

A natural example of this form of expression is a network of neurons. The artificial computer is also primarily of this form.

Within the model there must always be a bit of each domain in every process expression. There must always be variables that associate and there must always be values that form transform names. Nevertheless the two ends of the territory will be referred to as pure value and as pure variable.

1.3.3 The Intermediate Expression Territory

Expression in the intermediate territory between pure value and pure variable is a cooperative endeavor between variable differentiation and value differentiation. A very simple example of this cooperative expression is the representation of numbers with different bases. Base two numbers have only two values and very simple value transform rules (logical truth tables) but have lots of digits (variables) that must be properly associated. Base ten numbers have ten values and larger, more complex value transform rules (traditional addition and multiplication tables) but have fewer digits (variables) to be associated. There can be gradations of intermediate expression ranging from mostly in terms of value differentiation and value transform rules to mostly in terms of variable differentiation and variable association rules as shown below in Table 1.

TABLE 1

| pure value expression | intermediate expression | pure variable expression |
| --- | --- | --- |
| ← | | → |

1.4 Pure Value Expression

In a pure value expression there is no differentiation of variables. All differentiation is in terms of values and specified by value transform rules. Transform rules for this part of the discussion will be represented in the format of the transform name followed by the result values enclosed in brackets as shown below.

name [result, result, ...]

Consider an example expression with four distinctions differentiated by unique values A, B, C and D and two value transform rules that interactively associate those distinctions. A and B interact and transform into D. C and D interact and transform into B. The two transform rules for the example are shown in Table 2.

TABLE 2

| AB[D] | or | BA[D] |
|---|---|---|
| CD[B] | or | DC[B] |

The linear string representation makes it appear that ordering is significant when actually it is not. The input names AB and BA are the same name and are both specified for this example. There can be no order relationships among the values because there can be no order relationships among the variables when they are interactively proximate. They are simply two values interacting.

The value transform rule is the simplest most primitive form of process expression. No part of the rule can be reduced to simpler terms or be more precisely stated. The values are primitive and indivisible and the interaction result is complete in itself and unambiguous.

The value transform rules specify completely who does what with whom. As far as the variables are concerned anybody can do anything with anybody but in terms of the values only As can interact with Bs and only Cs can interact with Ds. As cannot interact with Ds nor Bs with Cs and so forth. There cannot be the A of this variable and the A of that variable because there is no this variable or that variable. Value difference is the only way to tell anything apart for this expression. A value expression can be elaborated and extended to more expressional complexity by adding more values and more value transform rules.

The result value specified by the transform rule for a pure value expression is a different value from the values forming the transform rule name so there is no ambiguity about when the interaction is complete. The name values disappear and the result values appear. These new values can form a new unique transform rule name with other values which results in another interaction and more new values which can form further unique transform rule names and so on. Each interaction possibility is dependent on one or more previous interactions to provide the values to form its transform rule name. The process progresses in a succession of fulfilled interaction possibilities determined by the formability of unique transform rule names.

The set of transform rules below in Table 3 illustrates a value expression that proceeds in a progression of unique name formation dependencies.

TABLE 3

| AB | [C, D] |
|---|---|
| CC | [D, E] |
| DD | [G, F] |

TABLE 3-continued

| EF | [F, G] |
|---|---|
| GG | [X, Y] |

If there are some As and Bs present they will begin interacting and generating Cs and Ds. The CC and DD interactions cannot occur until there are some Cs and Ds available. The CC and DD interactions will generate Es, Fs and Gs which will form the input names of the EF and GG, transforms will interact and finally produce Xs and Ys. For this process the possibility expression is the set of value transform rules and the variable association rule specifying that all variables are or will become interactively proximate. The actuality expression is the presence of the As and Bs.

The process is resolved in distinct discrete stages of interaction. The completion of each interaction is established by the presence of result values and the absence of transform name values for that stage. When Xs and Ys appear the resolution of the process is completed. It is deterministic and directional. It can't run backwards and start generating As and Bs. All of these characteristics are determined solely by the differentiation and interactive association of values as specified by the value transform rules.

1.4.1 Traditional Computation with Pure Value Expressions

The pure value expression is unfamiliar territory in the contemplation of process expression and computation but the following examples will illustrate that the while the pure value end of the expression territory is associated mainly with natural expressions such as chemistry, physics and biology it is a fully capable discrete computation environment.

There is in fact an important pure value expression system in the history of computational thought. This is the Roman numeral system without the subtractive principle. (This system delineates, for example, 9 as VIIII instead of IX). The digits of Roman numerals are generally presented in a certain order for convenient reading but without the subtractive principle the order has no significance to their meaning. No matter what arrangement the digits are presented in they represent the same number. Each digit of a number is a variable and each variable has a value. The variables have no particular association relationships among themselves. The meaning of each digit is differentiated entirely by its value. The magnitude of the number is determined solely by the values present. See Table 4 below.

TABLE 4

| Possible values are | M,D,C,L,X,V,I |
|---|---|
| Transform rules are | IIIII [ v ] |
| | VV [ X ] |
| | XXXXX [ L ] |
| | LL [ C ] |
| | CCCCC [ D ] |
| | DD [ M ] |

The only interactions possible in a Roman numeral expression are those specified by the value transform rules. Vs don't interact with Xs because there is no rule with the appropriate name. The above value transform rules are a complete expression of the process for addition of Roman numerals. Given two Roman numbers these rules will reduce them to a minimal single number representation. The numbers 1978 and 22 are used as examples (see below).

MDCCCCLXXVIII XXII

Figure 3:
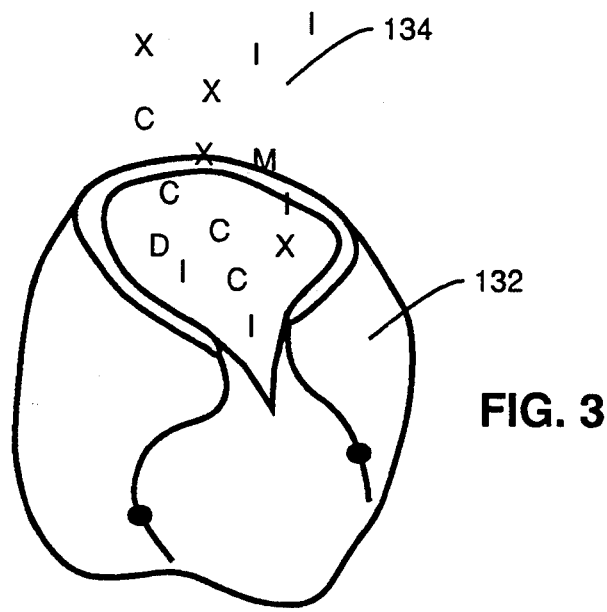
FIG. 3 illustrates a variable association rule as a bag that isolates variables and also keeps them together.

Referring now more particularly to FIG. 3, for example, to add the two numbers a person could simply throw the numbers 134 into a bag, 132 and shake. The bag 132 itself represents the variable association rule. The rule states that variables cannot wander off and that external variables cannot intrude. Shaking the bag 132 specifies that all variables will eventually associate. There is no variable differentiation. Variables associate indiscriminately and there is no way to tell one variable from another inside the bag 132 except by its asserted value 134. The possibility expression is the set of value transform rules and the bag 132. The actuality expression is the values 134 thrown into the bag.

The five Is will eventually get together and form the name IIIII. This will invoke the value transform rule IIIII and the five Is will transform into a V. There are then two Vs which will eventually make an X. The five Xs will make an L, the two Ls a C the five Cs a D and finally the two Ds an M. What remains in the bag are two Ms. No more interactions are possible because there are no value transform rules for Ms (see below).

*MDCCCCLXXVIII+XXII=MM.*

There are a couple of difficulties with this expression. It is not possible to determine when the expression inside the bag 132 is fully resolved either from inside or outside the bag 132. Also some of the transform rules require the confluence of five variables which might take a long time to occur. The Roman numeral system, however, was never intended to be autonomously resolving as it assumed a rather capable meta resolution environment that could get all the proper variables together and could tell when its resolution was done.

The following examples will demonstrate that isolated pure value expression can be fully and autonomously determinable. So that the reader can more easily follow the examples the expressions from now on will be various forms of binary integer addition. The next example (see Table 5) introduces the first form of this expression and is an expression whose transform rule names are never more than two values long.

TABLE 5

| Possible values are | A,B,C,D,E |
|---|---|
| Transform rules are | AA [ B ] |
| | BB [ C ] |
| | CC [ D ] |
| | DD [ E ] |

This expression behaves similarly to the Roman numeral expression. If it is assumed that A=1, B=2, C=4, D=8, E=16 it can be seen that these expressions are equivalent to binary numbers. A number is represented by specifying the appropriate values. As with the Roman numerals there is no significance to spatial arrangement of the variables. Numbers 134 are added by throwing them in the bag 132 and shaking (see below).

*DAC+BCA=EC;* 13+7=20

The above expression will complete more readily because no interaction requires the confluence of more than two variables but there is still no way for the expression to determine when it is completed. For an expression to establish its own completeness there must be a distinct last interaction. With the above expression there might not even be a first interaction (see below).

*AC+BD=ABCD*

Combining these two numbers directly results in a minimally represented number without any interactions at all. If no interactions occur there can be no last interaction to indicate completion.

To guarantee the completeness of a progression of interactions there must be a guaranteed completeness to the form of the values entering into the interactions. Completeness in this case means expressing the insignificant place values as well as the significant place values of the number. Another character will be attached to each value to indicate its significance or insignificance. 1 means a value is significant and 0 means it is insignificant. So now AC would be represented as A1C1B0D0E0 or E0D0C1B0A1 since order does not matter. The number of distinct values has simply been increased to achieve more expressional differentiation.

Each input number must now be represented by five variables and it can be guaranteed that there will be an interaction for each possible place value whether that place value is significant or not. This is simply a convention of name presentation among processes. As will be seen each process can individually and locally maintain the convention. With cumulative local support it becomes a collective global convention. There is still no order relationship imposed on the variables.

For the new example the possible values may be coded with two characters (see Table 6).

TABLE 6

| Possible values are: |  |
|---|---|
| E0,E1,D0,D1,C0,C1,B0,B1,A0,A1 | |
| Transform rules are: | |
| A0A0 [ B0,A0 ] | B0B0 [ C0,B0 ] |
| A0A1 [ B0,A1 ] | B0B1 [ C0,B1 ] |
| A1A0 [ B0,A1 ] | B1B0 [ C0,B1 ] |
| A1A1 [ B1,A0 ] | B1B1 [ C1,B0 ] |
| C0C0 [ D0,C0 ] | D0D0 [ E0,D0 ] |
| C0C1 [ D0,C1 ] | D0D1 [ E0,D1 ] |
| C1C0 [ D0,C1 ] | D1D0 [ E0,D1 ] |
| C1C1 [ D1,C0 ] | D1D1 [ E1,D0 ] |
| | E0E0 [ E0 ] |
| | E0E1 [ E1 ] |
| | E1E0 [ E1 ] |
| | E1E1 [ E0 ] |

The integer addition example now looks like:

*E0 D1 C1 B0 A1+E0 D0 C1 B1 A1=E1 D0 C1 B0 A0;* or

13+7=20

To resolve the expression one still just throws all the variables 134 into a bag 132 and shakes. As interact only with As, Bs with Bs, Cs with Cs, Ds with Ds and Es with Es. Each interaction generates a unique carry value which will interact with its corresponding values until no more interactions are possible. If the two input numbers are represented as five variables with each variable asserting a different one of the five flavors of value; Ax,Bx,Cx,Dx,Ex then the rules guarantee that the result will be a similar number of five variables. The convention of name presentation to the expression is maintained by the asserted results of the expression which will be presented to another expression. If each expression similarly maintains the name presentation convention then it becomes a global convention.

Even with this regularity derived from the completeness of the presented name it is still not certain when the resolution of the process is complete. The E rule will be invoked twice, once for the input values and once for the carry value from the D rule. There is no way to tell which invocation is the last one.

To eliminate this ambiguity separate distinctions and value transform rules must be specified for the input interactions and the carry interactions. Then there can be a definite last interaction which will be the carry into the E interaction.

Because of minor combinatorial explosion of the possible distinctions in this next example the values will be presented in two parts. The characters for the positional flavor and positional assertion are represented by two separate tables. For instance the transform rule presented as AxAx[SBy,Az] when expanded in relation to the x x>>y z table really represents four separate transform rules; A0A0[SB0,A0], A0A1[SB0,A1], A1A0[SB0,A1] and A1A1[SB1,A0] (see Table 7 below).

TABLE 7

| Possible values are: |
| --- |
| Dx,Cx,Bx,Ax |
| UDx,UCx |
| TDx,TCx,TBx |
| SDx,SCx,SBx |
| RDx, RCx, DONE x = 0,1 |

| Transform rules are: precedence of occurrence relationships | transform | rule |
| --- | --- | --- |
| 1 | AxAx | [ SBy,Az ] |
| 1 | BxBx | [ SCy,TBz ] |
| 2 | SBxTBx | [ RCy,Bz ] |
| 1 | CxCx | [ SDy,TCz ] |
| 3 | SCxRCx | [ UCz ] |
| 4 | TCxUCx | [ RDy,Cz ] |
| 1 | DxDx | [ TDz ] |
| 5 | RDxSDx | [ UDz ] |
| 6 | TDxUDx | [ Dz, DONE ] |

| for all rules | x | x | >> | y | z |
| --- | --- | --- | --- | --- | --- |
| | 0 | 0 | >> | 0 | 0 |
| | 0 | 1 | >> | 0 | 1 |
| | 1 | 0 | >> | 0 | 1 |
| | 1 | 1 | >> | 1 | 0 |

The integer addition example now looks like:

| E0 D1 C1 B0 A1 + E0 D0 C1 B1 A1 |
| --- |
| = |
| E1 D0 C1 B0 A0 DONE |

The new R, S, T and U values separately track the carry values and the carry interactions. The DxDx rule is the input interaction and the TDxUDx rule is the carry propagation into D which is necessarily the last interaction. The result looks just like the previous result except that a new result value, DONE, is confidently generated by the last interaction.

All of the additional complexity of specification to achieve complete control is just a matter of more distinctions and more value transform rules that track intermediate values through the interactions to establish a consistent and regular behavior that possesses a distinct last interaction. It is just more differentiation and association. No new concepts or primitive elements needed to be introduced. Control is not a primitive of process expression. It emerges from the defined expressional primitives of the model properly arranged. It is just extra expression beyond what is required to simply transform the process proper information.

A familiar process has been expressed with full generality in a pure value environment. The expression is complete and self contained. Given the values, the transform rules and the variables it will proceed quite independently and autonomously in an orderly progression of distinct interactions leading to a distinct last interaction which determines completion. There is no ambiguity in its behavior and it needs no external assistance to effect its resolution.

1.5 Name Formation Dependency Relationships

How an input name is expressed and resolved depends on the resolution resources available. If a very large number of value transform rules with names eight values long were available then the example process could be expressed and resolved in a single interaction. The example, however, uses value transform rules with names only two values long. Consequently the expression can not be resolved in a single interaction.

An input name that is too long to be resolved in a single interaction must be resolved a piece at a time by a necessarily dependent progression of multiple interactions each resolving a smaller input name which is a piece of the larger input name. The eight value input name had to be broken up into 4 separate input interactions. The results of these input interactions must be combined to form input names for inner interactions and so on until the proper result values for the eight value input name are determined. The inner interactions depend on the results of the input interactions to form their input names. This dependence of the formation of the input name for one interaction on the result of one or more other interactions is name formation dependency. In a pure value expression name formation dependency relationships are expressed by correspondence between result values and value transform rule name values.

In the last example above for instance the transform rule named RDxSDx is really four transform rules RD0SD0, RD0SD1, RD1SD0 and RD1SD1. Only one of these input names will be formed and the corresponding rule invoked. Which name is formed depends on the CxCx rule which will result in SD0 or SD1 and the TCxUCx rule which will result in RD0 or RD1. The results of these two interactions will form one of the four names of the RDxSDx rules. Within the context of the expression the values to form an RDxSDx name cannot come from anywhere else but the resolution of a CxCx interaction and of a TCxUCx interaction. The RDx of the RDxSDx transform name is a direct association to the RDx result value of the CxCx transform rules.

The precedence of occurrence relationships, for the example as graphically shown in FIG. 4 and shown in textual form in Table 8 below), indicates the order in which interactions can occur for the resolving pure value expression.

TABLE 8

| Interaction stage | | | | | |
| --- | --- | --- | --- | --- | --- |
| 1 | 2 | 3 | 4 | 5 | 6 |

TABLE 8-continued

| Interaction stage | | | | | | |
|---|---|---|---|---|---|---|
| Ax | Ax | Ax | Ax | Ax | Ax | Ax |
| Ax | SBx | Bx | Bx | Bx | Bx | Bx |
| Bx | TBx | RCx | | | | |
| Bx | SCx | SCx | UCx | Cx | Cx | Cx |
| Cx | TCx | TCx | TCx | RDx | | |
| Cx | SDx | SDx | SDx | SDx | UDx | Dx |
| Dx | TDx | TDx | TDx | TDx | TDx | DONE |
| Dx | | | | | | |

This order is determined by the input name formation dependency relationships of the expression embodied in the value transform rules (see Table 9).

TABLE 9

| Transform rules are: | | |
|---|---|---|
| precedence of occurrence relationships | transform | rule |
| 1 | AxAx | [ SBy,Az ] |
| 1 | BxBx | [ SCy,TBz ] |
| 2 | SBxTBx | [ RCy,Bz ] |
| 1 | CxCx | [ SDy,TCz ] |
| 3 | SCxRCx | [ UCz ] |
| 4 | TCxUCx | [ RDy,Cz ] |
| 1 | DxDx | [ TDz ] |
| 5 | RDxSDx | [ UDz ] |
| 6 | TDxUDx | [ Dz, DONE] |

The stage 1 interactions 136, 138, 140 and 142 can all occur simultaneously or at any time. Stage 6 interaction 152 is guaranteed to be the last interaction. The input name formation dependency relationships in the expression fully express all the possible concurrency. For instance the TCxTCx input name cannot be formed and the interaction 148 will not occur before the CxCx and SCxRCx interactions occur. Even though the CxCx interaction 140 can occur immediately the interactions dependent on it 140, 150 and 152 140, 150 and 152 will not occur until CxCx interaction 140 occurs. The control aspect of the expression is complete and general. No matter how long it takes for each interaction to occur, the expression will resolve correctly and completion of resolution can be determined by the assertion of the DONE value. The DONE value can perhaps open the bag and deliver the result.

This progression of interactions 136 through 152 could resolve in a soup of just the eight input variables. Each interaction has two input values and produces one or two result values. There will never be more that eight values asserted at any instant and there are only five result values. This view of resolution of the expression has the eight variables changing their asserted values as the interactions occur. Two variables get together, realize that they form a transform name and change their asserted values to effect the result values of the transform rule. So the input variables are also the result variables. The previous Table 8 illustrates the value populations after each interaction stage and which is also illustrated in graphical form in FIG. 4.

Before the first interaction stage 136, 138, 140 and 142 there are four interactable names. After the first interaction stage the only interactable name is SBxTBx. After the next stage 144 the only interactable name is RCxSCx and so on. The result values are isolated from the input variables by the event of the interaction. When AxAx interacts 136 the input values disappear and the result Ax appears. There are no more Axs and Ax does not enter into any other transform name so it cannot interact further. When the DONE value is generated 152 there are one each of Ax, Bx, Cx, Dx and DONE laying around that cannot interact further and these constitute the result values.

1.6 The Need For Null Values

If one assumes conservation of variables, which is not a necessary assumption, then of the eight input variables only five are needed to assert the result values leaving three variables that are essentially expressional waste. These three variables must assert some value that is not relevant to the expression. For instance if the RCxSCx interaction generated UCx and also Bx the extra Bx would form a transform name with the result Bx or one of the input Bxs which in either case would mightily confuse the resolution of the expression. So these three left over variables must assert values different from the values of the expression which are meaningless to the expression. These meaningless values will be called NULL values.

A NULL value for a pure value expression is any value not specified in the set of value transform rules. The example expression can resolve in a veritable sea of variables as long as all the other variables except the eight input variables are asserting NULL values. The environment that an input name is formed in must be in an initial state in which all values of all proximate variables are NULL to the expression.

What is NULL to one pure value expression might be quite meaningful to another pure value expression. So there could be many process expressions resolving quite independently in a single frothing sea of variables. This is the form of expression in the cytoplasm of the living cell. The specificity of interaction of the proteins supports the intermingled expression of many distinct and independent processes resolving simultaneously.

1.7 Pure Variable Expression

In the previous examples the differentiation of distinctions and association relationships that expressed an orderly process were specified entirely in terms of value differentiation and association by value transform rules. The variables themselves were indiscriminately associated and did not contribute to the differentiation of the expression. They served simply as the medium of differentiated value assertion adequately available whenever needed. What is the nature of a process expression that expresses differentiation of distinctions and association relationships in terms of variables and variable association rules.

A pure variable expression has quite different properties from a pure value expression. To explore these differences directly the first example pure variable expression will be derived directly from the last example pure value expression of binary addition by replicating the name formation dependency relationships of the example pure value expression.

A pure variable expression is expressed in terms of direct association relationships among the variables. Each variable is differentiated by its association place in relation to all other associated variables. These association relationships must be constant so a pure variable expression is a rigid and unchanging structure of associated variables. What can change within this structure is the values that the variables assert. Each variable can assert two or more values so that different value transform names can form within the structure of association relationships. As the formed names are resolved, the result values form new names which are in turn resolved. A resolving pure variable expression might be viewed as values flowing through a structure of variable association relationships while a resolving pure value expression might be viewed as variables flowing through a structure of value association relationships.

The essential feature of a pure variable expression is that a variable can only assert one value at a time so each variable must be associated with a mutually exclusively asserted value set in the expression. A mutually exclusive value set is a set of values of which only one value can be asserted at a time. These value sets are represented in the value transform rules of the pure value example (FIG. 4) by the x, y and z suffixes. For instance SCx means that the asserted value can be either SC0 or SC1 but not both.

This means that there must be at least one variable assigned to assert each mutually exclusive value set in the expression. This further means that the value transform rules cannot be presented as they were presented for the pure value expression where a single interaction can produce two result values. A pure value interaction resulting in two result value sets must be expressed as two pure variable interactions with two variables each asserting one result value set.

If a variable must assert the result value of an interaction it must also be the locus of that interaction; i.e., the input name for the interaction must be formed by direct association relationships between the variable asserting the result value and the variables asserting the input values that form the transform rule name. The result asserting variable itself must recognize the formed input name and assert the appropriate result value. So each variable is a locus of value transform interaction. This means that a value transform rule set as well as the mutually exclusive result value set must be associated with each variable.

Figure 4:
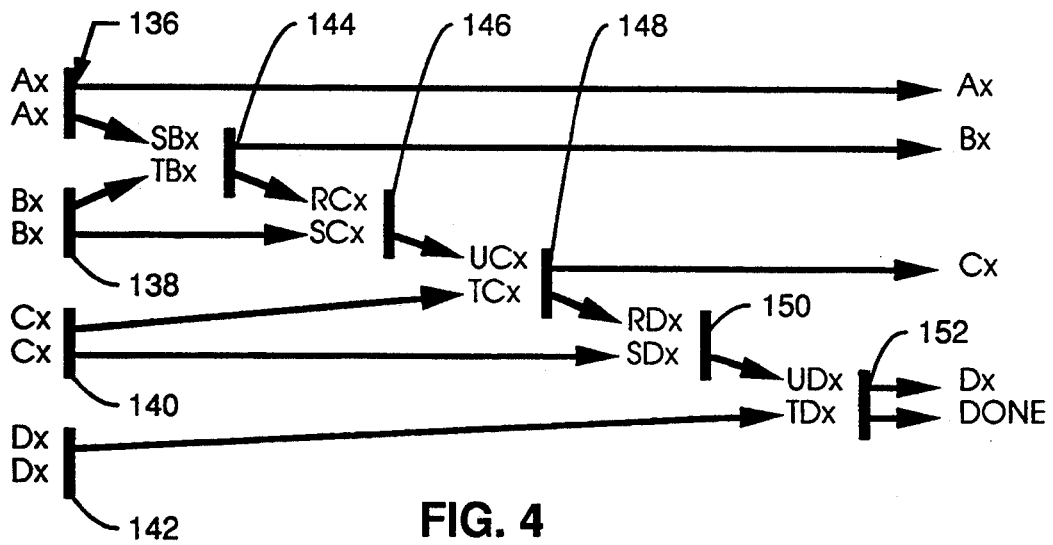
FIG. 4 illustrates the precedence of occurrence relationships among interactions for the example process.
Figure 5:
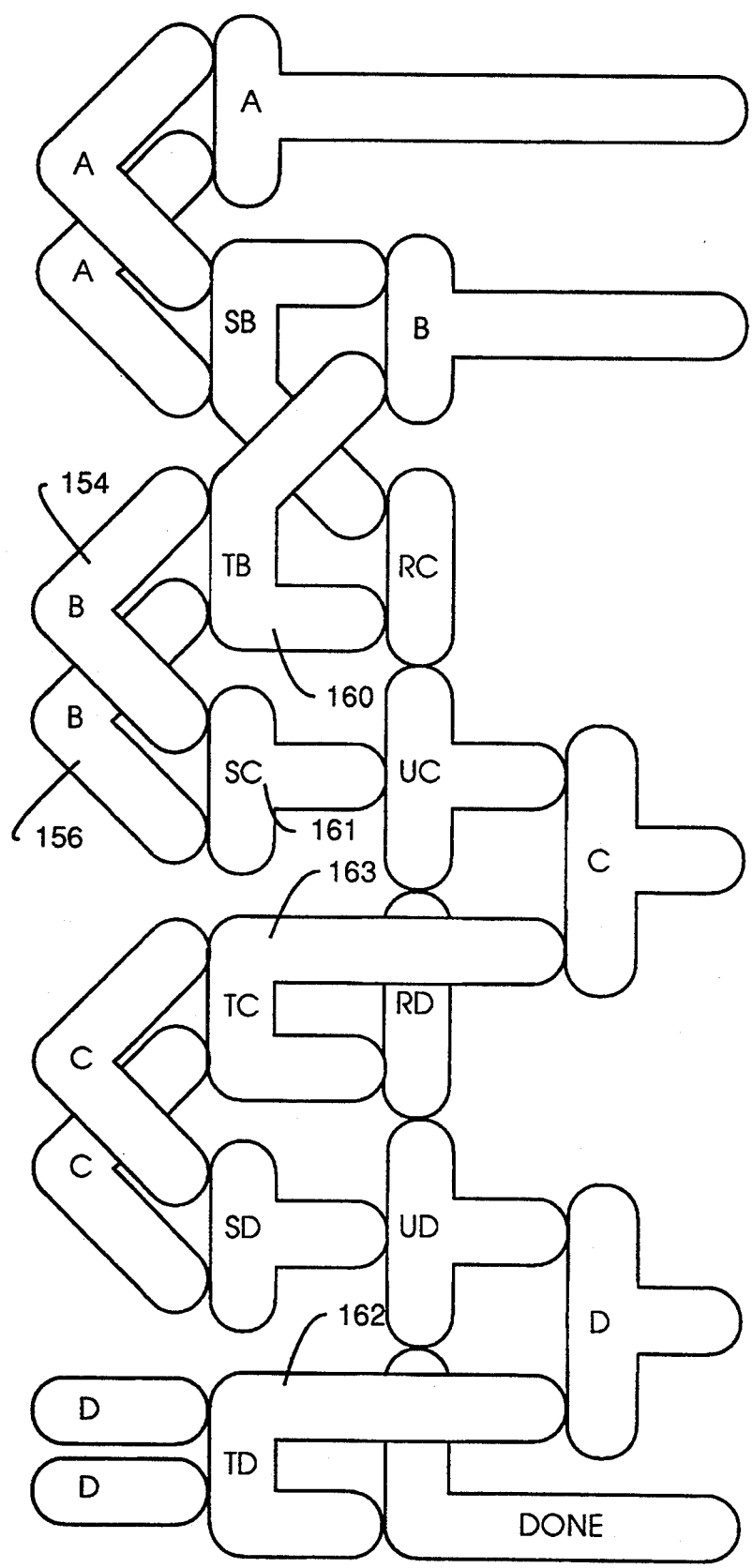
FIG. 5 shows a rigid structure of interacting variables that might be expected to express the example process.

For instance the transform rule set BxBx[SCy,TBz] from the pure value expression (FIG. 4) must be broken into two rule sets and each rule set associated with a different variable as shown in FIG. 5. For the rule BxBx[SCy] the two input variables 154 and 156 will be associated with one variable 161 which can assert SC0 or SC1 and will be identified as SC in the expression diagram of FIG. 5 and for the rule BxBx[TBz] the two input variables 154 and 156 will be associated with another variable 160 which can assert TB0 or TB1 and will be identified as TB in FIG. 5.

Now that the value transform rule has been split there are two variables 160 and 161 that must recognize the same asserted input name so the variables 154 and 156 asserting the input name must be directly associated to both result value variables 160 and 161 so the two input variables BxBx 154 and 156 have to be associated with both the SCx variable 161 and the TBx variable 160 in a fanout configuration.

FIG. 4 shows the name formation dependencies of the pure value expression and FIG. 5 shows the complete example of the preliminary pure variable expression derived from the pure value expression. Each enclosed area is a variable. Each variable is labeled with the value set it can assert such as TB, TC etc. Variable TD 162 can assert TD0 or TD1. Association relationships between the variables are represented by touching boundaries. The diagram itself expresses the variable association rules.

The example pure variable expression (FIG. 5) was fairly straight-forwardly derived but it will not work as it is presented. The nature of interaction for the pure variable expression is quite different from the nature of interaction for the value expression. The nature of the variables and values haven't changed but the nature of their relationships is different. Discovering why this expression will not work and what is required to make it work will serve to introduce the pure variable expression and to illustrate the differences between the pure variable expression and the pure value expression.

1.7.1 Continuously Interacting Structure

Figure 6:
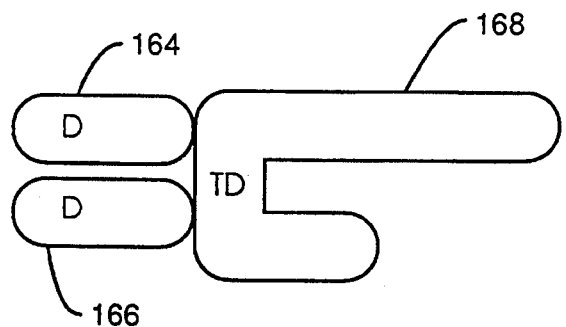
FIG. 6 illustrates the relationships between input variables and the result asserting variable.

The variable association rules specify that the associated variables are interactively proximate permanently and continuously. In the portion of the example shown in FIG. 6 the two input Dx variables 164 and 166 are not associated and cannot see each others asserted values. The TD variable 168, however, can see both of the input D values 164, 166 and respond to the input name formed by the values asserted by the two variables and assert the result value 168 for the formed name.

After TD recognizes a D,D input name and transforms its own value the association relationships among the variables do not change. TD 168 is continuously seeing any input name formed by the two input Ds 164, 168 and it must continuously respond to that formed input name. TD 168 cannot not assert a value. Nor can it just assert some nondescript value if it does not recognize a transform name. It must be always recognizing an input name and asserting a result value. Therefore there must be a set of value transform rules that span all the possible input names that can be formed by the input Ds.

Because a variable is always asserting a result value in relation to a formed input name, for a result value to be stably asserted the input name seen by the resolving variable must be stably maintained. In other words the input Ds 164, 166 must maintain their asserted values if TD 168 is to maintain its asserted result value. TD's 168 asserted result value contributes to an input name for another variable in the expression and must itself be stably maintained. This continues through the entire expression until all the variables of the expression have interacted and asserted the proper result values. So all the input values must be stably maintained until the entire expression is resolved.

These resolution properties are quite different from those of a pure value expression. An interaction in a pure value expression occurs only when a value transform name is formed. The input values that formed the input name disappear and the result values appear marking a distinct progress event in the resolution of the expression. These new values are inherently asserted by their variables until they form new input names and themselves disappear in a new interaction. The pure value expression inherently resolves in a progression of discrete events ending with the assertion of unambiguous result values. The pure variable expression on the other hand is continuously resolving and asserting result values and this creates several difficulties with process expression.

1.7.2 Name Formation Ambiguity

Figure 7:
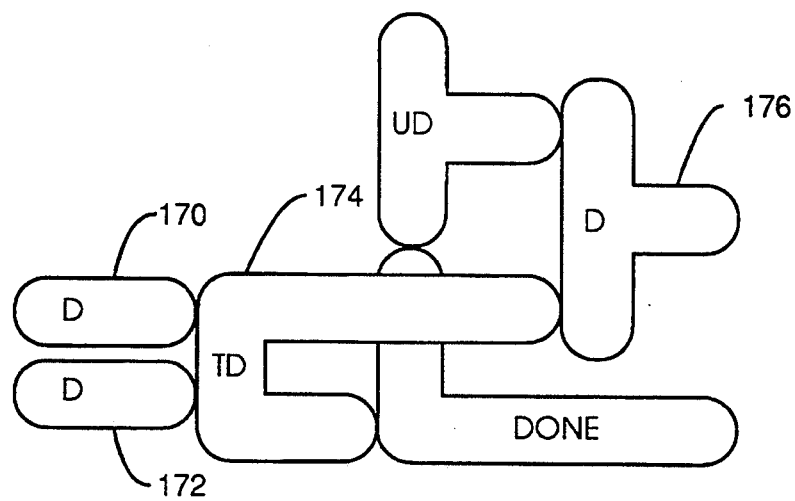
FIG. 7 illustrates the difficulty directionality of interaction between directly associated variables.

The problem with the continuous resolution nature of the variable expression is that the example pure variable expression exhibits ambiguity of input name formation and direction of result propagation because of the reuse of a value set. The portion of the example shown in FIG. 7 illustrates the difficulty.

Variables do not posses any inherent directionality of interaction. There is no input end or output end to a variable. Variable TD 174 is associated with the input D variables 170, 172 as well as the result D variable 176. Clearly there are input D values 170, 172 and result D values 176 but there is no way for the TD variable 174 to know which variable a D value comes from. The TD variable 174 can see three D values while its value transform rules only recognize names with 2 D values. Which two of the three values are to constitute the input name? What result value should the TD variable 174 assert when there are several simultaneously valid two value D input names visible to it? The result D variable 176 is having a backwards influence on the TD variable 174

The D variables 170, 172, 176 have been referred to as input and result because that was their role as mapped from the pure value expression where they were indeed unambiguous input and result values. Because of the discrete event nature of the resolution of the pure value expression the input D values 170, 172 did not get mixed up with the result D value 176

This ambiguity of name formation is why the example expression will not work. The result values can get confused with the input values in name formation and asserted values can influence interactions backwards in the expression. This is not an invalid form of expression. Most physical structures of nature are nondirectionalized associations of variables. The particles of atoms, the atoms of molecules and gravitational systems are pure variable expressions with continuous interaction pulsing through their structure in all directions simultaneously.

This discussion, however, is concerned with process expressions that proceed in a more or less orderly manner to a more or less definite result. So strict directionality of interaction influence must be imposed on the pure variable expression.

1.7.3 Need for Value Isolation

Figure 8:
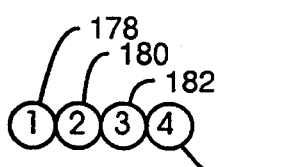
FIG. 8 illustrates how many isolation variables must be between any two variables that assert the same value set.

The only way to establish directionality within the defined model for a pure variable expression is to isolate the input values from the result value with different value sets. All variables directly associated must assert different value sets. In the FIG. 8 it can be seen that variables 1 and 3 , 178, 182 respectively cannot assert the same value set without confusing variable 2 180. Only 1 and 4 174 and 184 respectively can assert the same value set without forming ambiguous input names for 2 or 3 180 or 182 respectively. So there must be at least three sets of value transform rules with nonintersecting value sets to directionalize a variable expression and variables asserting identical value sets must be at least three associations apart.

It can be seen in the example, shown in FIG. 5, that several variables violate this rule. It is obvious that the result values can get mixed up with the input values through the variables TB, TC and TD 160, 163 and 162 respectively. The only way to fix this ambiguity is to isolate the assertions of identical value sets by inserting extra buffering variables into the expression that assert different value sets.

This may seem a complex requirement to impose on an expression but the problem in general is quite simply solved. By adding enough variables to an expression and choosing two value sets that the process expression proper does not use it can be assured that there are always two variables between each variable asserting a process expression proper value and hence the use of any identical value set by the process expression proper will always be three variable associations apart. These two in-between variables with their value sets can be formed into a standard directional association unit through which all process expression proper variable associations are formed. This standard association unit will be called an interaction locus.

1.8 The Interaction Locus

The interaction locus isolates its input value associations from its result value associations and establishes directionality of interaction for pure variable expressions. It doesn't matter what value sets are used inside the locus as long as they are different from the value sets used by the process expression proper.

Figure 9:
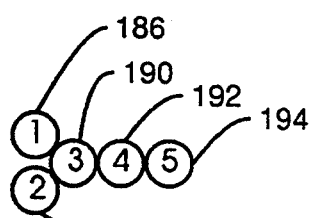
FIG. 9 illustrates how variables can be arranged in a standard association unit called an interaction locus that isolates identical input and result value sets.

The example shown in FIG. 9 illustrates the interaction locus. Variables 3, 4 and 5, 190, 192 and 194 respectively are the interaction locus. Variables 3 and 4, 190 and 192 respectively are the isolation variables. Variable 5, 194 is the result variable. Variables 1 and 2, 186 and 188 respectively are input variables to the interaction locus which may be the result variables of other interaction loci. Variables 1, 2 and 5, 186, 188 and 194 respectively are process expression proper variables which will assert the value set 0, 1. Variable 3, 190 will assert the value set X, Y. Variable 4, 192 will assert the value set S, T. The following value transform rules sets will be associated with each variable (see Table 10 below).

TABLE 10

| Variable 3 | Variable 4 | Variables 1,2,5 |
|---|---|---|
| 00[X] | X[S] | S[0] |
| 01[Y] | Y[T] | T[1] |
| 10[Y] | | |
| 11[X] | | |

Variable 3, 190 only recognizes input names of 0, 1 and asserts result values X, Y. It embodies the value transform rules for the whole interaction locus. Variable 4, 192 only recognizes input names X, Y, and asserts result values S, T. Variables 1, 2, and 5, 186, 188 and 194 respectively only recognize input names S, T and assert result values 0, 1. An x asserted by variable 3, 190 will result in a 0 asserted by variable 5, 194. A y asserted by variable 3, 190 will result in a 1 asserted by variable 5, 194.

The interaction locus establishes directionality of interaction with a convenient and uniform convention by isolating the input values from the result values of an interaction. The process expression proper variables 1, 2 and 5, 186, 188 and 194 respectively all recognize and assert the same value set but their values never get mixed up because they are all isolated from each other by the isolating variables of the interaction locus. The interaction locus recognizes the value set 0, 1 as input values and asserts the value set 0, 1 as result values.

Figure 10:
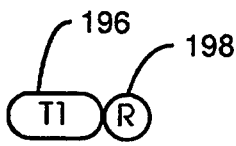
FIG. 10 shows one way to graphically represent an interaction locus.

Different transform sets can be assigned to variable 3, 190 of the interaction locus to provide interaction loci with different name transformation functions. Variable 4, 192 is just a buffer variable always associated with variable 3, 190 and variable 5, 194 is the result assertion variable always associated with variable 4, 192 so the three variables can be considered as a single unit of expression. The expression unit can be identified by the transform rule set associated with it. A directionalized rendering of an interaction locus might look something like the diagram shown in FIG. 10.

Figure 11:
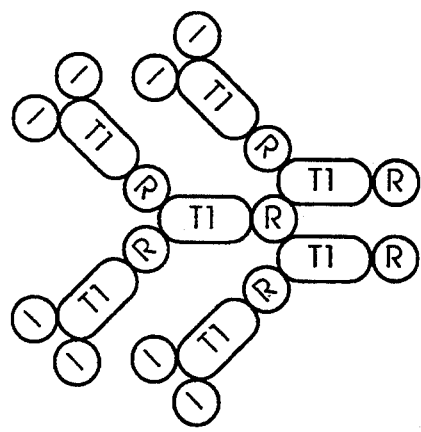
FIG. 11 shows how several interaction loci can be directly associated to render a larger process expression.

The oval, 196 represents the isolation variables and is the part of the interaction locus that will receive and recognize the formed input names. T1, 196 represents the transform rule set associated with the interaction locus. R in the circle, 198 represents the result assertion variable of the interaction locus. The oval, 196 is the input end and the circle, 198 is the output end. An expression of associated loci might look like the diagram shown in FIG. 11. The elements with I are the input variables asserting the input name to the expression.

Figure 12:
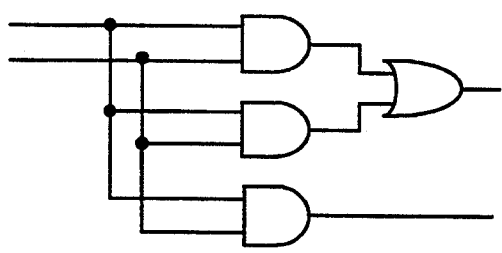
FIG. 12 shows that the standard graphic form of representing logic circuits is identical to the more general form developed from the theory.

A little graphic stylizing will provide a more familiar look to the expression, as shown in FIG. 12. Each interaction locus value transform set can be represented by a different shape and that shape can explicitly indicate the direction of interaction. The result variables can be drawn out into long thin connecting lines. With the convention of the interaction locus a pure variable expression can be viewed in the familiar terms of interconnected transform elements or function elements.

The interaction locus establishes directionality of interaction with a convenient and uniform convention by isolating the input values from the result values of an interaction. Real world examples of interaction loci include the electromagnetic switch, the electronic tube and the transistor. For the electromagnetic switch the input current value influences a magnetic field value which influences the physical position value of the switch which influences the result current values. Identical input and result value domains are isolated by two different value interaction domains just like the interaction locus derived within the model. For the tube, electron flow in an input wire influences a charge in a vacuum which influences the electron flow in the vacuum which influences the electron flow in the result wire. The input and result of a transistor is similarly isolated by different physical interaction domains.

1.8.1 The Interaction Locus as a Bounding Convention

The interaction locus is a bounding convention. It encapsulates an expression that can be quite arbitrarily represented itself but which presents a specific convention of interactive behavior to all other interactive elements participating in the convention. This bounding convention establishes the first instance of what might be called from one viewpoint an imposed expressional abstraction or from another viewpoint an emergent expressional facility. In either case it establishes a uniformity and regularity that makes the whole considerably more than the sum of its parts.

If one looks at a pure variable expression variable by variable as just associated variables the interaction loci might not be at all evident. There is no guarantee in any expression that all the interaction loci look the same. The only requirement is that the boundaries look the same to each other. Their insides may vary dramatically. In a modern computer for example the transistor circuits that implement a logic gate may vary dramatically between chips made by different manufacturers. Some interaction loci have magnetic values inside and some have mechanical values inside some have electronic values inside. Imagine an expression of a processor made from chips from different manufacturers expressed solely in terms of transistors, capacitors and resistors with no clue as to where the boundaries of logic value expression were or that logic values had anything to do with the expression. Without the overlay of logic gates on the expression it would be just a huge network of electronic elements and extremely difficult to understand.

But the overlay is exactly that. There is nothing intrinsically "real" about it. It is just a convention that must be maintained among consenting expressional elements. The interaction locus is an imposed regularity and uniformity that imparts an abstract level of meaning to the expression that the individual variables can know nothing about and cannot anticipate the existence of. It allows an expression of complex meaning the possibility of which could not be projected from the nature of the variables and values themselves.

Interaction bounding conventions both directional and nondirectional arise spontaneously in nature. Atoms are one form of nondirectional interaction convention establishing uniform interaction boundaries around already complex associations of variables. Living cells exhibit directionality in terms of values. Certain value molecules are permitted into the cell and certain value molecules are excreted and asserted by the cell. Receptor proteins have a distinct input end and output end and allow molecular information to pass into the cell without the actual molecules passing into the cell. Neurons exhibit interaction locus type directionality in that specific places on the cell are input places (dendrites) and specific places on the cell are result places (axon) and the result places do not get confused with the input places.

1.9 Directly Associable Interaction Loci

The example process can now be expressed in terms of associated interaction loci and rendered entirely in terms of the value set 0, 1. The following three interaction loci value transform sets, shown in Table 11, will be defined and will be called ADD, CARRY and DONE. Ignore for the time being that the DONE transform set is a nonfunctional tautology.

TABLE 11

| ADD | CARRY | DONE |
| --- | --- | --- |
| 00[0] | 00[0] | 00[1] |
| 01[1] | 01[0] | 01[1] |
| 10[1] | 10[0] | 10[1] |
| 11[0] | 11[1] | 11[1] |

Figure 13:
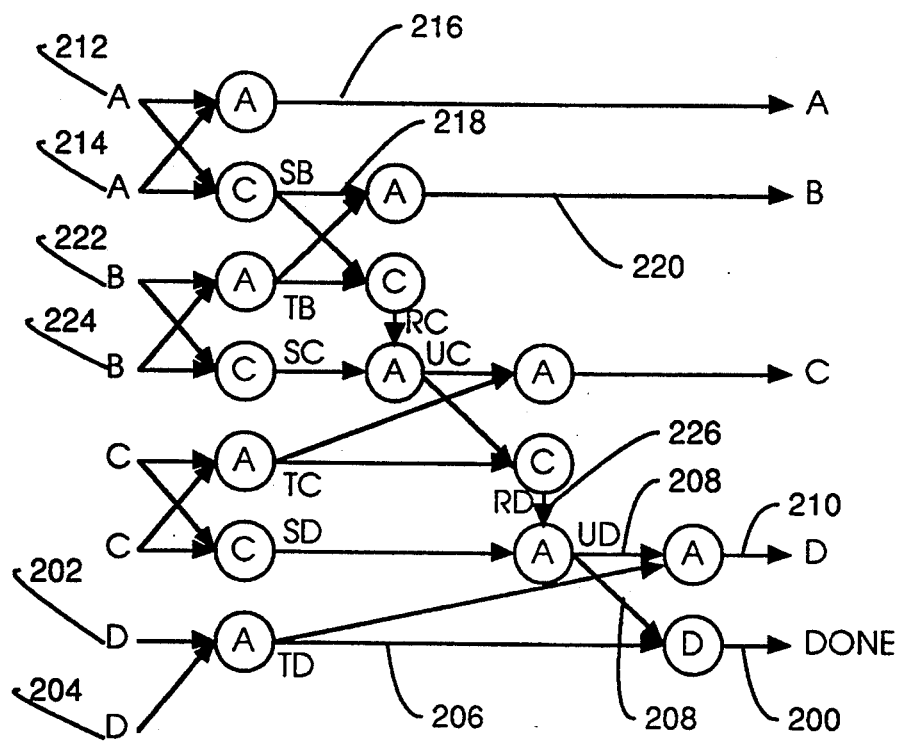
FIG. 13 is a directly associated expression with interaction loci which still cannot determine its own completion.

FIG. 13 is a diagram of this expression. The ADD locus is A. The CARRY locus is C. The DONE locus is D. The variable type labels are attached to the interconnecting result variables in the example to show this example's correspondence with the previous examples. It will be seen that there is a one to one correspondence between the variables of the preliminary variable expression example shown in FIG. 5 and the interaction loci of this example, shown in FIG. 13. What were directly associated variables in the initial example are now directly associated interaction loci in the same association relationships.

The expression of FIG. 13 still is not an autonomous expression. Names are always formed and interaction activity is occurring continuously. There are no necessary and discrete interaction events. If several transform rules in an expression specify the same result value then it is possible for a new input name to form and no change event at all to occur in the expression. There can be no guaranteed last event in the resolution of the expression and the DONE interaction locus, 200 cannot even begin to do its job. The completion of a resolution cannot be determined in terms of the expressions own resources.

1.10 The Need for a Null Value

The essential problem is that there is no inherent way for an expressional element to become meaningless within the context of a pure variable expression. All variables are constantly associated and all values are constantly forming valid input names and interacting. Elements of a pure value expression, on the other hand, can disappear from the expression and become meaningless by suddenly asserting some NULL value that is not part of a value transform rule name of the expression and become meaningless to the expression.

Elements of a pure variable expression cannot just drop out of the expression. The variables are locked in a rigid association structure and any value that they assert is inevitably influential in the expression and the expression must account for them. Every possible formed input name must be accounted for by a value transform rule set. There are no inherently meaningless values so a value must be explicitly assigned to be meaningless. This meaninglessness must be explicitly recognized by the value transform rule sets and be integral to the expression. The value assigned to express meaninglessness will be called the NULL value.

The introduction of a NULL value can resolve the problem of resolution completion. The NULL value essentially allows each variable to express meaninglessness within the structure of associations. The basic strategy for the value transform rules is to specify a NULL result value if their input name includes a NULL value. In this manner formed input names can be recognized as valid or invalid. A valid input name is one with no NULL values. So although there are always input names formed and recognized, an invalid input name can suddenly become a valid input name. The variable recognizing this suddenly valid input name will transform its asserted result value from NULL to a nonNULL result value providing a distinct resolution progress event.

The following set of transform rules, shown in Table 12, applied to the example expression will allow the assertion of the DONE value to be a distinct event in the resolution.

TABLE 12

| ADD | CARRY | DONE |
|---|---|---|
| 00[0] | 00[0] | 00[1] |
| 01[1] | 01[0] | 01[1] |
| 10[1] | 10[0] | 10[1] |
| 11[0] | 11[1] | 11[1] |
| anyNULL[NULL] | anyNULL[NULL] | anyNULL[NULL] |

The expression must begin with all asserted values in the expression being NULL including the input values. For the pure value expression this requirement was simply that no values defined in the expression were asserted in the variable soup. If there were any defined values initially asserted besides the input name values the resolution would be confused. The pure variable expression has the same problem. If any of the variables in the expression are already asserting nonNULL values when the input name is applied to the input variables the resolution will be confused. Therefore all the variables in the entire expression must be asserting NULL values when the valid input name values are applied.

It is this initial state of NULL that insures the occurrence of progressive interaction events. As each input name is recognized by each interaction locus the asserted NULL values will change to meaningful nonNULL values in an orderly progression of value transforms propagating through the expression until all the result values are valid. The expression must be reinitialized to NULL before another input name resolution can be started. This can be accomplished by simply presenting a NULL input name. The NULL result values will propagate through the expression just as the valid result values did. So the NULL convention requires that there be an alternating cycle of valid input names with NULL input names.

With the above transform rule sets and with the expression in an initial NULL state (the input values NULL and all interaction loci asserting NULL values) the entire expression will continue to assert NULL values as long as the input name values remain NULL. As the input name values become nonNULL the interaction loci begin to assert nonNULL result values. Since all the result values are dependent on the formation of an input name, the result name will not be completely nonNULL until the input name is completely nonNULL. For instance referring to FIG. 13 both input Ds, 202 and 204 can be nonNULL but if one of the other input values is NULL then the result D, 210 will remain NULL awaiting a nonNULL carry value. The result D, 210 will not become nonNULL until RD, 226 and UD, 208 become nonNULL. D, 210 will be the last result value to be generated and DONE, 200 relying on the same input name can assert the completion of the resolution by becoming nonNULL.

The NULL convention scales up through combinations of interaction loci to endow a large expression of associated loci with the same behavior as a single locus. The large expression will only express a completely valid result name when a completely valid input name is present. Because no single locus changes its result from NULL until a valid input is present there are no race conditions. The result values will propagate through an expression in an orderly wavefront of valid result values with no invalid spurious values asserted anywhere in the expression at any stage of the resolution and finally a valid result name for the expression is asserted. When a result value goes nonNULL it is asserting a valid result of a valid input name.

Figure 14:
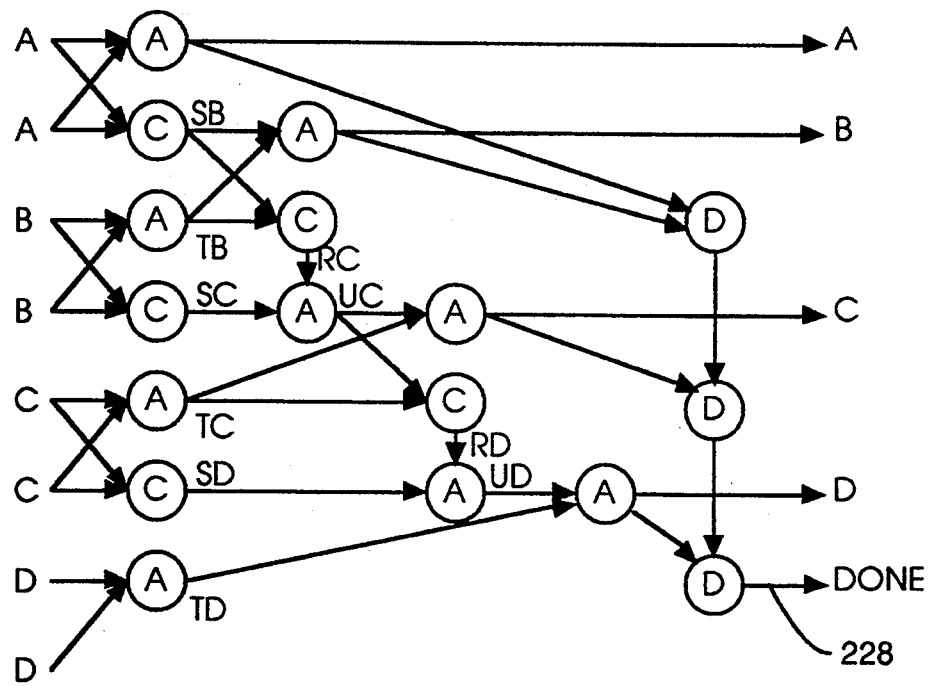
FIG. 14 is a configuration of interaction loci that will work with a NULL value added to the value sets of the interaction loci.

The assertion of the DONE nonNULL value is now a distinct completion event but it is still not guaranteed to be the last resolution event. Because the D result locus, 210 and the DONE locus, 200 receive their input names simultaneously there is still a possibility of the DONE value, 200 being asserted before the nonNULL D value, 210 is asserted. In the pure value expression both values were generated simultaneously by a single interaction but in the variable expression they are asserted by different interactions that may resolve at different speeds. The solution to this requires some reorganization of the expression as shown in FIG. 14.

The result of the DONE variable is now directly dependent on all of the result values of the expression being nonNULL. The expression can now autonomously assert its own completion. With the NULL convention and the interaction locus convention the expression of FIG. 14 is finally a pure variable expression of the example four bit binary addition process that will work. No new primitive expressional elements have been postulated. It is still just variables associated by variable association rules asserting values that form input names that interact and transform according to value transform rules.

2. The Process Expression Landscape

The process expression landscape encompasses expressions with varying degrees of value differentiation and variable differentiation. The discussion will begin with an arbitrarily defined baseline example process presented as a pure value expression. The discussion will progress through several forms of process expressions all representing the same example baseline process in different forms. Finally the ultimate pure variable form of process expression will be presented.

2.1 The Baseline Example Process

The example process shown in FIG. 15 is six distinctions that can interact in nine possible ways producing one of nine possible results. A pure value expression is used as the baseline expression of the process because it is straightforward and intuitively understandable. The fifteen distinctions in the process are differentiated with fifteen unique values. All nine possible interactions among the six distinctions are specified in terms of value transform rules.

Tables will be used in this discussion to represent sets of value transform rules because they are more compact and convenient to read than the character string representations. It should be remembered that the table is not a single transform rule but just a convenient presentation of a set of transform rules. The corresponding character string expressions of the transform rules for the baseline example are also presented for the baseline example to show the correspondence of the two forms of presentation. The baseline example process was defined by simply filling in the table with arbitrary values.

All the differentiation in the process is expressed by unique values. There is no case where the same value expresses two distinctions. The set of value transform rules is a complete expression of all the interaction possibilities among the six input distinctions. The example pure value representation uses transform rules with input names two values long and will resolve in a single interaction step.

2.2 Limited Values

The discussion will begin with the possibility that there are not enough values to directly represent all the distinctions of the example process. Suppose for instance that there are only four values available I, J, K and L to represent the fifteen distinctions of the process. The expression of the distinctions will have to be encoded by using multiple values to represent each distinction previously represented by a single unique value. An arbitrary assignment of encodings might be as shown in FIG. 16.

As a result of the encoding identical values are now used to represent more than one distinction. For instance the input names IJ, 230 and JI, 232 represent two different distinctions so the Is and Js of each input name must be differentiated. This can only be done by differentiating among the variables expressing the values. This J means something different from that J because it is expressed by a different variable with a specific association relationship to the variable of the second J. The encoded input name must be expressed by four differentiated variables. Differentiation lost by limiting value differentiation must be made up by differentiation of variables. So the expression must include an association structure of interaction loci.

2.3 Input Ambiguity of Interaction Locus

Even though identical values in the input name are differentiated by different variables when these variables are associated at an interaction locus the variables become interactively proximate and loose their differentiation and the identical values lose their differentiation. The interaction locus cannot discriminate that this value came from the first variable and that value came from the second variable. Inside the interaction locus there is a collection of values just like a pure value representation and some of these are identical values. For instance if the input name to a locus were IJJI the locus can at best only determine that there are two Is and two Js. The input name could easily have been IIJJ. At the interaction locus all ordering is lost and only quantities of values can be discriminated. Therefore an arbitrary encoded input name cannot be unambiguously discriminated in a single interaction by a single interaction locus. In fact the only form of encoded input name that can be unambiguously discriminated by a single interaction locus is an input name with all values identical. For the current example the only unambiguously discriminable input names are IIII, JJJJ, KKKK and LLLL. There is only one possible input name with four Is only one with four Js and so on.

2.4 Limited Discrimination Power of the Interaction Locus

Furthermore an interaction locus can generate only one value for one result variable. Since the values in the locus are not differentiated the locus cannot decide that this value goes to the left result variable and the other value goes to the right result variable. Any number of input variables can be mixed into the locus but the internal mix cannot be unmixed to several result variables. This in itself further limits the discrimination possible in an interaction locus. If there are only four possible values that the result variable can assert then only four distinct input names can be discriminated by the locus.

An interaction locus with four input variables for the current example can only discriminate four unambiguous input names and can assert only four result values. A locus with only two input variables can still unambiguously discriminate only four input names; II, JJ, KK and LL and assert four result values so in general there is a rapidly diminishing return of expressiveness for associating more than two input variables to an interaction locus. All of the examples of this discussion will assume two input interaction loci.

The discrimination power of the interaction locus is considerably less than the expressivity of its possible input names. The entire encoded input name clearly cannot be resolved in a single interaction locus. There must be a coordinated cooperation of many interaction loci to express the complete example process with each locus providing a partial resolution of a small piece of the input name. It is this progression of partial resolutions that determines the input name formation dependencies among the interaction loci and provides the structure of the process.

2.5 Preliminary Considerations

Before continuing it will be remembered that for a variable expression to be autonomous one of the values must be assigned the NULL meaning. This would leave only three of the four values representing process proper values. Having mentioned the need for the NULL value the issue will be ignored for the bulk of this discussion and only reintroduced at the end to establish the nature of the ultimate pure variable expression. The following discussion will sound more familiar in relation to current practice and experience if the NULL value issue is ignored. Traditional forms of expression deal only with the expression of process proper distinctions. Control is introduced as carefully coordinated external expressions such as system clocks, delay lines and other timed events.

The interaction locus association structure will be presented as a directed graph. A node is an interaction locus. The arcs are the result variables of the interaction locus. A spanning set of transform rules is associated with each interaction locus that will resolve all its possible input names.

The expression must be a coordinated progression of interaction loci. What is the fundamental rationale of forming such an expression? How are value transform rules assigned at each locus? How are the input name formation dependency relationships determined? The pure value expression was direct and intuitive but the encoded expression is neither direct nor obvious. It was easy to specify that A and Z go to 5 but how can it be specified that IJ and JJ go to LJ with the tools at hand?

There is no particular pattern to the example encoded table, shown in FIG. 16, so the only general way to approach the expression is to recognize each possible input name and generate the appropriate result names. Each input name can be recognized individually and that recognition expressed by differentiated variables. The correct set of result values can then be asserted and these values collected to a single set of result variables.

2.6 Recognizing Input Names

The first stage of resolution is to recognize the input names. The input name must be recognized two values at a time with each two value name being recognized by a single interaction locus. It has already been shown that a single interaction locus cannot discriminate between the input names IJ-JI and II-JJ so it must take multiple loci just to discriminate input names. Can a single locus discriminate just IJ from all other input names? The answer is again no because the input name JI might be a valid input name. The only possibility of recognizing a name with a single interaction locus is to transform the expected input name into an unambiguous standard recognition name with two identical values and discriminate this standard recognition name.

2.6.1 Rotation Locus

So the first task for an interaction locus is to transform single values. This can be done with appropriate explicit transform rules at each locus or it can be done with a more general rotation locus which can be applied multiple times to get the desired transform. The values can be put in some circular sequence and the rotation locus simply states that each value is transformed into the neighbor in a particular direction. Any value can be transformed into any other value through the appropriate number of loci. The example rotate locus is shown in FIG. 17. For example, if the input name is I 238, then after one rotation the result will be J 240. Further, after two rotations, the result will be K 242.

The standard recognition name will be chosen to be LL. To recognize a specific input name the input values will be rotated such that the specific input name will be rotated to LL. If LL is not the result of the rotation then the input name was not the specific input name to be recognized.

The above rotate configuration, shown in FIG. 18, will set up the input name IJ for recognition. If the input name presented on variables A and B 234, 236 is IJ then the result of the rotates will be the name LL. If the result name is not LL then the input name was not IJ.

2.6.2 Equality Locus

The next task for an interaction locus is to discriminate LL from all other input names.

The set of transform rules shown in FIG. 19 generate an L 244 for the input name LL and an I for all other input names. The table shown in FIG. 19 is representing a control or logical significance and has established the convention that I means FALSE and that L means TRUE.

With these two interaction locus transform rule sets all the input names can be recognized. Each possible two value input name can be recognized by a single interaction locus. All possible names for the first two value places of the input name can be recognized by one group of interaction loci and all the possible names for the second two value places of the input name can be recognized by a second group of interaction loci. Each two value portion of the input name is individually recognized by a separate group of interaction loci forming a recognition stage. The input variables are just routed to each of the input name recognition stages. One interaction locus from each recognition stage will recognize an input name and its result value will be L (TRUE). All the rest of the interaction loci for that stage will assert I (FALSE) because they did not recognize their name. If the input name was valid there will be one L asserted from each recognition stage. The combination of the two Ls from the input recognition stages can recognize the specific four value input name presented to the expression.

For the example expression, as shown in FIG. 20, the input variables are labeled A, B, C and D and the result variables are labeled X and Y.

Figures 21, 22, 23:
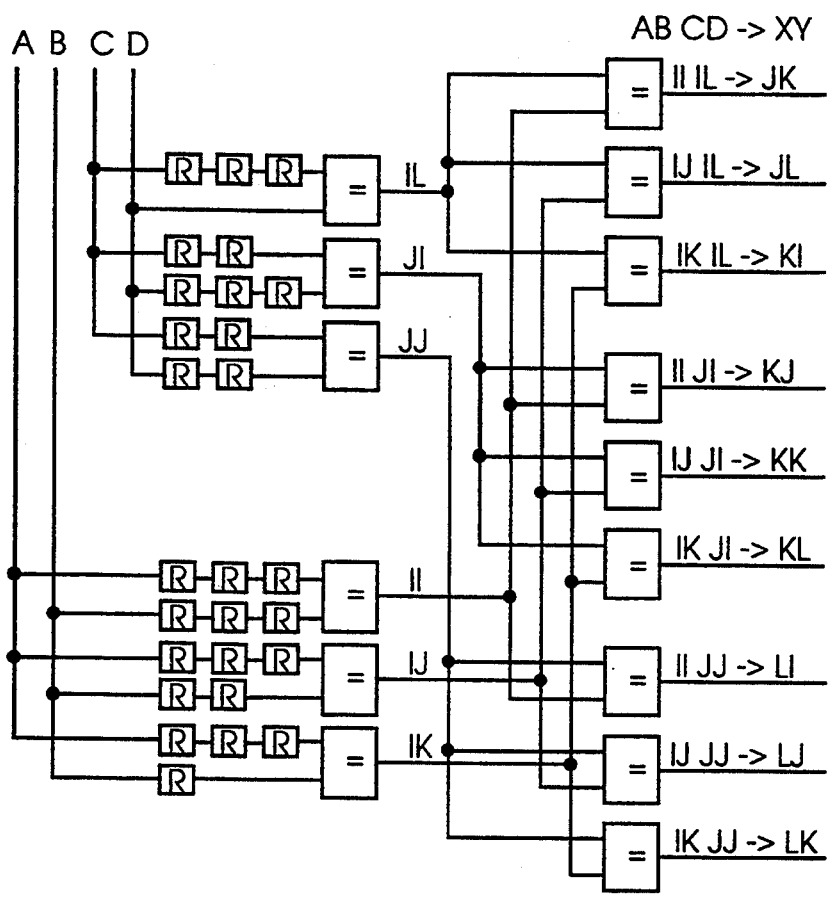
FIG. 21 is the input section of an expression that will recognize all of the possible input names of the process.
FIG. 22 shows a transform set which implements the task of asserting a particular value if enabled by a TRUE value and asserting a default result value if not enabled.
FIG. 23 shows a prioritized collection of asserted values.

FIG. 21 is the input name recognition section for the example expression. In the example there are nine possible input names of four values each. Since a single locus can only recognize two value input names the input name recognition is broken into two stages in which input names of two values are recognized and then these recognitions combined to recognize the nine four value input names. The recognition itself is represented by nine differentiated variables. Only one variable at a time can assert TRUE while the rest must assert FALSE. Of course they can all be false if the input name matches none of the recognized input names.

The single assertion of TRUE from one recognition locus is used to generate the result name associated with the recognized input name. The next task for an interaction locus is to assert a particular value if enabled by a TRUE value and to assert a default result value if not enabled. The transform set shown in FIG. 22 implements this capability.

2.6.3 Assertion Locus

One input variable of the assertion locus is set constantly to the desired value and the other input is the enable variable which will be L or I. If it is L then the constant value will be asserted on the result variable. If the enable input value is I then the default value of I will be asserted on the result variable. Choosing I as the default result value is an arbitrary convention that all other loci must relate to once it is established. It is generally convenient to choose the default value to be the same as the FALSE value.

So all the assertion loci except one will assert I and the selected one will assert a nondefault value which may also be I. All these values must then be combined through a priority network such that any nondefault value overrides all the default values and is asserted by the result variable for the whole expression. This prioritized collection of asserted values, as shown in FIG. 23, is the last general duty of an interaction locus.

2.6.4 Priority Locus

At each of these loci either two Is will be presented or one I and another value. In all cases the other value will be asserted on the result variable of the locus and will make its way through a tree of such loci to the result variable of the whole expression.

Figure 24:
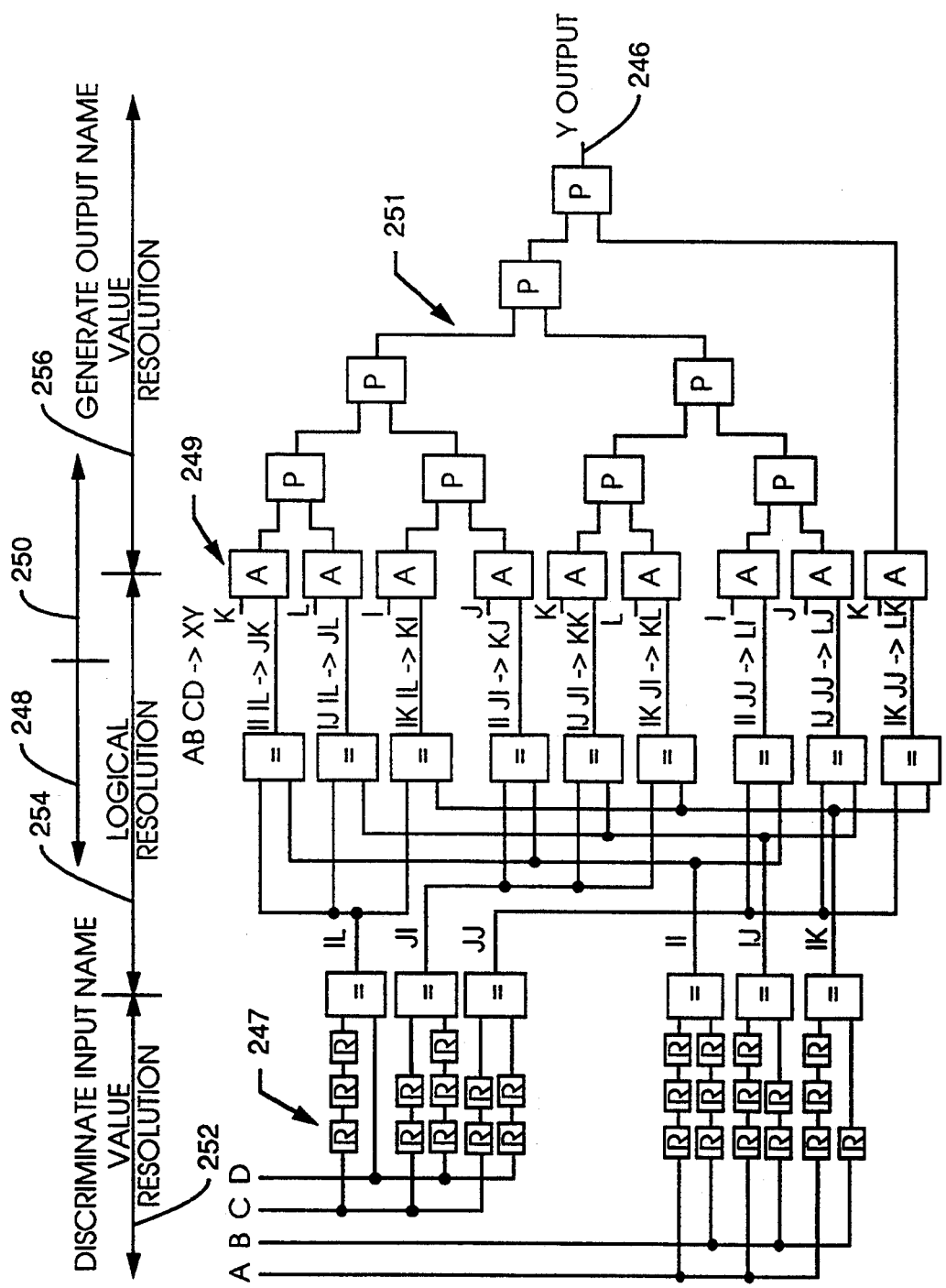
FIG. 24 is the complete expression that will transform each possible four variable-four value input name to a specific four variable-four value result name.

FIG. 24 is the entire example expression to assert the value for the Y result variable 246 including value generation and prioritized collection. The nine assertion loci with one input set to a constant generate the Y result value for the recognized input name. The asserted value is then directed to the result variable via the tree of Priority collection loci. The Y result value is shown because it takes on all four values and makes a better example than the X result. The X result value is generated by a similar assertion and priority network driven in the same way by the same input name recognition variables from the recognition loci.

The expression of FIG. 24 can be viewed as consisting of two halves. The first half 248 recognizes the input names. The second half 250 asserts the proper result value on the result variables. Looked at another way the expression can be viewed in three parts. There is an input section 252 that relates directly to the input values and recognizes pieces of the input name. There is an internal section 254 strictly in terms of logic values which combines the partial recognition pieces to recognize the larger input name. Then there is the result section 256 which asserts the result values based on the logic values of the internal section.

This initial example provides a convenient context within which many other issues of process expression can be discussed.

2.7 Optimization

Figure 25:
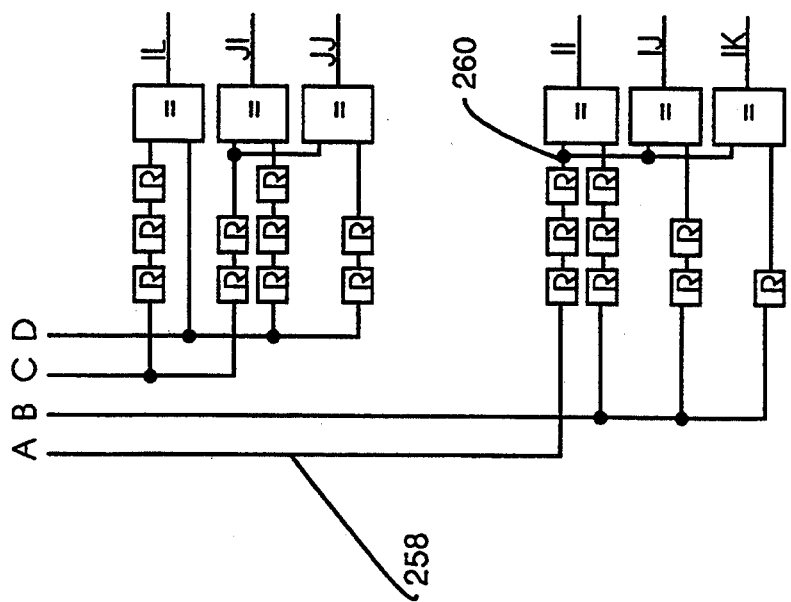
FIG. 25 shows how the input name recognition stage can be optimized.

Referring now more particularly to FIG. 25, this expression can be optimized in several straightforward ways. In the input name recognition stage redundant rotations can be eliminated. If the same rotation is applied to the same variable more than once the result of a single rotation stage can be fanned out to accommodate the other inputs. For example, input value A 258 may have a single rotation stage 260 whose result is fanned out to other inputs.

Figure 26:
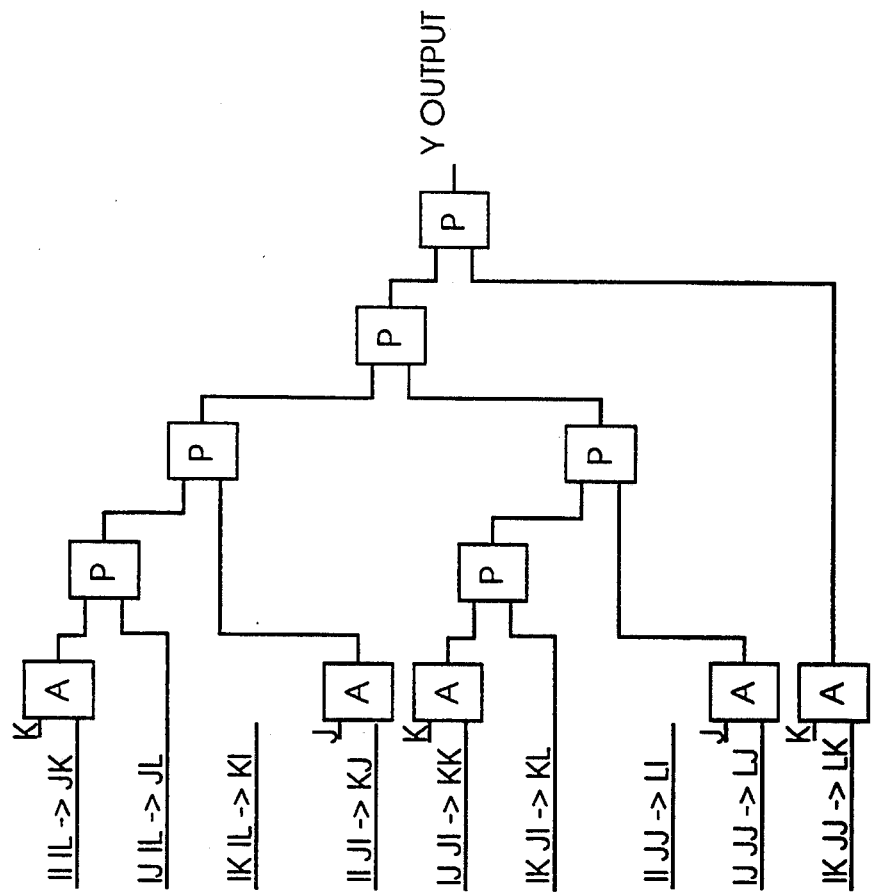
FIG. 26 shows how the result collection and assertion stage can be optimized.

Referring now more particularly to FIG. 26, only J and K need be explicitly generated for result values. In the result generation stage the logical control values do not have to be explicitly asserted from constants because the logic control variable is already L or I. The L can just be passed through. Is do not have to be passed through at all because I is the default value. If no higher priority value is selected the result will be I.

The recognition stages that generate I value results for the Y variable are still retained to control the result generation stage for the X result variable. If there were an II result value the recognition interaction locus for this input name could be eliminated entirely.

There is one more straightforward optimization that can be applied to eliminate redundant assertion loci. The logic values can be collected 261 for each result value before asserting that result value. This allows the use of only one assertion locus per result value. This is shown in the final optimized expression shown in FIG. 27.

There are likely many other clever techniques that could be developed to achieve other optimizations. For instance a Karnough-map-like technique might be possible to determine what minimal set of input names actually determine the result values. Such a technique might have shown that the arbitrary encoding left the A variable with a constant value and that the input names might possibly be discriminated with only three variables.

2.8 Relation to Binary Logic Representations

Referring now to FIG. 28, the interaction loci used for this expression can be related directly to the familiar Boolean logic functions. The rotate locus 262 corresponds to the NOT gate 264. The equality locus corresponds to the AND gate. The priority collect locus 270 corresponds to the OR gate 272. There is no counterpart of the assertion locus because a binary expression does not have any intermediate nonlogical values to assert.

The expression of a binary circuit follows the same strategy as the four value example expression. It recognizes input names and generates a unique result for each unique input name. The binary expression however has some unique advantages over a multivalue expression. There is complete intersection between its logic values and its expression proper values. If 0 is chosen as the default result value then any input name that results in all 0s need not even be recognized. Only input names that result in a 1 need be recognized. So the basic strategy for binary circuits is to recognize all input names that result in a 1. If 1 is assigned as the internal TRUE value the truth of the recognition is the direct result value. All the truth values from the recognition stages are collected and that is the result of the expression. This can be illustrated with the half adder circuit as shown in FIG. 29.

There are only two input names 01 274 and 10 276 that generate a 1 for the S result variable 278 and only one input name 280 11 that generates a 1 for the C result variable 282. These three input names are recognized by rotating the input names to the standard equality name (11) and determining equality with an AND gate 284. The truth value (1) of their recognition is collected through the OR gate 286 as the result value. If none of these input names are recognized the FALSE value (0) of the recognizers will be asserted as the default result value. The binary logic circuit is constructed with exactly the same expression principles as the four value example expression.

2.9 Definable Transform Sets

Can the example process be expressed more directly with four values? Can there for instance be a more direct mapping from the input names to the result names without going through the internal logic? It seems a particularly inefficient use of expressive resources to have a locus assert only two result values when there are four possible result values.

This would mean that each recognition locus would have to discriminate three or four input names instead of just two input names. Since a single locus can only discriminate four input names and not all input names can be recognized by a single locus, one of the result values must be assigned a meaning of FALSE which means that the locus doesn't recognize any name. So each locus can recognize only three possible input names. The only input names that a locus can unambiguously recognize are the input names with identical values II, JJ, KK and LL. If I is assigned to be the FALSE value then any three of the four unambiguous input names can be discriminated with the result values J, K and L. These names then are the standard recognition names for a locus and any input name can be recognized by rotating it to one of these recognition names.

A single locus cannot however recognize three arbitrary input names. Only one rotation can be applied to each of the two input variables of a locus so the three input names recognized by a single locus must be rotation neighbors. The same rotation must rotate one input name to JJ the second to KK and the third to LL. For example the input names IJ, JK and KL can be recognized by a single locus by applying a single rotate to the first variable. The transform set shown in FIG. 30 will unambiguously recognize three input names that are rotation neighbors.

The internal loci are now presented with all possible combinations of the four values instead of the two logical values as in the first example. The internal expression stage is no longer logical. In short the internal loci are faced with the same name recognition problem that the input loci are presented with. Now however there are only two variables in the internal name as opposed to the four variables of the input name. The same rotation neighbor strategy can be applied to these internal names so that a single locus can recognize more than one input name.

The transform rules for each locus can also be custom defined to assert the desired result value for the recognized input name directly. Assume the following input name to result value mapping JJ→K, KK→J and LL→J. The locus shown in FIG. 31 will generate the appropriate result values directly.

Other rotationally related groups of input names could be accommodated with similar custom loci. There must still be several of these stages and their result values must still be priority collected to the final result variables.

More advantage can be gained by carefully encoding input names instead of arbitrarily assigning input names. The encoding shown in FIG. 32 is chosen to optimize the expression. In this example rotational neighbors are assigned to each side of the input. The example further has the three letters in the locus 287 indicating the settings of the diagonal values in the table. In addition, the input value encodings 288 are conveniently remapped to make name recognition easier.

Figure 33:
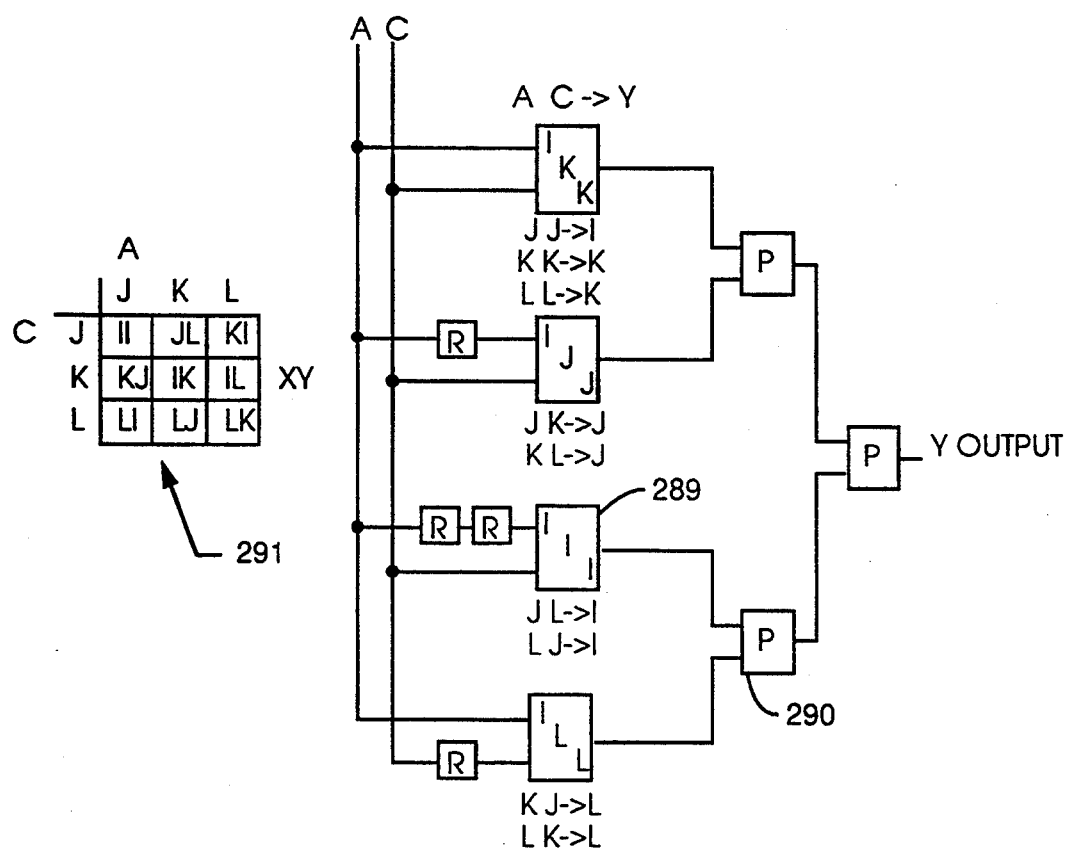
FIG. 33 illustrates how the expression can be further optimized by reassigning the coding of the input names.

The reader may have noticed that the variable differentiation resources are not being fully utilized. Since the AB and CD are differentiated variables they do not need to be differentiated with unique values and can be assigned the same encoding input names with no ambiguity. Four variables are not needed to differentiate the input distinctions. So the input distinctions can be differentiated with two variables with three values each. The encoding can be improved 291 even more and a whole stage eliminated with the expression shown in FIG. 33.

For this particular expression the third recognition locus 289 results in only Is so it can be eliminated along with one priority locus 290. Apart from that, this is probably close to the minimal form of expression of the example process achievable with four values.

Whether an expression is rendered in terms of a few standard loci or in terms of custom definable loci is a matter of choice, possibility and practicality. The fancy interaction loci discussed here may not be possible in most practical expression environments. For instance, in a particular environment, it may only be possible to detect a threshold presence of a single value.

2.10 More Available Values

Figure 34:
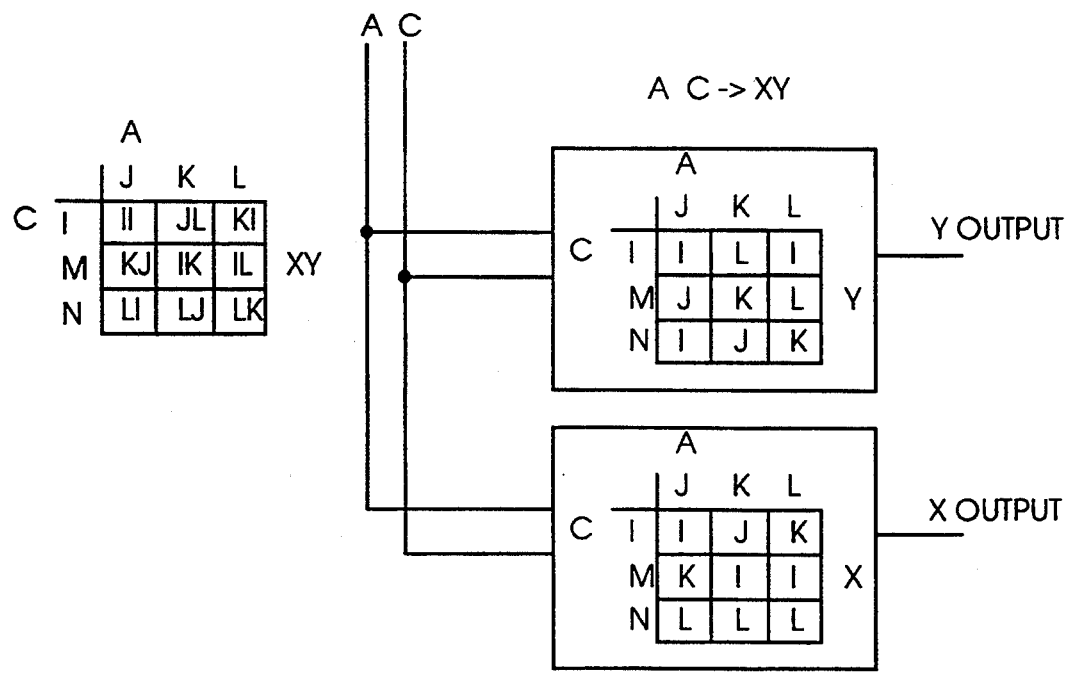
FIG. 34 illustrates the expression of the example process if six values are available.

What if more values were available? With six values the input names can be expressed without replication of values. This eliminates the ambiguity inside the interaction locus that limited input name recognition to input names of identical value. There no longer need be identical values presented to an interaction locus. The nine result distinctions must, however, still be encoded with two variables. The entire example process with both X and Y result variables can now be expressed with two custom defined interaction loci shown in FIG. 34.

Figures 35, 36, 37, 38:
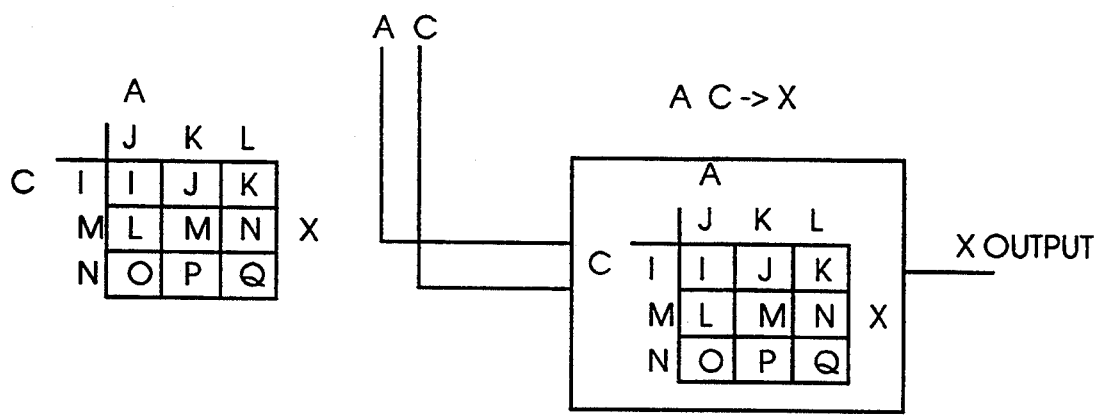
FIG. 35 illustrates the expression of the example process if nine values are available.
FIG. 36 shows that the expression becomes a pure variable expression if fifteen values are available.
FIG. 37 illustrates an expression with fewer values available.
FIG. 38 shows the transform table for the example expression if only two values are available.

If nine values are available the result values need no longer be encoded in two variables and the entire process can be expressed in one custom interaction locus as shown in FIG. 35.

With fifteen values there is no longer a need for an interaction locus at all to discriminate input values from result values or to associate differentiated variables because variables do not need to be differentiated in the first place. The discussion has found its way back to the pure value expression that defined the example process at the start. Another way of viewing this is that the whole expression now fits entirely inside a single interaction locus as shown in FIG. 36.

2.11 Fewer Available Values

Referring now to FIG. 37, what are the consequences for the expression if there are fewer values? With three values available the input distinctions can still be differentiated with one variable of three values and the result can still be expressed with two variables of three values. The only difference is that a single interaction locus can now only recognize two unambiguous input names instead of three unambiguous input names so some extra loci might be required in the expression. It should be noticed that three values are optimal for this process in that no value expression capacity is wasted. All the possible names for both input and result are used.

Referring now to FIG. 38, when only two values are available it becomes necessary to encode the input distinctions in two variables and the result distinctions in four variables. Furthermore a locus now can recognize only one unambiguous input name. In spite of this the two value expression is simpler in terms of expressional resources than the four value expression.

Figure 39:
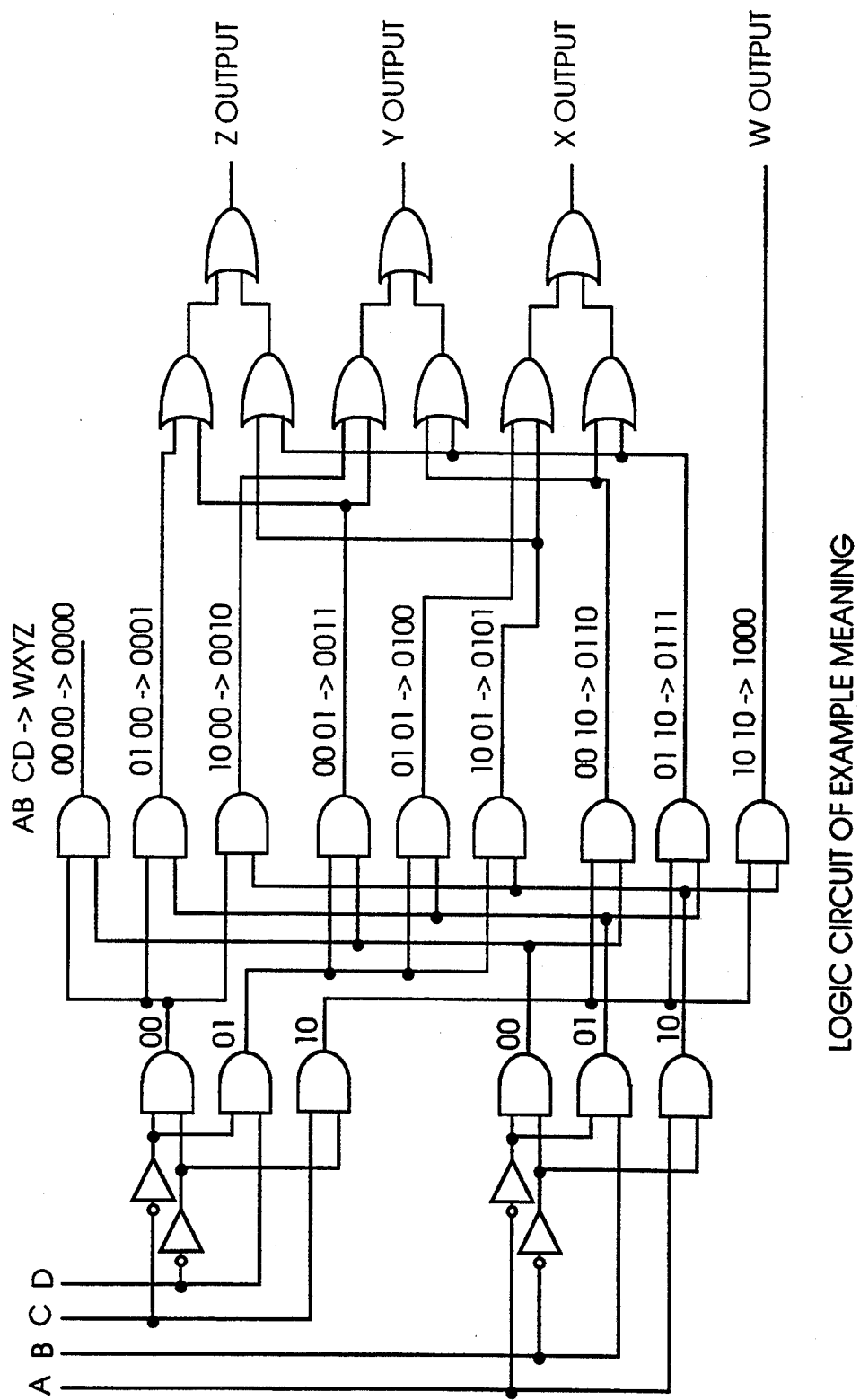
FIG. 39 shows the example process as a standard logic circuit.

The diagram shown in FIG. 39 is a traditional logic circuit expression of the example process shown in FIG. 38.

2.12 NUll Again

Although it was stated at the beginning of this section that the examples would ignore the NULL value convention the issue itself of expressing meaninglessness within the expression could not be entirely ignored. In a traditional logic circuit expression the meaningfulness and meaninglessness of the values at the input and result interfaces of the expression are established by an external expression; usually the system clock. All values expressed external to the expression are considered to be expressing valid meaning on the clock edge.

Inside the logic circuit there is no external authority and variables have to express their own meaninglessness to the resolution of the expression themselves. This is why there was always a value internally assigned the meanings FALSE and DEFAULT. FALSE means "I am not meaningful to this resolution". DEFAULT means "I may or may not be meaningful to this resolution depending on whether a nondefault value is asserted".

The NULL value can be added to the existing logic of any expression with its existing FALSE and DEFAULT values without disturbing the established logic of the expression. For instance the NULL convention can be added to the binary example by assigning the transform value sets shown in FIG. 40 to the interaction loci.

Each locus now asserts a result value only when its input name is valid. An orderly wavefront of correct result values propagates through the expression until the expression is asserting all nonNULL valid result values. When all the result values are nonNULL the resolution is complete. There are no races and no spurious switching while the expression resolves to a valid result state. Both the standard logic expression and the NULL convention expression will stabilize to the same value assertion state. They are both logically identical but the expression with the NULL value convention can autonomously express its own completion.

Input and result names can express validity or invalidity providing an autonomous interaction coordination capability among expressions. External control expressions such as the system clock are no longer required.

2.13 The Ultimate Pure Variable Expression

It is generally accepted that two data values per variable are necessary to represent information and that Boolean logic is a minimal form of process expression. With the NULL convention Boolean logic expression requires three values per variable. With only two values if one value is assigned to NULL then there is only one DATA value available. This would seem to be insufficient resources for general process expression but this is not the case.

A variable can be assigned to each distinction in a pure variable expression just as a value was assigned to each distinction in the example pure value expressions. Just as each value in the pure value expression was asserted or not asserted by a variable, each variable in the pure variable expression is asserted by a data value (ASSERT) or not asserted by a NULL value.

All of the examples discussed here except for the Roman numeral example rely on mutually exclusive distinction assertion sets. This means that only one distinction from the set can be asserted at a time. This can be illustrated by the place-value representation of numbers. Each place in the number can assert only one of a set of two or more possible values. In the pure variable expression this mutual exclusivity is inherently expressed and enforced by the nature of the variable. No matter how many values a variable is capable of asserting it can only assert one value at a time.

This expression of mutual exclusivity is not inherent in a pure value expression but has to be established and enforced by convention. The pure value version of the current example process shown in FIG. 15 assumes that only one value from the A, B, C set will be asserted and that only one value from the X, Y, Z set will be asserted. There is nothing inherent in the expression itself to prevent all six values being simultaneously asserted at a place of interaction. Similarly the pure value examples of binary addition assumed a mutually exclusive assertion convention for the presentation of each binary digit in the input name. Referring to FIG. 4 For each of the two input names (numbers) only one of the A0,A1 values would be asserted, only one of the B0,B1 values and so on. It will be remembered that if the convention was observed for the input to these examples the expression maintained the convention for the assertion of its result name. Once the convention is established it will be maintained by the expressions themselves.

A similar convention can be applied to ultimate pure variable expressions to express mutually exclusive assertion sets among groups of variables. For instance one variable can be assigned to mean A0 and another to mean A1 and the convention established that only one of the two variables can assert an ASSERT value and the other must assert a NULL value. Similarly two more variables can be assigned to mean B0 and B1 in a mutually exclusive assertion group. A mutually exclusive assertion group of variables can be as large as desired. With mutually exclusive assertion groups of variables full generality of expression can be achieved with variables that only assert two values; ASSERT and NULL.

Since there is only one data value the only valid input names that can be formed at an interaction locus are quantities of ASSERT or NULL, all that can be done by an interaction locus to recognize a formed name is to count ASSERT values.

The quickest way to grasp the ultimate pure variable expression is to compare it with the familiar example of the half adder logic circuit previously shown in FIG. 29. The four variables A, B, C and S of the logic circuit each with two values express four process proper input distinctions and four process proper result distinctions.

Figure 44:
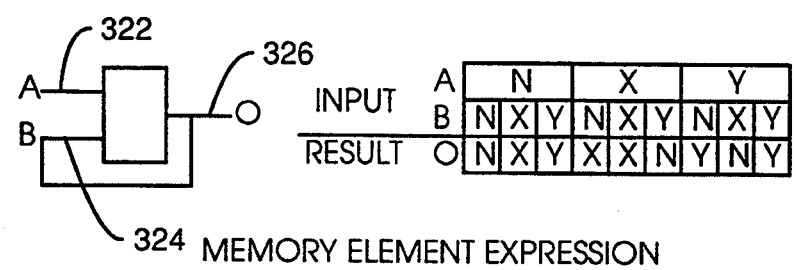
FIG. 44 shows a variable structure and transform rule set to implement a memory element.

The diagram shown in FIG. 41 illustrates a ultimate pure variable expression of the half adder process shown in FIG. 29. The number inside each interaction locus (e.g. interaction locus 292) indicates how many ASSERTs are required to set the result variable to ASSERT. The following value transform rule sets 294,296 are also shown in FIG. 44 and correspond the AND and OR logic gates. But in general an interaction locus can have any number of inputs with any threshold up to the number of inputs. A is ASSERT and N is NULL.

The four input and four result distinctions expressed with two variables and two data values in the logic circuit are now expressed with four variables and one data value (ASSERT) Only two of the input variables, one from the A group 298 and one from the B group 300 can be asserted simultaneously. These two assertions will enable the assertion of only one of the threshold 2 loci. The result of the asserting threshold 2 locus 302 will enable the assertion of the appropriate threshold 1 result loci to assert the correct result name. If the input convention is observed then the expression will assert only one variable from the C group 304 and one variable from the S group 292 maintaining the convention just like the pure value expressions did. This expression looks more expensive in terms of expressional resources than the binary example but it must be remembered that this expression is expressing its own control while the Boolean logic circuit is not.

This example ultimate pure variable expression shown in FIG. 41 is similar to a dual rail encoded Muller circuit expression. Muller circuits are only considered in terms of Boolean logic gates the C element and dual rail encoding. In this context ultimate pure variable expressions can be considered in terms of what might be called multi rail encoding and general threshold gates. Even though resolution completion can be determined from the result assertions of a NULL convention expression the means of the actual determination which would be the counterpart of the C element has not been discussed here.

FIG. 42 shows the ultimate pure variable expression of the baseline process.

The values from the pure value expression are overlaid on the pure variable expression to illustrate the correspondence between the two expressions. Only one variable from A, B, C and one variable from X, Y, Z will be asserted simultaneously. Given the input convention this expression will assert only one of its result variables maintaining the presentation convention.

The essence of any process is the possible interaction relationships among the existential distinctions. The measure of a process is the particular configuration of possible interactions among a specific quantity of distinctions. The pure value and ultimate pure variable expressions express the same process in very different ways but there is still a direct correspondence between the two. There are nine transform rules in the pure value expression and there are nine associated interaction loci in the ultimate pure variable expression. Both expressions directly express six input distinctions with nine interaction possibilities producing nine possible result distinctions. The transform rules and the associated interaction loci express the same interaction relationships among fifteen distinctions. These two expression both express the same process.

2.14 Summary

The discussion began with the suggestion that the mathematical theory of computability is not an appropriate conceptual foundation for computer science. That while mathematicians are primarily interested in the behavior of processes independent of how they might be expressed, computer scientists are primarily interested in how processes might be expressed independent of what process is being expressed. It was shown that the notion of the algorithm, while providing an adequate definitional model for considerations of mathematical computability, was a particularly poor model of process expression. What computer science needed was a comprehensive and unifying theory of process expression.

A view of process was presented which characterized process as the occurrence of interactions among interacting distinctions from among a set of possible interactions among those distinctions resulting in a new set of distinctions and a new set of possible interactions. Which interaction occurs depends on the formation of a combination of distinctions. Process expression inherently has two aspects, the possibility expression which determines the possible interactions and the actuality expression which determines, by the formation of a combination of distinctions, which interaction will actually occur.

The invocation model of process expression was introduced as a formal conceptual accounting for this view of general process expression. It consists of variables, values, variable association rules and value transform rules. The variables asserting values express the distinctions of the process. The rules serve to differentiate and interactively associate these distinctions. Variable association rules specify which variables are distinct and interactively proximate and hence interactable. Value association rules specify which values are distinct and interactively proximate and also what result values will be asserted as a result of each interaction.

Composite process expression is achieved as a dependent progression of interactions. The dependency relationships of a progression of interactions is expressed as name formation relationships between result distinctions and input combinations of distinctions where a name is the combination of values asserted by associated variables.

These name formation dependency relationships can be expressed two ways within the model. They can be expressed as correspondence between result values and name values of value transform rules or they can be expressed as association relationships among variables by variable association rules. This means that there are two distinct but inextricable realms of expression within the invocation model; the pure value expression form and the pure variable expression form. It is the relationship between these two realms of expression that relate many forms of expression that appeared to be quite distinct or only vaguely related. Of these two realms one seems to be more fundamental than the other.

In a pure value expression differentiation and association of meaning within the expression is almost entirely in terms values and value transform rules. Variables are not explicitly differentiated and consequently cannot be explicitly associated. They are either all constantly associated or are indiscriminately associating. Interactions occur as variables associate and form interactable names.

A value expression can stand alone as an independent autonomous expression on the basis of the primitive definitions of the model. An interaction in a value expression is a distinct resolution progress event. The input values disappear and the result values appear. An interaction is inherently directional because the result values cannot be confused with the input values. Result values are independently maintained by their asserting variables from interaction to interaction. An expression resolves in an orderly progression of interactions and unambiguously expresses its own completion by the existence of the ultimate result values.

In a pure variable expression differentiation and association of meaning within the expression is almost entirely in terms variables and variable association rules. The values are all continuously interactively proximate so all the associated variables are continuously interacting.

The pure variable expression form requires a liberal dose of convention for it to achieve autonomous expression with the same expressional qualities that are inherent for the pure value expression form. It required the NULL value convention to provide distinct interaction events. It required the interaction locus bounding convention to avoid input name formation ambiguity and establish directionality of resolution progress. Since these conventions could all be characterized in terms of the primitive elements of the invocation model, no new primitives needed to be introduced.

These conventions are mirrored in nature. The first stages of variable association in nature form nondirectional interaction boundaries and result primarily in new realms of value expression. Particles associate to create the ninety two values of the natural elements. The elements associate to create multitudes of molecular values. It is not until a great deal of complexity is involved that directionalized interaction boundaries are formed and that interaction loci in the form of certain proteins and living cells emerge. These loci are then combined in variable association structures to express very complex expressions of very specifically functional processes.

The process expression landscape which included expressions with varying degrees of value differentiation and variable differentiation was explored through a single example process. It was discovered that the discrimination power of an interaction locus could be considerably less than the expressivity of its input name and also that the input names to be resolved could be far larger than the input name of any single interaction locus. Consequently the coordinated cooperation of many interaction loci, each performing a small piece of resolution, was required in a dependent progression of partial resolution results to express the resolution of a larger input name. This progression of partial resolution results provides the rationale for the name formation dependency relationships among interaction loci which determines the structure of the expression.

The structure of name formation dependencies depends on the expressional resources available and the constraints imposed on the expression. The first example was limited to four values and to four transform rule sets for the interaction loci. This required a large network of name formation dependencies among lots of interaction loci. As the constraint on the number of transform rule sets was relaxed and transform sets were allowed to be custom defined there was less variable association structure with fewer interaction loci but there was more value association structure inside the interaction loci. As more values were allowed fewer interaction loci were needed until with enough values the name formation dependency relationship structure was a structure of purely value association relationships and no interaction locus was required at all. As fewer values were allowed the name formation dependency relationship structure became a structure of purely variable association relationships.

If one considers altitude to be a measure of expression cost then the process expression landscape might be viewed as a mountainous island where the mountain range has peaks of inefficiency and valleys of optimality with the lowest cost expressions being found on either side of the mountain range at the shores of pure value and ultimate pure variable expression. Expressional advantages accrue when the expressional resources best match the process to be expressed. For the example process the resources phased up with the process at one, three, six, nine and fifteen data values. At three values all distinctions were expressed and all formable names were used. With four values many formable names were not used so the expressivity of the available values was not fully used. At six values the input names could be uniquely expressed so the discrimination inefficiency of the interaction locus was reduced. At nine values both input and result could be uniquely expressed with single value names making the input name discrimination much easier. A different process would exhibit different phasing relationships.

At fifteen values all distinctions of the process were uniquely expressed with a distinct value and the expression became a pure value expression. At one data value all the distinctions of the process were uniquely expressed with a distinct variable and the expression became an ultimate pure variable expression. The pure value and ultimate pure variable expressions were the simplest expressions in that they required the fewest primitive expressional components. Furthermore, both expressions required the same number of components and both had identical name formation dependency structures.

The example expressions in the landscape discussion used the same strategy of expression to resolve an input name. Each possible input name was individually recognized and that recognition directly generated the result value(s) for that input name. An expression can map any arbitrary set of input names to any desired set of result name. Such expressions correspond to combinational logic circuits. Expressions corresponding to sequential logic circuits are just a feedback association away. The artificial digital computer is clearly expressible within the model.

All forms of process expression are related by the necessity to differentiate distinct elements and express changes of those distinct elements through interactive associations of those elements. All processes resolve in a dependent progression of actual interactions within a context of possible interactions. The activity of the living cell is not fundamentally different from the activity of an artificial computer. Humans do it in much the same way that nature does it. Process expression far from being an artificial undertaking that can be arbitrarily adjusted to fit any desired conceptual model is found to have inherent limitations and necessary relationships much like the hard physical sciences. It is all just variables and values interacting according to value transform rules and variable association rules.

The invocation model of process expression provides a conceptual foundation for considering process expression of both natural and artificial processes and unifies seemingly disparate forms of process expression. The invocation model provides a conceptual foundation which can encompass and illuminate the central questions of computer science.

3 Generally Configurable Process Expression

This section of this detailed description discusses the possibilities of generally configurable process expression. A generally configurable process is an already expressed process that can be configured to express any other arbitrary process. The processes discussed in the previous section were expressed as directly associated networks of interaction loci and will be referred to as directly associated processes (DAPs). The discussion will initially focus on the expression of any arbitrary DAP by a generally configurable process expression. Expressing more complex processes than DAPs with a generally configurable process will be considered at the end of this section.

To begin with, general configurability requires expressional capabilities that a DAP cannot fulfill. Once a DAP is expressed it cannot reconfigure itself to express a different process. DAPs can resolve very large names but each DAP can only resolve a specific set of possible names. The resolution of a different set of possible names would require a differently structured DAP. Conditionality can be added to the DAP to accommodate other configurations but to accommodate all possible configurations leads to intractable combinational explosion. So, a generally configurable process must be expressive in ways that a DAP cannot accommodate.

The first requirement for general configurability is cyclic iteration. There cannot be an arbitrarily sufficient supply of interaction loci to accommodate any arbitrary DAP and even if enough loci were available they could not accommodate all possible association relationships. So, an arbitrary DAP cannot be completely configured by any already expressed process. Only part of an arbitrary DAP can be configured by an already expressed process. Therefore, the expression and resolution of the arbitrary DAP must occur a piece at a time within the already expressed generally configurable process.

This is directly analogous to the situation of interaction loci with limited input name resolution capabilities. Larger input names have to be resolved in a dependent progression of interaction loci that resolve the input name a piece at a time. A generally configurable process must be inherently limited in its immediate expressibility, so it must express an arbitrary process as a sequence of pieces of expression. It must cycle through several configurations each of which contributes a partial resolution and the combination of which accumulates to a resolution of the complete arbitrary process.

A piece of expression might be larger or smaller depending on the capabilities of the generally configurable process. The size of the pieces is not important, but what matters is that each configuration cycle is a single configuration piece of the arbitrary process. The generally configurable process can only do one configuration at a time. For the current discussion, considering the expression of any arbitrary DAP the pieces of configuration will be individual interaction loci.

The next requirement is the independent maintenance of values within the generally configurable process. There must be name formation dependency relationships among these pieces of configuration and hence association relationships among them. The input name for each interaction locus is formed from the results of two or more other interaction loci. If interaction loci that are configured to resolve one piece of the arbitrary DAP must be reconfigured to resolve another piece of the arbitrary DAP, then the loci cannot themselves maintain their result values to form the input names of other pieces that might be configured many cycles in the future. The result values to form any particular input name will be generated at different times and possibly by the same interaction locus. These result values that form input names for future configurations must be maintained through arbitrary time periods in the generally configurable process separately from the interaction loci that generated them. Name formation dependency association relationships among interaction loci of the arbitrary DAP can no longer be expressed by direct connections among loci.

If there is a separate means of maintaining result values apart from the interaction loci that are configured to resolve input names, it follows that there must be a means of associating these separately maintained values to the proper interaction locus to be resolved and a means of associating the result of the interaction locus to the means of value maintenance. In fact, this configurability of association relationships is the essence of general configurability.

Each interaction of the arbitrary DAP must be individually configured within the generally configurable process. Each interaction requires the association of a validly formed input name to an interaction locus and the association of the result to the independent means of independently maintaining that result within the generally configurable process. There must be a means of specifying which maintained values are presented as the input name to which interaction locus and of specifying how the result of the interaction is maintained. There must also be a means of determining when an input name is validly formed by maintained result values.

The essence of a DAP expression is the input name formation dependency relationships among result values and input name values and how these formed names are resolved. The same process can be expressed by any means that specifies the input name formation dependencies and resolves with the correct progression of input name formations and resolutions.

There are many means of expressing these relationships. A DAP expresses the relationships by direct association between result values and their dependent input name values of interaction loci. A pure value expression expresses the dependency relationships as value correspondences among unique result values and uniquely named value transform rules. A generally configurable process must be able to express any configuration of name formation dependency relationships among name resolution elements (interaction loci) and to resolve the configured process with the correct progression of input name formations and resolutions.

The expression of the arbitrary DAP must be a specification of the sequence of configurations for the generally configurable process. This specification cannot be an inherent part of the generally configurable process so it must be supplied externally to the generally configurable process.

Figure 43:
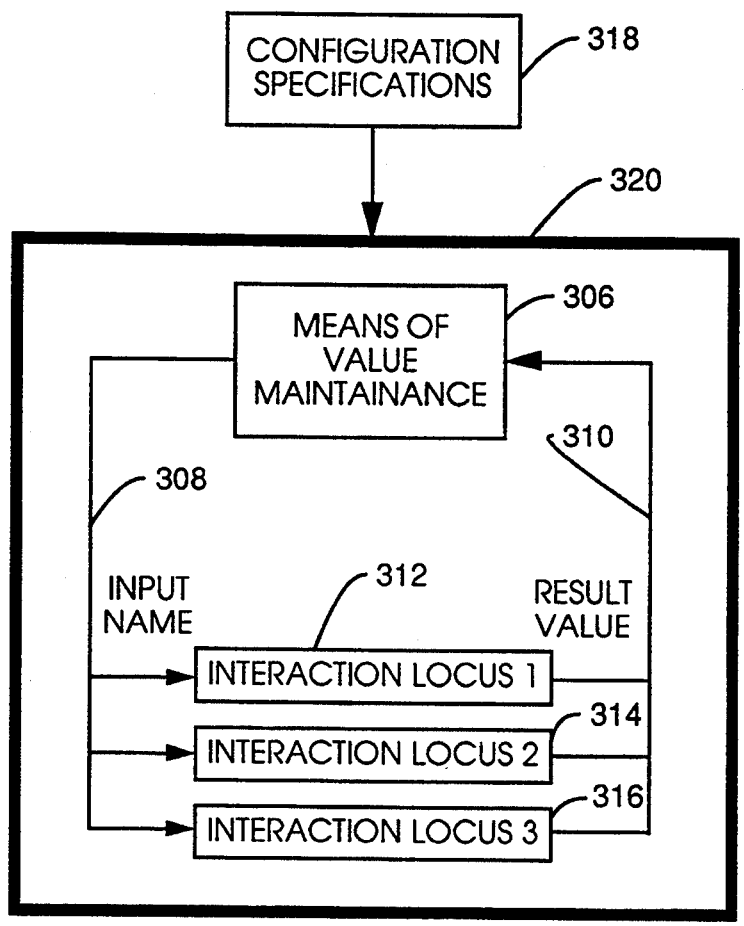
FIG. 43 illustrates the general form for a generally configurable process.

A generally configurable process capable of expressing any arbitrary DAP must posses at least one of each type of interaction locus, a means of independently maintaining values and a means of configuring sequences of association relationships between the maintained values and the interaction loci in relation to externally presented specifications. The overall structure of a generally configurable process expression must look something like FIG. 43.

Several new conventions of expression are required to express the generally configurable process. There must be the means of independently maintaining values 306 over indefinite periods. There must be the means of associating any maintained value 308 with any interaction locus 312,314, 316 and means of associating the result 310 with any value maintenance means 306. The entire expression 320 must autonomously and continuously cycle through association configurations in relation to the configuration specifications 318. The first new convention to be defined will be a memory element which will provide the means to independently maintain values in the generally configurable process.

3.1 The Memory Element

The first necessity is to establish islands of independent and stable value assertion within the larger expression. Process expression as discussed so far in the form of a DAP has no capability to stably assert a value independently of other expression elements. A DAP is continuously responding to its input and its asserted result cannot remain stable unless its presented input remains stable.

As long as an expression locality is completely dependent on external influences, it cannot be independently assertive. The expression locality must be at least partially dependent on internal influences asserted by the locality itself. This can be achieved by associating a result variable to an input variable forming a continuous association loop around a specific locality of expression which interacting with itself will form a local interaction domain that can sustain an asserted result independently of expressions external to that local domain of interaction that are providing the rest of the input name. The value transform rule set for the locality can be arranged such that sometimes external influence is effective and sometimes it is not. It will be remembered that the DAP was defined to be strictly directional and to not have any circular association relationships. The circular association relationship reintroduces a form of expression that was carefully eliminated by the interaction locus. But, this time the circular association relationship is specifically structured through directionalized elements.

In this section the value transform rule sets will be presented in the table format like the one shown in FIG. 44 because many rule sets will have several input values and several result values. In this example, three variables A, B and O can assert three values X, Y and N (NULL).

In this example, there are two input variables 322,324 and one result variable 326. The result variable 326 is associated with the input variable B 324 while the input variable A 322 can be associated with any other variable in the larger expression. If input variable A 322 is NULL, the result variable O 326 stably maintains an asserted X or Y value. When input variable A 322 becomes nonNULL the result variable O 326 is set to the value asserted by input variable A 322. The value asserted by result variable O 326 propagates to input variable B 324 and O's 326 value assertion is locked by the interaction loop between input variable B and result variable O 326. When input variable A 322 becomes NULL the last asserted value is independently maintained and stably asserted by this interaction loop. There is a time latency associated with the memory element. The value asserted by input variable A 322 must be maintained long enough for the result to propagate through the input variable B 324. This may or may not be significant depending on the configuration of the larger expression.

The memory element expression convention provides an island of independent stable value assertion. As many memory elements as desired can be grouped together within a larger expression to provide for the stable maintenance of as many values as desired.

The responsibility of the group of memory elements is to independently maintain the assertion of result values until they are used to present formed input names to an interaction locus. Every result is destined to be part of an input name and it cannot be predetermined which memory elements are to be associated with which interaction locus for all possible arbitrary DAPs. So the asserted results of all memory elements must be associable with the input of each interaction locus. By the same token the asserted results of all interaction loci must associable with the input of all the memory elements. There must be a general associability of the interaction loci's asserted results to memory element inputs and of the memory element's asserted values to the interaction loci's input.

3.2 The Selector Element

The selective association between the memory elements and the interaction loci will be accommodated by two expression conventions. The first is a selector element which selects one of two input values to pass on as its result value. The second is a distributor element which determines which of several destinations a result value will go to.

Figure 45:
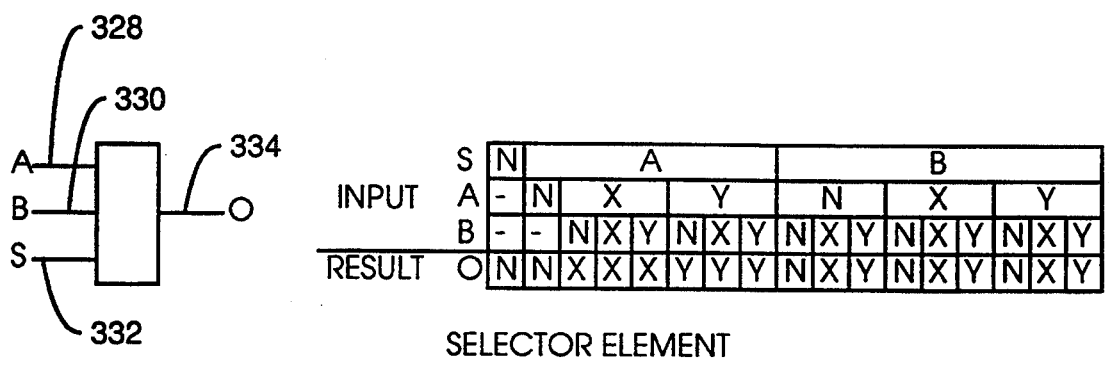
FIG. 45 shows a variable structure and transform rule set to implement a selector element.

The input name of the selector element is formed by three variables. Two variables carry the candidate values to pass on and the third carries the value that determines which variable's value is passed on as the result value. In the diagram shown in FIG. 45, the S input variable 332 carries the selecting value and the A and B input variables 328,330 carry the candidate input values to be asserted by the result variable O 334.

The input name to the selector element is VALID when S input variable 332 is nonNULL and the selected input variable 328 or 330 is nonNULL. The result variable 0 334 will assert the value asserted by the selected input variable 328 or 330. Otherwise, the input name is not VALID and the result variable O 334 will assert NULL. It does not matter what value the unselected variable is asserting.

Although the transform definition treats the input as a three value name to be resolved like any other DAP input name, the meta view of the input name in terms of the convention being established must view the name as composed of three separate parts. Two parts (input variables A and B 328, 330) are values that contribute directly to the result. The third part (input variable S 332) does not contribute directly to the result value 334 but specifies which value of the other two variables 328,330 will form the result value 334. Input variables A and B 328,330 are asserted from two different places in the expression. Since input variable S 332 is determining which value plays through as the result value it is specifying which place input variables A or B 328,330 in the expression is associated with the place of the result variable O 334. The value selecting A asserted on the input variable S 332 is the name of the place of assertion of the input variable A 328 in the expression. Similarly, the value selecting B asserted by input variable S 332 is the name of the place of assertion of input variable B 330 in the expression. So, the value asserted by input variable S 332 is the name of a place in the expression. The input variable S 332 specifies the association of one place A 328 or another place B 330 with the place of the result variable 0 334 in the context of the expression. Input variable S 332 will be called a place name variable. Input variables A and B 328,330 will be called data name variables.

Figure 46:
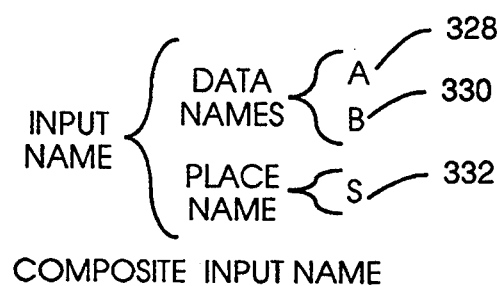
FIG. 46 illustrates the composite name form for a generally configurable processor.

Composite input names with multiple parts with different significances will be a common feature of conventions defined in the following text. The input name of the selector element consists of a place name 332 and two data names 328,330 as shown in FIG. 46.

Figure 47:
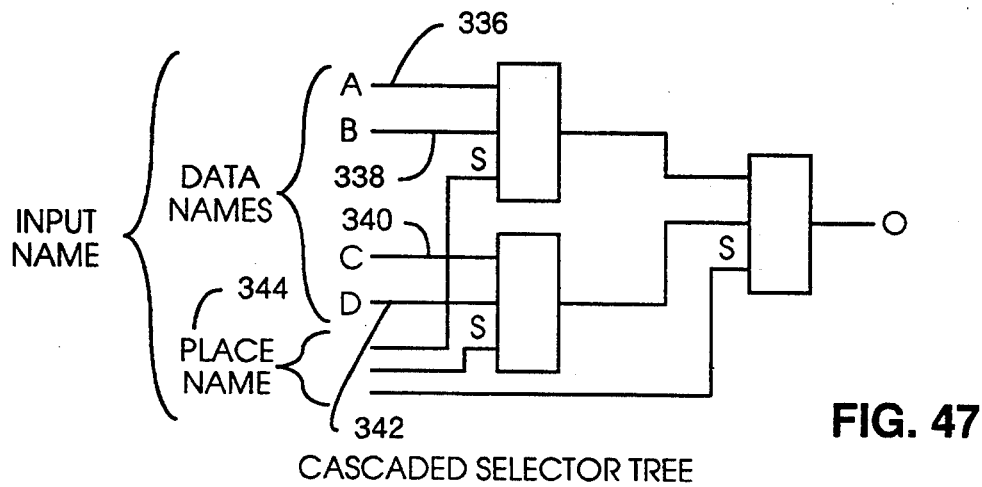
FIG. 47 illustrates a selector element structure.

Selector elements can be cascaded to accommodate arbitrarily large choice sets and they can be ganged to accommodate arbitrarily long data names as shown in FIG. 47.

In the cascaded tree of selector elements the place name that chooses among the many data names is itself a multiple value name. It is formed of the same values and is no different from the data names in any respect except for its role and its place in the expression. A place name can be manipulated, stored and transformed just like any data name.

Each input data name A, B, C and D 336,338,340 and 342 respectively comes from a different place in the expression and that place in the expression now has a name with which it can be referred to. Presenting a particular combination of values for the place name 344 can mean "assert at place O the asserted result from the A place in the expression." This ability to refer to places in the expression by names expressed just like data names is a property that emerges through the convention of the selector and distributor element expressions and is the seed of the possibility of symbolic process expression.

3.3 The Distributor Element

Figure 48:
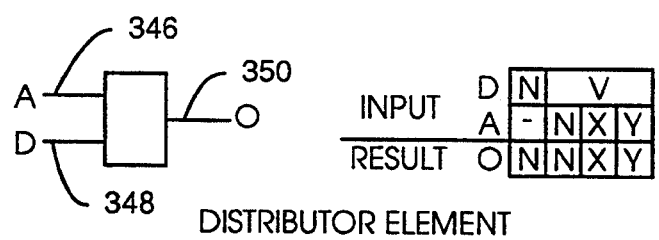
FIG. 48 shows a variable structure and transform rule set to implement a distributor element.

Referring now more particularly to FIG. 48, while the selector element expresses fan in association relationships that determine what place a result value will come from, the distributor element expresses fan out association relationships that determine what place a result value will go to. A single result value can be associated to many places in the expression through many distribute elements but only one of the distribute elements will be presented with a fully valid input name and pass its input value on as a VALID result value.

The input name of the distributor element is formed by two variables. One variable is the data name 346 and the other is the place name 348 which determines whether the data name 346 will be passed on as the result value 350.

The result of the distributor elements is NULL if any input value is NULL. When a nonNULL value is presented on variable A 346 and a nonNULL value is presented on the variable D 338 the value of variable A 346 will be asserted as the result value 350. The input cannot be fully valid unless the D variable 348 is VALID. If the A variable 346 is presented to several distribute elements but only one of the elements has a nonNULL D value 348 then only that distributor element will pass the value asserted by the A variable 346 on to whatever place in the expression the result variable 0 350 is directly associated with. The other distributor elements will assert NULL result values to the places their result variable is associated with.

Figure 49:
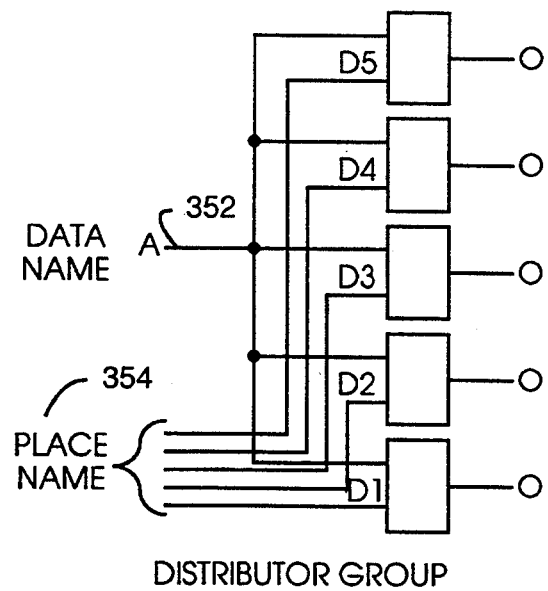
FIG. 49 illustrates a distributor element structure.

Distributor elements can be grouped to accommodate arbitrarily large choice sets and they can be ganged to accommodate arbitrarily long data names as shown in FIG. 49.

The value of the A variable 352 will be passed on only by the distributor elements that are presented with a VALID D variable value. Each place within the expression associated with the result of a distributor element has a name 354 with which it can be referenced. The place name 354 can mean "deliver the result from place A to the D3 place in the expression".

A selector element and a distributor element together can associate any two places in an expression and can move a data value from anywhere in an expression to anywhere else in an expression. The movement of the data value is controlled by the place names 354 presented to the selector and distributor elements. The general associability of memory elements with interaction loci is now possible.

3.4 Memory-Interaction Locus Association

Figure 50:
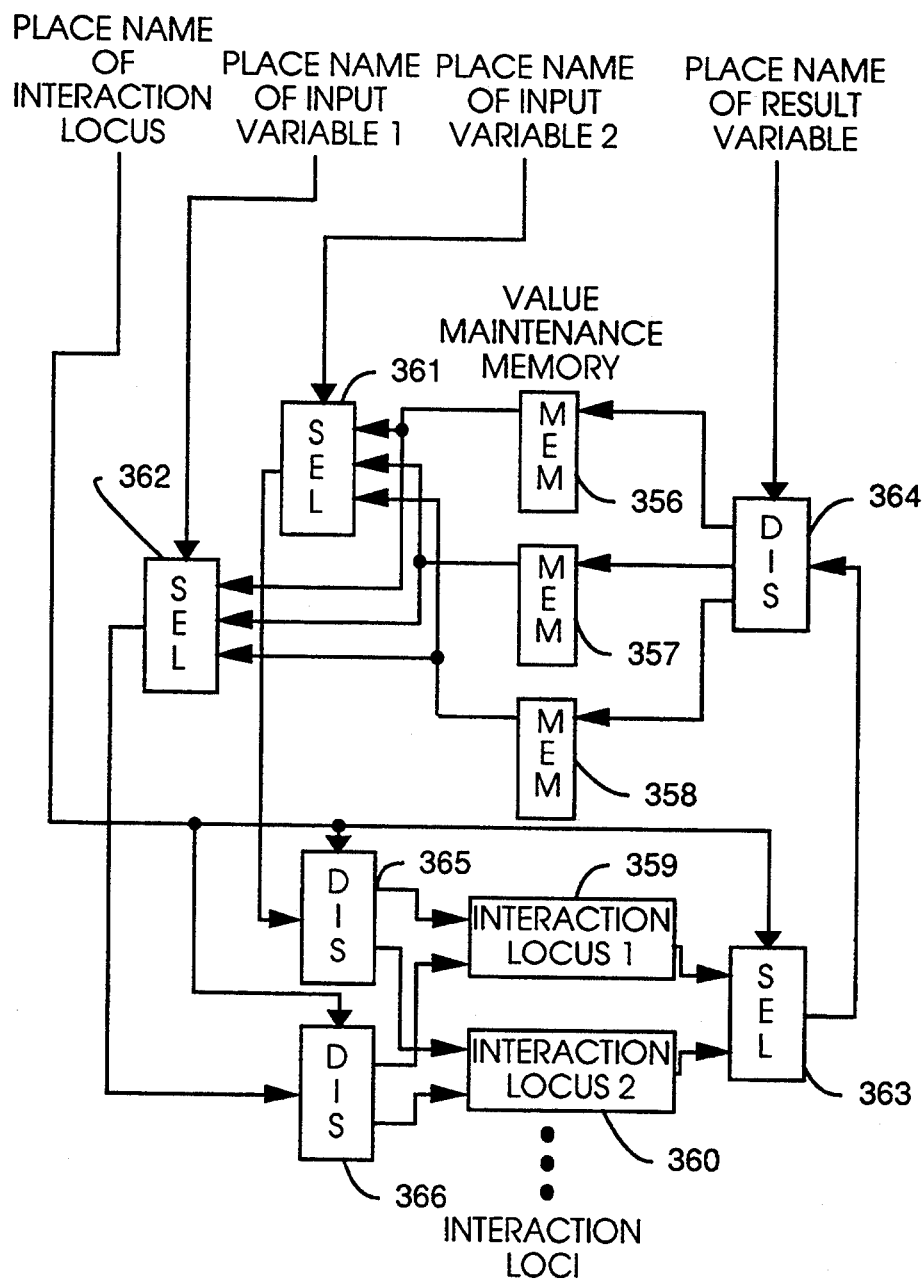
FIG. 50 illustrates the portion of a generally configurable process expression that configures association relationships for each interaction.

Referring now to FIG. 50, the memory elements 356,357, and 358 and the interaction loci 359,360 can be associated through selector elements 361,362, and 363 and distribute elements 364,365 and 366. The selector 361, 362, 363 and distributor 364,365,366 elements allow each memory element 356,357,358 and each interaction locus 359,360 to be accessed by name. Assuming that the input name of each interaction locus 359,360 is two values long a set of four place names will completely specify which two memory elements 356,357,358 supply the two values of the input name, which interaction locus 359,360 resolves the input name and in which memory element 356,357,358 the result value is stored. Each interaction of an arbitrary process can be specified by a different set of four place names.

Assume for the time being that by some means the four place names are presented for a time. Then they become NULL for a time then four new place names are presented and this cycle just somehow continues. Assume also that the input name to be resolved is prestored in the memory.

The two input variable place names select two asserted values from three memory elements 356,357,358 via two select elements 361,362. The selected values are subsequently presented to two distribute elements 365,366. The interaction locus place name directs the distribute elements 365, 366 to present the formed input name to one of the interaction loci 359,360. The interaction locus (e.g.359) resolves the input name and asserts a result value. The asserted result value is selected by a select element 363 also by means of the interaction locus place name. The result place name then directs the result through a distribute element 364 to the input of a single memory element (e.g. 356). This element stores the presented value and one interaction cycle is completed.

The expression begins with all values NULL except the values independently asserted by the memory elements 356,357,358 . As soon as the place names of the input variables are nonNULL the input names to the two select elements 361,362 become VALID because the memory elements 356,357,358 are always asserting nonNULL values. As soon as the results of the select elements 361,362 are nonNULL and the interaction locus place name is nonNULL then the input name to two of the distribute elements 365,366 becomes VALID and their result values become VALID. This presents a VALID input name to one of the interaction loci (e.g.359) which proceeds to resolve it . The result of the named interaction locus (e.g. 359) becomes nonNULL and the input name to the select element 363 becomes VALID. The result of the select element 363 becomes nonNULL and when the result variable place name is nonNULL the input to the distribute element 364 becomes VALID. The result of the distribute element 364 becomes nonNULL and a nonNULL value is presented to the input of one memory element (e.g. 356) and the memory element (e.g. , 356) stores the value.

The four place names become NULL and the NULL values propagate throughout the expression. Every asserted value in the expression becomes NULL except the values being independently asserted by the memory elements 356,357,358. The result value recently asserted to one memory element (e.g. 356) becomes NULL and all of the input values to the memory elements 356,357,358 are NULL. Then four new place names can be presented to the expression and a new cycle of valid names begin flowing through the expression to resolve the next interaction.

How this cycling place name presentation might be expressed is the next convention to be defined.

3.5 The Boundary Element

A single directly associated NULL convention expression can only resolve one input name at a time and that input name must be stably maintained on the input variables of the expression until it is fully resolved and the expression is asserting a VALID result value. This result value must be stably asserted until it has fulfilled its duties of forming other input names in the larger expression. When the result value need no longer be asserted by the expression itself the input name of the expression can become NULL which will propagate NULL value through the expression and eventually set the asserted result value to NULL. At this point, a new input name can be presented to the expression for resolution.

The presentation of a sequence of input names to one expression by one or more other expressions must be sensitive to the NULL-VALID state of all involved expressions. This requires a new convention of expression residing between the expressions which can resolve questions concerning the state of the several sequentially interacting expressions and mediate the transfer of names between the expressions.

The essential interexpression event is the formation of a VALID input name. The essential concerns of a name resolving expression are when is a VALID input name presented and when is the resolution of a name completed. An expression can determine through its value transform rule set when an input name is valid but it cannot determine when a resolution is completed because that depends on when the expressions using its result value as part of their input name no longer need it to be asserted. A resolution is completed when the result value asserted by the expression has effectively contributed to all of its associated input names. There must be an agent associated with each name resolving expression that can answer these concerns for each expression and mediate the formation and resolution of input names among the name resolving expressions. Because the essential interexpression event is the formation of input names this agent is most conveniently viewed as a boundary element associated with the input of each name resolving expression. This boundary element will isolate and bound the expression and mediate all of its name commerce with other expressions. All expressions that exchange sequences of names with each other must interact through the services of a boundary element.

The boundary element must collect the input name, determine when it is VALID, store the input name and stably present it to the resolving expression, determine when resolution is complete, present a NULL input name to the resolving expression to reset the entire expression to NULL, recognize when the complete expression is reset and then collect a new input name. All of this can be achieved with a bit of memory, the ability to recognize completely NULL and completely nonNULL input names and a familiar two variable handshake protocol between boundary elements.

The memory is necessary to store the input name so that it can be stably presented to the resolving expression independently of the expressions that asserted the pieces of the input name. A presenting expression need only assert its result value until the input name is stored into the boundary element memory.

A completely VALID input name and a completely NULL input name are the two discrete boundaries of interexpression name transfer. A completely VALID input name means that an input name is formed and can be resolved. A completely NULL input name must occur before another input name can begin forming.

The two variable handshake protocol communicates between boundary elements these two interexpression states of input names. The unique aspect of the NULL convention boundary element is that the data name itself is one of the handshake variables with its logical states being completely NULL and completely non-NULL. The data name itself is the communication from the presenter to the receiver. A single acknowledge variable communicates from the receiver to the presenter. The following conversation, shown in Table 13, summarizes the exchange. The presenter is in bold text and the receiver is in plain text.

TABLE 13

| |
|---|
| I am presenting a name to you. |
| ( valid result name presented to boundary element) |
| I have received your name |
| (assert acknowledge when complete input name is VALID) |
| I understand you have the name |
| ( NULL result name presented to boundary element) |
| Thank you for the name |
| (unassert acknowledge when complete input name is NULL) |

Figure 51:
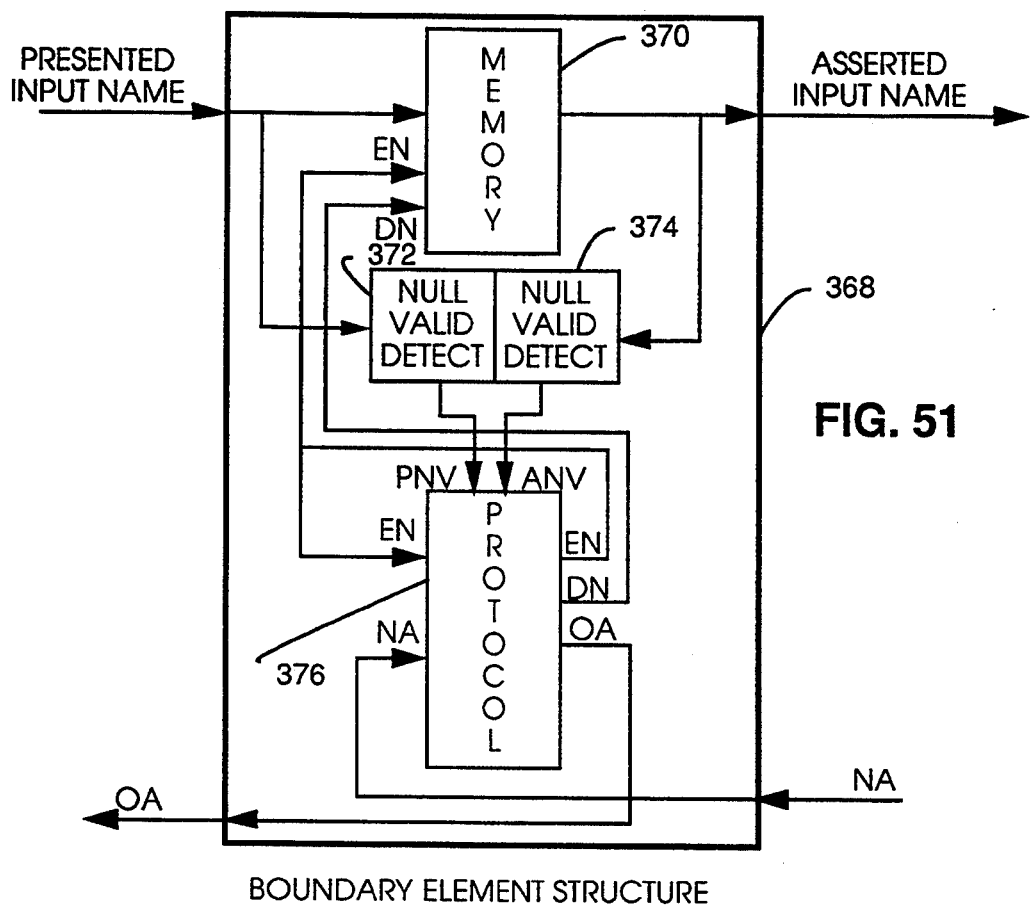
FIG. 51 shows the structure of the boundary element.

Referring now to FIG. 51, a boundary element 368 must consist of a memory element 370, a NULL-VALID detection element 372,374 and a protocol resolution element 376. A boundary element 368 operates via a cooperative interplay of these three expression elements.

The memory element 370 will accept and store any input name presented to it when the variable EN (Enable Name) is VALID (V) and stably assert the stored name. When EN is NULL (N) the externally presented input name is ignored by the memory 370. The last stored name is stably asserted until DN (Disable Name) is VALID which forces the asserted name to NULL. NULL is asserted until a new input name is accepted by EN becoming VALID. The name asserted by the memory cycles between all NULL and all VALID.

3.5.1 The NULL-VALID Detection Element

The NULL-VALID detection element 372,374 must establish the transitions between completely VALID names and completely NULL names for both presented input names and names asserted by the memory 370. When the entire presented input name is VALID the variable PNV (Presented Name VALID) will become VALID. When the presented input name is completely NULL PNV will become NULL. PNV must not change its value when the presented input name is part VALID and part NULL. When the asserted input name is VALID the variable ANV (Asserted Name VALID)

will become VALID. When the asserted input name is completely NULL ANV will become NULL. ANV also must not change its value when the asserted input name is part VALID and part NULL.

Figure 52:
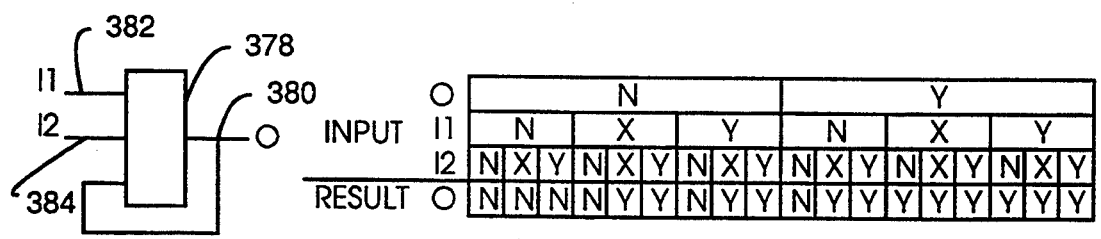
FIG. 52 shows a variable structure and transform rule set to implement a NULL-VALID detector element.

This transition between completely NULL and completely VALID input names can be monitored with the expression element 378 shown in FIG. 52. The result variable 380 is associated to the input 384 to represent the current state of the determination.

Assuming an all NULL starting name the result variable O 380 is NULL. Result variable O 380 will not change to VALID until both input variables I1 and I2 382,384 are VALID. Once result variable O 380 is VALID it will not change back to NULL until both input variables I1 and I2 382,384 are NULL. So the result variable O 380 will indicate when the input names I1 and I2 have changed from all NULL to all VALID or from all VALID to all NULL.

Figure 53:
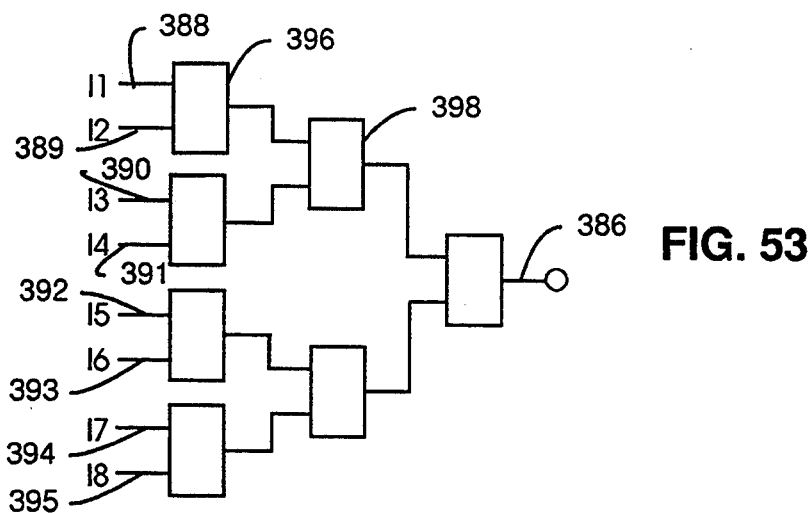
FIG. 53 shows how a NULL-VALID detector can be cascaded to accommodate any size name.

These expression elements can be cascaded to accommodate any size input name as shown in FIG. 53.

If the result variable O 386 of the expression is NULL it will not switch to VALID until all 8 input variables 388 through 395 are nonNULL. IF 1 input variable (e.g. 388) is NULL the result of its element 396 will remain NULL and the next element 398 in the network will remain NULL and so forth. The result variable O 386 will not change from NULL to VALID until all asserted values in the network are nonNULL which means that all of the input variables 388 through 395 must be asserting nonNULL values. Similarly, the result variable O 386 will not change from VALID to NULL until all asserted values in the network are NULL which means that all of the input values must be NULL. The NULL-VALID detect expression element insures that names presented to the boundary elements and asserted by the boundary elements are changing between completely VALID and completely NULL and can be used to assert the values for the variables PNV and ANV.

3.6 The Protocol Element

The protocol expression element controls the memory and manages the handshake conversation between the boundary elements. This protocol conversation will be discussed in terms of the presenting, current and next boundary elements. The presenting boundary element is the previous boundary element presenting an input name to the current boundary element. The next boundary element is the succeeding boundary element that the current boundary element asserts its result name to. This discussion will ignore the fact that there is a name resolving expression between the boundary elements.

The protocol element's input variables (see FIG. 54) are PNV, ANV, EN and NA. The input names that these variables form to the protocol element will be called state names. PNV, ANV and EN are asserted internally to the boundary elements 400, 402, and 404. NA (Next Acknowledge) is the acknowledge variable from the next boundary element (e.g. 404) receiving the asserted result name of the current boundary element (e.g. 402). The boundary element's result variables are EN, DN and OA. OA (Own Acknowledge) is the acknowledge variable from the current boundary element (e.g. 407) to the presenting boundary element (e.g. 400) that is asserting the presented input name to the current boundary element (e.g. 402). OA of the current boundary element (e.g. 402) is NA for the presenting boundary element (e.g. 400). The associated boundary elements with dependent result variables associated between each other constitute a sort of distributed state machine. Each boundary element (e.g. 400,402 and 404) is cycling through a distinct state name sequence that depends on the results of other boundary elements. The state name transform rule set for the protocol expression is in FIG. 55.

Figure 56:
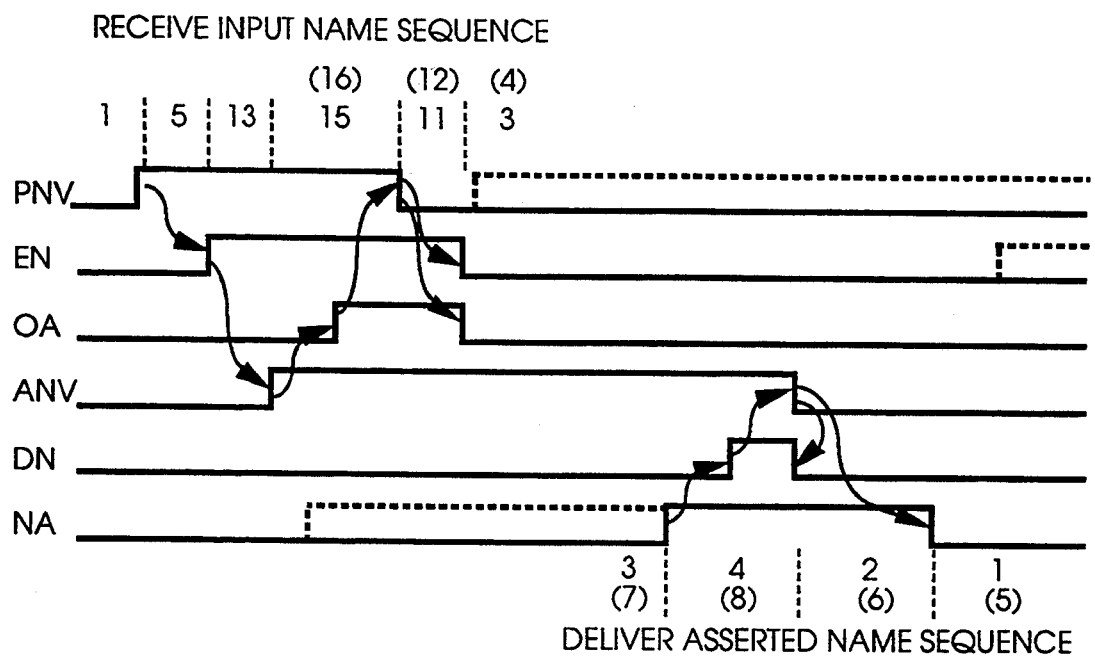
FIG. 56 shows the value change timing relationships among the variables of the boundary element.

These state name transformation rules establish a necessary sequence of state names for each boundary element which is illustrated in the sequence diagram shown in FIG. 56.

Assuming that the entire expression begins with a NULL presented input name the boundary element is in state name 1 waiting to receive a VALID presented input name with a receive input name sequence. The first possible event is the presentation of a VALID input name to the boundary element which will cause PNV to become VALID. This will form state name 5 which will set EN VALID and cause the memory to store the presented input name and form state name 13. EN VALID and the memory storing the input name will eventually cause ANV to become VALID forming state name 15. The result of state name 15 will set OA VALID. This is the acknowledge to the boundary element presenting the input name to the current boundary element. OA VALID says to the presenting boundary element that the name has been received, that it no longer needs to be stably presented and that it can be set to NULL. Eventually, the presenting element will set its asserted name to NULL and the presented input name of the current element will become completely NULL at which time PNV will become NULL and state name 11 will be formed. The result of state name 11 is to reset OA and EN to NULL forming state name 3 and the receive input name sequence is completed.

The protocol expression will remain in state name 3 until the acknowledge NA from the next boundary element becomes VALID and the deliver asserted name sequence is begun. The NA variable for the current boundary element is the OA variable asserted by the next boundary element. NA VALID means that the next boundary element has received the name and the current boundary element can unassert its result name by setting it to NULL. NA becoming VALID forms state name 4 which will set DN to VALID which will cause the memory to set its asserted name to NULL. The asserted name becoming NULL will cause ANV to become NULL which will form state name 2. When the NULL asserted name propagates to the next boundary element and its PNV variable becomes NULL it will set its OA variable to NULL which is NA for the current boundary element. When NA becomes NULL state name 1 will be formed. The deliver asserted name sequence is completed and the current boundary element is ready to receive another input name from the presenting boundary element.

There are two variables that are not directly or indirectly under the control of the current boundary element. The presented input name may become VALID at anytime after a receive input name sequence is completed and NA may become valid at anytime after the asserted name becomes VALID which is indicated by ANV becoming VALID. Both of these eventualities are accommodated by alternate state name sequences for both the receive input name sequence and the deliver asserted name sequence. During a receive input name sequence NA can become VALID anytime after the asserted name and ANV has become valid. The state name sequence 16, 12 and 4 incorporates the VALID NA and allows the receive input name sequence to complete without a deliver asserted name sequence starting. The last state name 4 begins a deliver asserted name sequence immediately after the receive input name sequence is completed.

Any time after a receive input name sequence is completed or during a deliver asserted name sequence the presented input name can become VALID and PNV will become VALID. A new presented input name cannot be received before the current asserted name has been delivered so the receive input name sequence must be suppressed until the deliver asserted name sequence is completed. The state name sequence 7, 8, 6 and 5 accommodates this by incorporating PNV VALID in the state names of the deliver asserted name sequence. With PNV VALID the deliver asserted name sequence will end in state name 5 which will immediately begin a receive input name sequence.

A presented input name will be received and stored in the memory elements and stably asserted until the next boundary element can receive it. Then the current boundary element is freed up to receive another presented input name. Names flow through an expression as packets from boundary element to boundary element. Between the boundary elements there can be any name resolving expression. The names will flow through the name resolving expression and be transformed before reaching the next boundary element.

Figure 57:
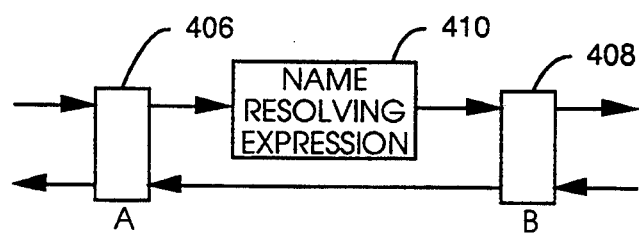
FIG. 57 illustrates how name resolving expressions are inserted between boundary elements to form larger expressions.

Referring now more particularly to FIG. 57, the name transmission path from boundary element A 406 to boundary element B 408 goes through a name resolving expression 410 that will perform some transform on the name. Boundary element A 406 will complete a receive sequence and present a VALID asserted name. ANV will become VALID and the name will be asserted until the receive input name sequence is initiated by boundary element B 408. The asserted name will propagate through the name resolving expression 410. The initially NULL asserted result of the name resolving expression 410 will at some time become all VALID and present a VALID input name to boundary element B 408. The presentation of a VALID name to the input initiates the receive input name sequence for boundary element B 408. When the receive input name sequence is initiated OA of boundary element B 408 is set VALID which is NA for boundary element A 406 and which initiates the deliver asserted name sequence for boundary element A 406. The asserted name of boundary element A 406 is set to NULL and this NULL name propagates through the name resolving expression setting its result to NULL. The input name of boundary element B 408 becomes NULL and PNV of boundary element B 408 becomes NULL. This causes boundary element B 408 to complete its receive input name sequence by setting OA to NULL which is NA for boundary element A 406 and completes the deliver asserted name sequence for boundary element A 406. The name resolving expression has been reset to NULL so the boundary element A 406 can now receive another input name to assert to the name resolving expression 410 for resolution. The boundary element protocol will properly resolve with any arbitrary delay in the data name transmission path.

A name resolving expression 410 bounded by boundary elements 406,408 will cycle through completely NULL states and completely VALID states so that the NULL convention criteria that allows determination of the completion of the resolution of a name resolving expression 410 is satisfied.

3.6.1 Boundary Element Association Structures

Figure 58:
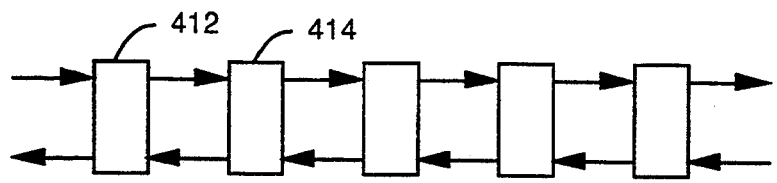
FIG. 58 illustrates how boundary elements can be pipelined.

Boundary elements can be associated in various structures. The simplest structure is a pipeline as shown in FIG. 58.

The pipeline is completely autonomous. A VALID input name presented to the first boundary element 412 in the pipeline will begin a sequence of interactions that will propagate that name from boundary element to boundary element completely through the pipeline. As each boundary element (e.g., 412) sees a valid input name it will receive it and assert it to the next boundary element (e.g. 414) in the pipeline. Several names can be simultaneously propagating just like any other pipeline. The propagation rate of the pipeline is determined by the longest name transmission delay between two boundary elements.

Boundary elements can be associated in a fan in configuration that builds an input name from several asserted names.

Figure 59:
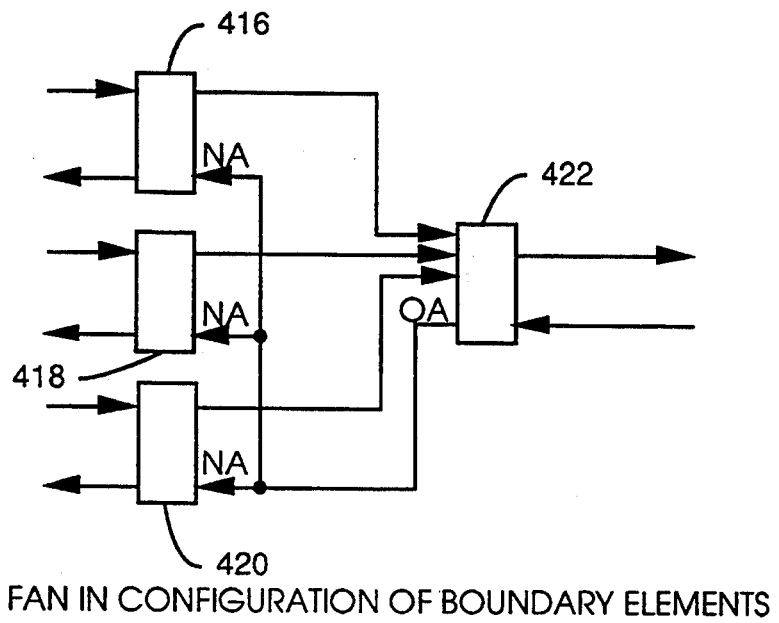
FIG. 59 shows a fan in configuration of boundary elements.

In FIG. 59, three boundary elements 416,418,420 are combining their asserted names to form the input name for another boundary element 422. The receiving element 422 will not recognize a VALID input name until all three asserted names are valid. It doesn't matter when these asserted names became valid each one will be stably asserted until it is acknowledged and its asserting boundary element 416,418,420 goes through a deliver asserted name sequence. An acknowledge in the form of a VALID NA will not occur until the receiving element sees a completely valid input name. When a completely VALID input name is presented the receiving element 422 will initiate a receive input name sequence generating a VALID OA which is fanned out to be the NA for each asserting boundary element 416,418,420. Each asserting boundary element 416,418,420 initiates a deliver asserted name sequence and resets its asserted name to NULL. When the NULL name has been received from each asserting boundary element 416,418,420 and the complete input name is NULL, the receiving boundary element 422 will reset OA to NULL thereby completing its receive input name sequence and completing the deliver asserted name sequence for each of the asserting boundary elements 416,418,420.

A fan out association where one asserting boundary element delivers its asserted name to several other boundary elements requires an acknowledge collector to insure that all the receiving boundary elements have received the asserted name before resetting it to NULL.

Figure 60:
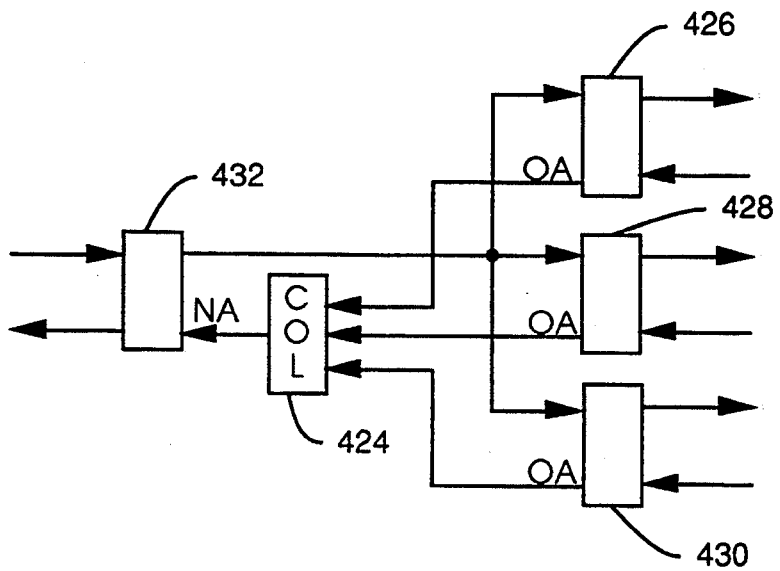
FIG. 60 shows a fan out configuration of boundary elements.

In FIG. 60, the acknowledge collector 424 is the same expression as the NULL-VALID detection element used in the boundary element. The input to the collector 424 are the OA acknowledge variables from each receiving boundary element 426,428,430. When all of the OA variables are VALID indicating that all of the receiving boundary elements 426,428,430 have seen a VALID input name the collector 424 asserts a VALID result variable which is the NA variable for the asserting boundary element 432. The asserting boundary element 432 can then set its asserted name to NULL. The result of the collector 424 does not become NULL until all the OA variables from all the receiving boundary elements 426,428,430 are NULL indicating that the receive input name sequence for all the receiving boundary elements 426,428,430 has been completed.

The deliver asserted name sequence for the asserting boundary element 432 is then completed.

Complex association structures of boundary elements can be formed by interassociating these basic structures. Structures can be formed that will deadlock and livelock and otherwise misbehave but there is an inherent rationale for keeping the boundary element structures simple. If a boundary element association structure is complex in such a way that many expression elements must be tied up maintaining their result names until they have formed a VALID input name then that expression might as well be expressed as a single directly associated process.

Boundary elements preferably are best used to partition an expression into discrete independently procedable units that may be complex internally but that have fairly straightforward and simple interfaces between them. This allows many expression elements to be simultaneously resolving names increasing the overall throughput of the expression. So, the appropriate place in the expression for a boundary element association is wherever there is a fairly simple name association relationship.

An expression of associated boundary elements is like a chain reaction poised to be triggered. A valid input name will trigger the progression of events that is the expressed process. As the events proceed the expression resets itself to be triggered again. The expression is complete in itself. No external driving influence such as a clock is needed. There is nothing special or magic about the expression it is just a specific associational structure of expressional convention elements which themselves are structures of primitive expressional elements. Nothing new beyond variables, values, value transform rules and variable association rules has been postulated here in.

3.7 A Generally Configurable Process

Figure 61:
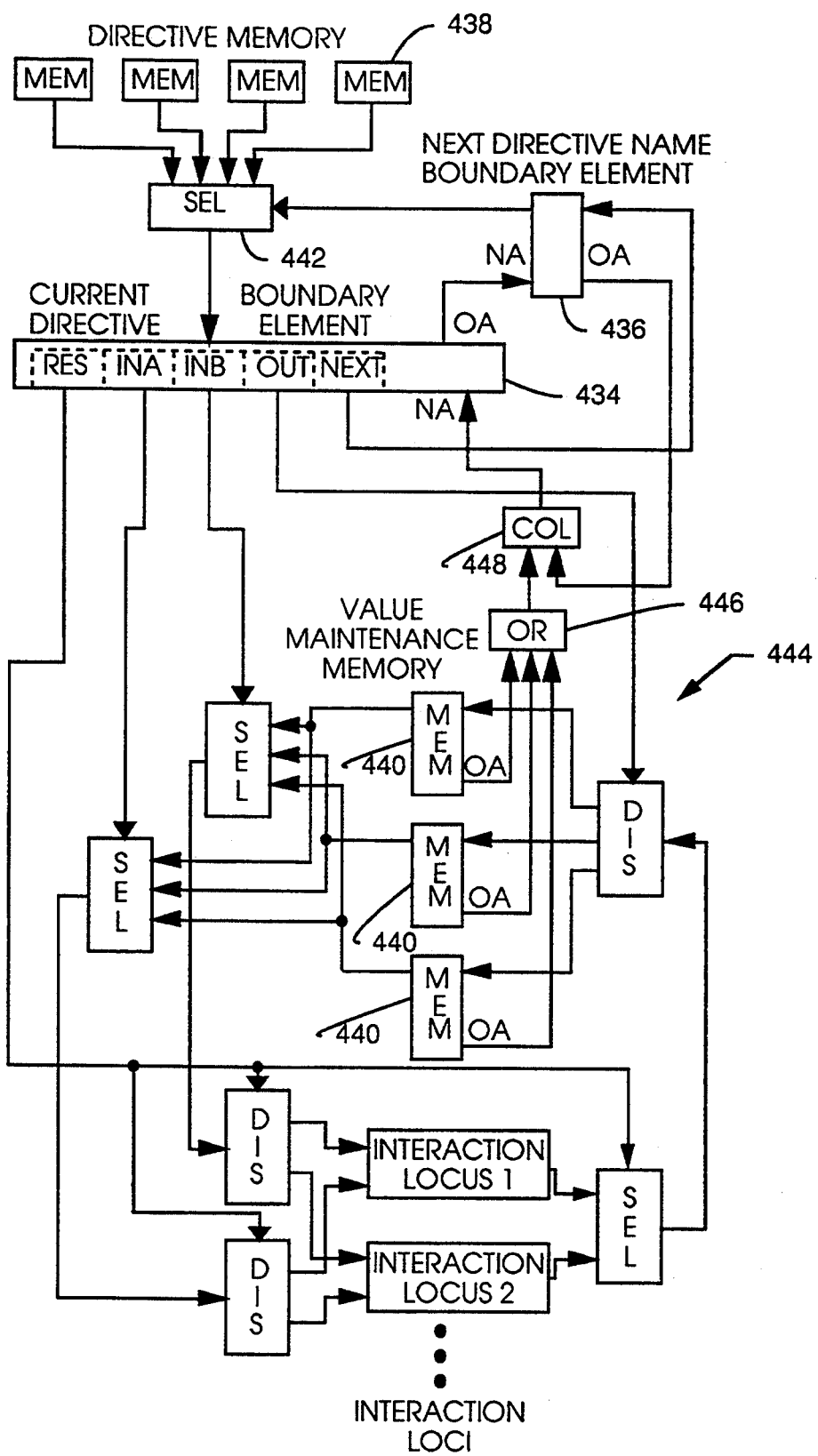
FIG. 61 shows the complete generally configurable process expression.

The boundary element convention completes the set of new conventions needed to express a generally configurable process. With the boundary element a sequence of directives each of which includes several place names can be properly presented to the memory-interaction locus expression. The diagram shown in FIG. 61 illustrates a generally configurable process.

The generally configurable process expression is completed by adding to the memory-interaction locus expression two boundary elements 434,436 and a memory 438 to maintain the directives that specify the progression of association relationships. Each directive consists of the set of the four place names discussed earlier. At the top of the expression is a loop of two boundary elements 434,436 that form the control aspects of the expression. One boundary element 436 maintains the name of the next directive and one boundary element 434 maintains the current directive. The boundary elements 434,436 are associated in a loop that will remain actively cycling through consecutive directives as long as there is a valid next directive name.

Since the issue of I/O is being ignored by this example it will be assumed that the directive memory 438 is properly set and that the input name to be resolved is already in the value maintenance memory 440. Activity is initiated when the next directive name boundary element 436 asserts a next directive name. This name resolves the select element 442 to pass the asserted contents of one of the directive memory elements 438. This name becomes VALID to the current directive boundary element 434 which receives the directive with a receive input name sequence which completes the deliver asserted name sequence of the next directive name boundary element 436. This frees up the next directive name boundary element 436 to receive a new name. This new name is the next field of the directive just received by the current directive boundary element 434. The next directive name boundary element 436 receives this name, presents it to the select element 442 which resolves the next directive from the named directive memory element 438 and asserts it to the input of the current directive boundary element 434.

Further activity is blocked until the current directive is resolved through the memory-interaction locus expression 444. The next directive boundary element 436 and current directive boundary element 434 are stuck in the middle of their respective deliver asserted name and receive input name protocol sequences.

The current directive boundary element 434 stably presents the place names of the current directive to the memory-interaction locus expression 444 until the directive is fully resolved. This full resolution is determined by the presentation of a valid result value to a value maintenance memory element 440. The value maintenance memory elements can now be defined to be partial boundary elements 434,436. Enough protocol is associated with each memory element 440 so that it can perform a receive input name sequence. Since the memory elements 440 do not do deliver asserted name sequences the receive input name sequences are not dependent on the completion of a deliver asserted name sequence. The result is that whenever a valid value is presented to a value maintenance memory element 440 that name will be received and stored and a receive input name sequence will be initiated without delay. The value maintenance memory elements 440, then, are protocol sinks. They receive and resolve protocol transactions but do not originate any protocol transactions.

The assertion of OA VALID by any memory element through the OR element 446 means that a VALID result name has been received and the resolution of the asserted directive by the memory-interaction locus expression 444 is complete. In other words the directive has done its job and can be removed. But the directive cannot be removed until the next name has also been received. So the OA acknowledge from the name formation memory element 440 is associated through a collector element 448 with the OA acknowledge from the next directive name boundary element 436 which means that the next directive name has been stored by next directive name boundary element 436. These two acknowledges indicate that the entire contents of the directive have been resolved and the directive can be unasserted and the next directive received by the current directive boundary element.

The current directive boundary element 435 sets the current directive to NULL. This NULL name propagates through the memory-IL element and gets to the memory element 440 which unasserts OA. Similarly the protocol sequence with the next directive name boundary element 436 is completed and the result of the collector becomes NULL. The deliver asserted name sequence for the current directive boundary element 434 is completed and the new directive that is already presented to its input can be received and presented to the memory-interaction locus expression 444. As each directive is presented and resolved the arbitrary DAP is resolved one interaction at a time and the result is left in the value maintenance memory 440.

Given a properly formed set of directives any desired structure of association relationships among the available interaction loci can be expressed. Once the expression is set up and the first directive name is inserted into the next directive name boundary element 436 the expression will begin cycling through directives and resolve the expression quite autonomously.

3.8 The Directive Expression

To keep the discussion in somewhat familiar territory the binary logic expression of the example DAP from the previous section will be used as the example for the discussion. The example is repeated here in FIG. 62 as it appeared in the previous section.

Figures 62, 63:
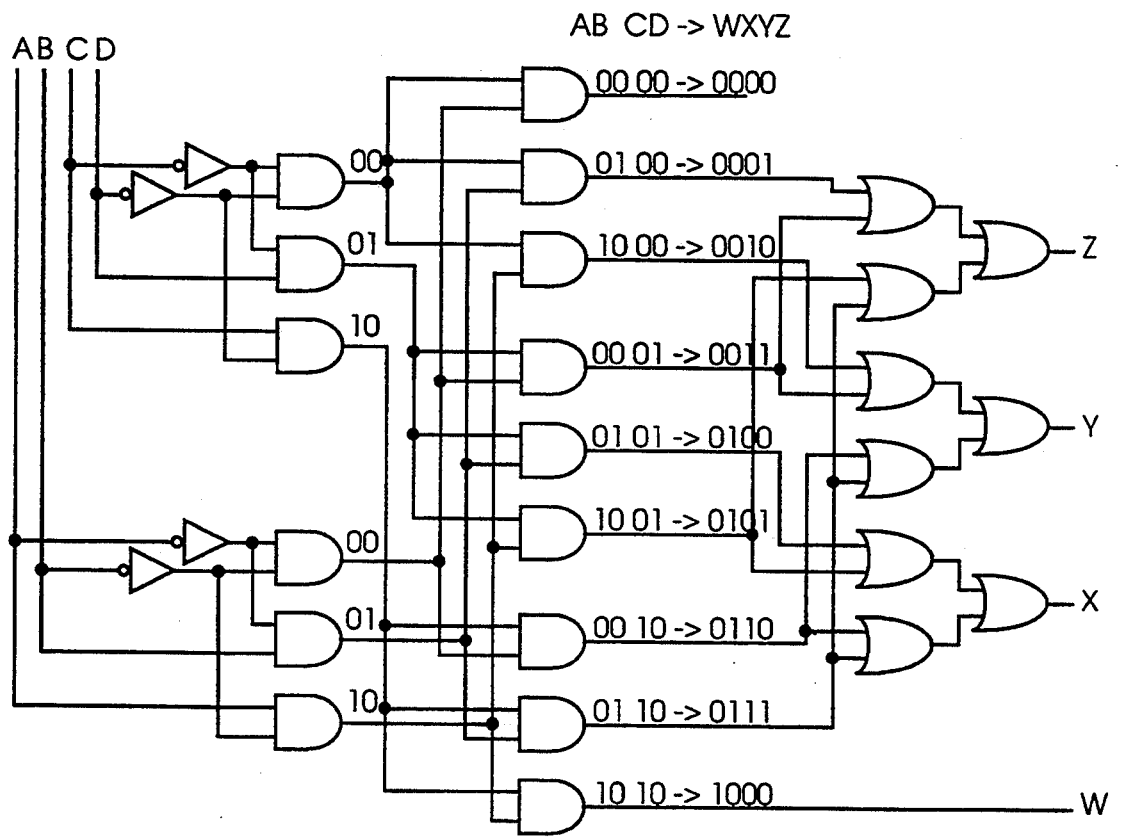
FIG. 62 is the example binary logic circuit shown in FIG. 39.
FIG. 63 shows the transform set for the complete example process.

The transform set for the complete process is shown in FIG. 63.

Figure 64:
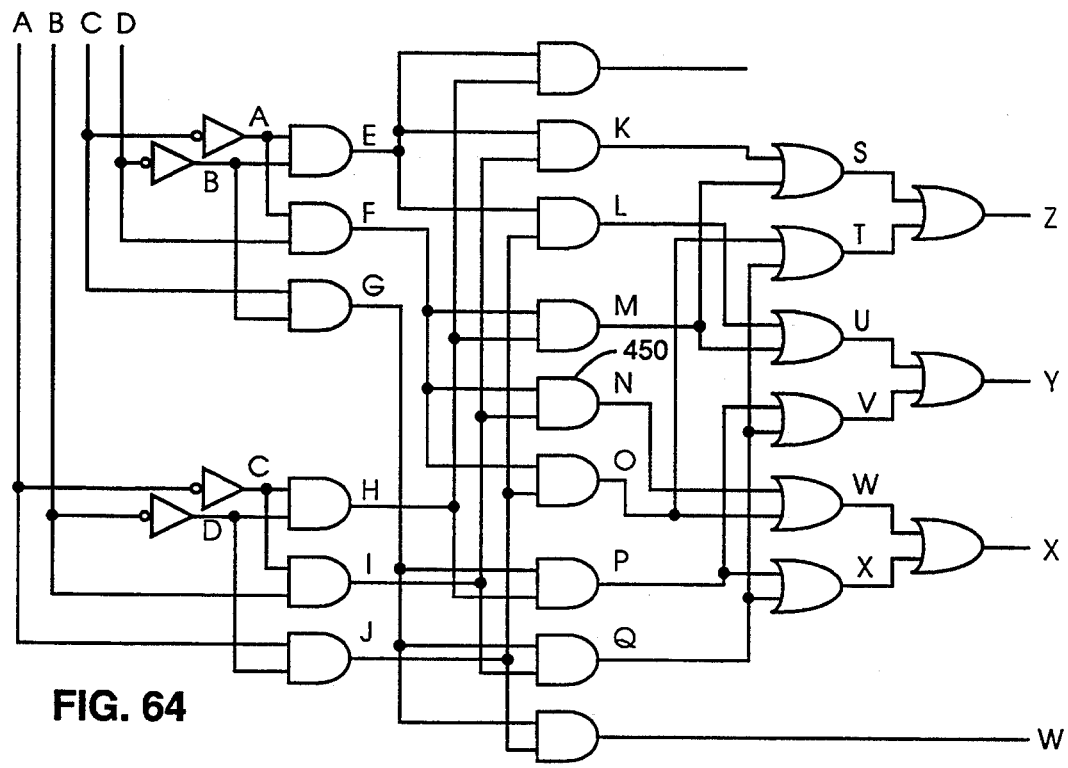
FIG. 64 is an example process expression to be mapped into the generally configurable process.

For this example the set of interaction loci are AND, OR and NOT. The data name to be resolved must be stored in the value maintenance memory so the first step is to assign the input variables and each result variable in the expression the place name of a memory element. It will be assumed for the example that the place names of the name formation memory elements are the letters of the alphabet. An arbitrary assignment of letter place names to results for the example is illustrated in the diagram shown in FIG. 64.

This completely defines the memory assignments necessary to express the example DAP. There must be one directive for each interaction locus in the DAP.

The general format for a directive is shown in Table 14 below.

TABLE 14

| locus name | input 1 name | input 2 name | result name | next directive name |
|---|---|---|---|---|

The directive for the resolution of the input name in memory elements f and i by an AND gate with its result assigned to n would be (as shown below):

AND f i n next

The results stored in f and i form the input data name for resolution by the AND gate 450 and the result of the resolution is stored in n. The name next signifies the place name in the directive memory element which contains the next directive.

Figure 65:
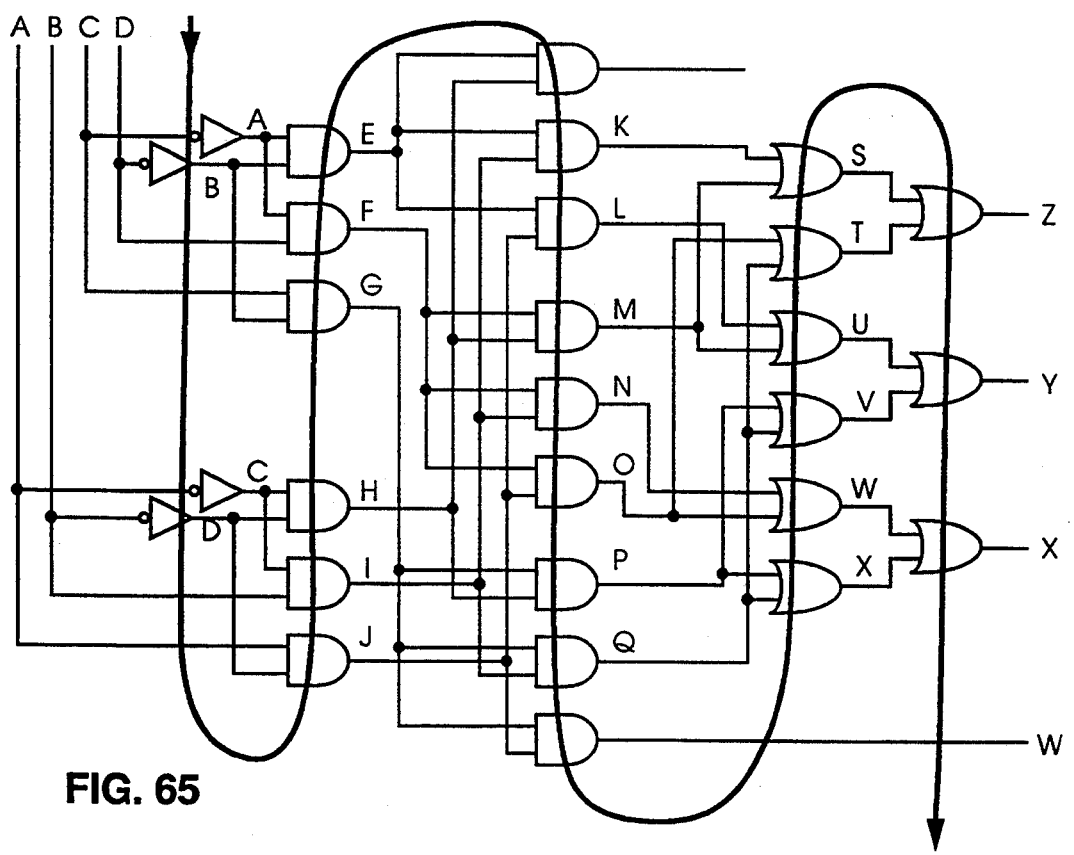
FIG. 65 shows the sequence thread of interactions for the generally configurable process to perform one at a time.

Since the generally configurable process can only resolve one directive at a time the next step in mapping a DAP into directives is to sequentialize the progression of data name formations and resolutions. There are many sequences that will suffice. The criteria as with any other form of expression is that each input data name is validly formed before it is resolved so any sequence that always generates the result components of an input data name before that input data name is resolved is adequate and correct. One such sequence is illustrated with a sequence thread passing through the example DAP as shown in FIG. 65.

There are lots of sequence threads that will not suffice. For instance, the reverse of the example thread would be completely wrong. No input data name would be validly formed when its resolution was directed. The structural essence of any process expression whether it's expressed sequentially or concurrently is the name formation dependencies among the name resolutions. The following list shown in Table 15 is the complete sequence of directives to express the example DAP.

TABLE 15

| directive memory element name | DAP name | name formation memory element name | name formation memory element name | name formation memory element name | directive memory element name |
|---|---|---|---|---|---|
| 1 | NOT | C | | a | 2 |
| 2 | NOT | D | | b | 3 |
| 3 | NOT | A | | c | 4 |
| 4 | NOT | B | | d | 5 |
| 5 | AND | A | d | j | 6 |
| 6 | AND | B | c | i | 7 |
| 7 | AND | C | d | h | 8 |
| 8 | AND | C | b | g | 9 |
| 9 | AND | D | a | f | 10 |
| 10 | AND | a | b | e | 11 |
| 11 | AND | e | i | k | 12 |
| 12 | AND | e | i | l | 13 |
| 13 | AND | f | h | m | 14 |
| 14 | AND | f | i | n | 15 |
| 15 | AND | f | j | o | 16 |
| 16 | AND | g | h | p | 17 |
| 17 | AND | g | i | q | 18 |
| 18 | AND | g | j | W | 19 |
| 19 | OR | q | p | x | 20 |
| 20 | OR | o | n | w | 21 |
| 21 | OR | q | p | v | 22 |
| 22 | OR | m | l | u | 23 |
| 23 | OR | q | o | t | 24 |
| 24 | OR | k | m | s | 25 |
| 25 | OR | s | t | Z | 26 |
| 26 | OR | u | v | Y | 27 |
| 27 | OR | w | x | X | NULL |

The sequence of directives along with the generally configurable process form a complete process expression. A completely different process can be expressed by presenting a different sequence of directives to the generally configurable process.

3.9 Enhancements

Now that the issues of local stable value expression and cyclic name presentation have been resolved the example generally configurable process can be straightforwardly enhanced to a generally configurable process equivalent to the modern computer.

Straightforward extensions to the example expression can bring it more in line with the current vision of a processing architecture. The memory and data paths can be widened to accommodate larger names and the interaction loci replaced with a set of larger directly associated processes such as arithmetic-logic operations to resolve the larger names. The name resolution elements are just pieces of preexpressed process that the arbitrary processes can use in their own expression. A resolution element can be can be as small as an interaction locus or as large as another cycling expression such as an array processor. All control is asynchronous and a resolution element can be configured to return its own handshake value to indicate completion.

A second alternative next directive name can be specified in the directive and the actual next directive chosen conditionally on a resolution result value. Another means to the same end is to define the directive memory place names to be consecutive numbers and arrange the directives such that the implicit next directive name is almost always one greater than the current directive name. An implicit next directive name can be maintained in a small specialized memory element that automatically increments its value each cycle. Only alternative conditional directive names need be explicitly specified in the directive itself.

The value maintenance memory can also be named with consecutive numbers and values can be referenced relative to indirect relationships or even to arithmetic formulas so that the configuration of association relationships between the value maintenance memory and the name resolution elements can be relative to previous configurations or even conditional on the values of input data name from the actuality expression of the arbitrary process. Small memory elements at various places in the expression can maintain and manipulate place names forming a register set with indexing capability. Directives can indirectly refer to actual place names in the memory by referring directly to these smaller memory places and arithmetic functions on their asserted values.

The directive memory and the data memory can be made the same memory. The only aspect of current processing architectures that cannot be conveniently accommodated by the example is the imposition of a global system clock.

With the addition of conditionality relative to the input data name in both the determination of the next directive and the determination of the association relationships between value maintenance memory and the resolution elements the generally configurable process establishes a new realm of expressivity that was not attainable with just a DAP or with the nonconditional generally configurable process. This is the capability to resolve indefinite length names.

3.9.1 The Advantage of Progressive Iteration

Sequential iteration while not expressionally primitive still fills an important and essential place in the expression and resolution of processes. There are input names that cannot be resolved any other way except with conditional iteration.

The generally configurable process resolves an expressed arbitrary process by iterating through its specification a piece at a time. The actual expression of the arbitrary process is literally composed during resolution. Because the arbitrary process expression is effectively composed piece by piece during resolution its composition can be conditionally redirected during resolution based on values in the input data name. The expression of the process can within limits adjust to the form of its input data in a way that a DAP could not possibly provide. A DAP cannot grow larger or smaller but a generally configurable process can easily accommodate more or fewer iterations. A new dimension of expression of process is available with the conditional iterative resolution provided by the generally configurable process.

In particular, the generally configurable processor can resolve names of indefinite length. If the size of the input data name cannot be predetermined its resolution must be inherently iterative. The name must be resolved in an unpredeterminable number of partial resolution stages in tractable pieces at a time. Its resolution requires conditional iteration. The issues of resolution of indefinite length names is discussed more fully in the appendix.

3.10 Two New Forms of Expression

Two dramatically different forms of process expression have emerged with the generally configurable process. The first form of expression is one step at a time sequential expression and resolution. This leads to the possibility of conditional iteration which is a necessary form of expression for certain classes of processes. The second form of expression is the expression of the association structures and interaction relationships of process as association relationships among names represented exactly the same way that input data is represented.

While both of these forms of expression are essential, neither is conceptually primitive. They are derived forms that emerge from a significant body of expressional conventions some of which had to appeal to circular variable association relationships. Association loops around interaction loci provided the memory and NULL-VALID detectors with local stability of value assertion. Association loops between boundary elements provided continuous autonomous cyclic activity. These two new forms of expression cannot be achieved without the circular association relationships introduced with the conventions of the generally configurable process. In other words, they can only be derived in terms of directly associated generally concurrent process expressions.

3.10.1 Strict Sequentiality

Strict sequentiality is generally considered to be a process expression primitive. Far from being primitive it has emerged late in the game by virtue of a rather complex structure of concurrently resolving DAPs and expression conventions with circular association relationships.

Why did strict sequentiality suddenly emerge from expression forms that were generally concurrent? It arose primarily because any DAP of whatever size can resolve only one input name at a time. Internally a DAP is generally concurrent but at its input interface it must be strictly sequential. Each input name must be VALIDly presented and resolved then unpresented and a new input name VALIDly presented.

Strict sequentiality is also the easiest way to generally configure any arbitrary process by configuring the association relationships of one resolution step at a time. Each resolution step has all the resources of the generally configurable process devoted to it. Also a correctly sequenced expression eliminates the need for explicit VALIDation of input name formation. As soon as more than one resolution step is allowed to simultaneously proceed in the generally configurable process complicated issues of resource allocation and input name VALIDation must be considered.

Strict sequentiality is possible because certain forms of expression can be reduced to a progression of independently procedable name resolutions. This reducibility stems primarily from the expressional convention of the interaction locus that imposed directionality of interaction influence on variable association expressions and the NULL value convention that imposed discrete resolution events. The only influence on an interaction locus is its input name, if the input name is stable the interaction is a discrete resolution event that can proceed quite independently at its own pace. This makes the interaction locus an independently resolvable unit of expression.

A directionalized process expression can be reduced to its independently resolvable units of expression and those units can be carried out one at a time sequentially. The sequential expression is an exact behavioral emulation of the directionalized expression. A directionalized process such as a DAP can be expressed and resolved with full concurrency as directly associated interaction loci or it can be expressed and resolved one interaction at a time using memory to maintain result values and form input names. The resolution events of one expression are directly mappable to resolution events of the other expression and both expression deliver the identical final result.

Expressions that are not strictly directional such as nondirectionalized variable associations or direct circular association relationships similar to those of the boundary element cannot be similarly reduced to a sequence of independent resolution steps because there are no independent steps of resolution. If interactions are mutually influential in both directions then there are no clean boundaries of influence and therefore no conveniently separable and independently procedable pieces of the expression. However, these expressions are not and cannot be algorithmic in nature.

There are many forms of process expression with nondirectional mutually influential association relationships that cannot be directly reduced to independently procedable resolution steps. These process expressions can be approximately simulated in terms of discrete time steps with differential equations, but they cannot be mapped directly to independently procedable resolution steps. They cannot be exactly emulated by a sequential step by step expression. The fact that a process expression can be approximately simulated algorithmically does not mean that the process expression itself is algorithmic.

Particles in atoms and atoms in molecules are primitive variable association expressions that are continuously and mutually influential. For example, in a Hopfield neural net every resolution element receives its input name from all the other resolution elements so that every resolution is dependent on every other resolution. These expressions rely on multiple simultaneous associative resolution. No piece of the expression can be resolved independently from the other pieces of the expression. It cannot be reduced to a sequence of partial resolutions that accumulate to a total resolution. These process expressions are not algorithmic. The notion of the algorithm cannot directly encompass their resolution behavior.

The claim commonly expressed in discussions of cognition or artificial intelligence that any parallel expression can be sequentialized and that therefore parallelism or concurrency can be conveniently ignored in attempts to understand the workings of human mentation is simply mistaken. While sequential resolution is essential to an important class of processes it is neither primitive nor is it universally sufficient as a form of process expression.

3.10.2 Name Relationship Expression

Perhaps the most dramatic new form of process expression that has emerged with the generally configurable process is the expression of process as deferred specifications in exactly the same way that the input names are deferred specifications for DAPs. Process can be expressed as a configuration of values in exactly the same way that the input data name is expressed as a configuration of values.

Figure 66:
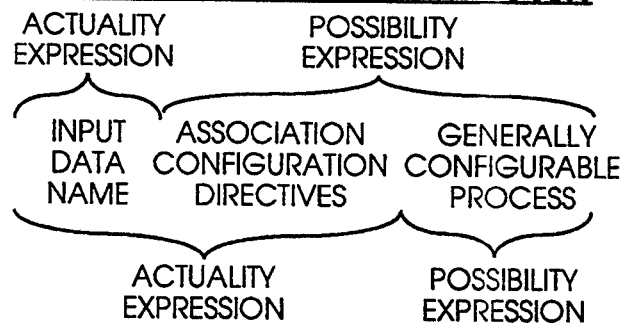
FIG. 66 illustrates a process from the viewpoint of the generally configurable process and the viewpoint of the arbitrary process.

Referring now more particularly to FIG. 66, a generally configurable process is a process that manages to defer almost all specification. From the point of view of the generally configurable process its actuality expression provides almost all of the expression of the arbitrary process being expressed including its input data name. From the point of view of the arbitrary process the generally configurable process may express as little of the arbitrary process as a few interaction loci. The rest of the possibility expression of the arbitrary process can be expressed in terms of relationships among names of places in the generally configurable process. These place names are formed as combinations of values in exactly the same way that input data is formed.

The names presented directly to the generally configurable process must of course be in terms of the values and combinations of values that the select and distribute elements recognize. A name, however, is just an expression of correspondence whether it is a set of voltage values, a string of characters or a protein shape. Relationships among correspondence references can mirror relationships among the actual things they correspond to.

The place names in the generally configurable process can be assigned a more conveniently human readable form as a string of alphanumeric characters. These names are of course not understandable by the generally configurable process but there is a one to one mapping between these names and the names that are understandable by the generally configurable process. The same relationships among internal names that are expressed by the directives can be expressed by syntactic relationships among these external alphanumeric names. An arbitrary process can be conveniently expressed externally by humans in terms of relationships among alphanumeric names and then directly mapped into the internal directives understandable by the generally configurable process.

The form of external expressions can be even further decoupled from the form of internal expressions. Since any memory element can be associated with any name resolution element there is no particular structure to the memory. Any internal memory name can be mapped to any external name as long as the mapping is one to one. Therefore external names can be chosen quite arbitrarily. They do not have to correspond in any way to the internal memory names. So external process expressions can express association relationships among arbitrarily chosen names external names which can be mapped into relationships among arbitrarily assigned internal memory element names. There must still, however, be a direct relationship between the internal and external names of the resolution elements. This is similar to the traditional form of external expression known as assembly language.

With conditional next directive and with relative memory name reference it is possible to resolve the same group of directives representing a piece of expression multiple times each time with a different data association configuration. This means that a group of directives in memory representing a piece of expression can be treated exactly as the directly associated name resolution elements of the generally configurable process are treated. That is, the same process expression piece in memory can be presented over and over with different configurations of association relationships to its input data name and its result place in memory. Just like the interaction loci of the example each resolution step can resolve a different name and put the result at a different place in memory. But these resolution steps are for arbitrarily defined pieces of process expressed as directives in memory.

This means that processes expressed as hierarchically nested pieces of process expression can be mapped directly into a generally configurable process. A group of directives can be mapped anywhere in memory and the data to be associated with it can be mapped anywhere into memory and the correct association relationships among these pieces can be internally expressed by the generally configurable process.

The generally configurable process with generally associable memory, conditional directive sequencing and relative memory name generation is a universal process. Directly associated name resolving elements are not even necessary. The transform rule set for any interaction locus can be expressed in memory as a look up table accessed with relative memory name formation. A value transform rule is just another form of association relationship among names. Any directionalized process expressed in any external form of expression that specifies association relationships among names can be mapped to an internal expression and resolved in a generally configurable process.

The possibility of expressing processes solely in terms of relationships among names has emerged from the convention of the generally configurable process. Processes can be expressed as association relationships among names in forms radically different from the form of their direct resolution. The expression of relationships among names may be in the form of DNA, a character string, an audible utterance, a pattern of neurons or a mathematical formula. The next section explores the expression possibilities of alphanumeric character strings.

3.11 Summary

Several new expression conventions were introduced which combined to form the convention of the generally configurable process. The generally configurable process led to the possibility of expressing processes entirely in terms of relationships among names and sponsored the first appearance of strict sequentiality in process expression. This was all achieved with the introduction of closed association loops of directionalized expression elements which provided the local value assertion stability and cyclic behavior required for a generally configurable process.

No new primitives were postulated in this section. All of the discussion focused on associated variables asserting values that were changing according to value transform rules.

4 Character String Process Expression

The last section suggested that the possible forms of external process expressions that could be mapped into a generally configurable process was much richer than was immediately suggested by the expressional form of the process itself. Any directionalized form of process expressed in terms of relationships among names can be mapped into a generally configurable process. Whether expressed as a pure value expression or as a structure of associated variables, process expression can be characterized as a progression of dependent name formations and name resolutions. This progression of dependent name formations and name resolutions is the essence of process expression and constitutes the only necessary correspondence between any two forms of expression of the same process. Any external process expression mapped into a generally configurable process creates two expression forms of the same process.

Any external expression form need not relate directly to any idiosyncrasies of an internal expression form of a generally configurable process. Just because an internal expression may be interpreted one name resolution at a time does not mean that an external expression must express strict sequentiality. A legitimate resolution sequence can be conveniently derived from any external expression that explicitly expresses name formation dependency relationships. Because an internal expression may use memory to associate and form names does not mean that the consideration of memory and its properties must be explicit in an external expression.

This section considers expressing process as a contiguous string of alphanumeric characters. A character string expression of a process must specify the same elements and relationships that any other form of process expression must specify. There must be a means for result names to form an input name. A means to determine that the input name is validly formed. A means of presenting the input name to its resolving agent. A means of expressing how the name will be resolved by the resolving agent and a means of delivering the result name to the input names to which it contributes.

The character string form of process expression has two fundamental differences from the forms of expression discussed so far. The first difference is that a character string expression is a purely referential form of expression. It is not inherently active and it cannot resolve its own process. It therefore needs assistance to resolve. It must be mapped into another expression form which is self resolving such as a DAP or a generally configurable expression or it must be directly interpreted by an active process directly manipulating the string. A directly interpreting active process will be assumed in this discussion.

The second difference is that the string of characters exists in a one dimensional expression space. Different places in the expression cannot always be associated by direct association within the expression space as they can be in a three dimensional expression such as a logic circuit. So there has to be a means of expressing direct associations among places in the string unique to this one dimensional environment.

Before places in the string can be associated distinct places must be established. There must be delimiting agents in the string to break the contiguous string of characters into distinct places. A set of reserved syntax characters distinct from name formation characters can delimit places in the string and establish a type for each place. Each delimited place contains a data name or a place name or a syntax structure. Data names and place names in the string are formed with name formation characters distinct from and delimited by the syntax characters. Each name has a unique place in the string relative to all the other names in the string.

A limited amount of local association among places in the string can be expressed by syntactic relationships such as nesting and neighborness but the only way to generally associate arbitrary places in the string is by name correspondence. If two names syntactically associated with any two places in the string are identical, are visible to each other and have complimentary place types then those two places are associated. Names that associate places in the string will be called place names. This allows the general associability of elements any where in the string.

The precedent of referring to data as a progression of formed names that are resolved and form other names will be continued in relation to the string expression. With the association relationships of a string also expressed by identically formed names a string expression becomes a complex structure of relationships among names of many types. These different types of names cannot be differentiated because all data names eventually become place names during resolution of the expression. The following discussion will keep the names straight by referring to a name with its type.

How a combination of syntax, data names and place names manage to express a process will be presented through detailed examples. There are a multitude of ways of structuring string expressions with different character sets, different syntactic structures and so forth. The form of string expression presented in this section is just one possible form. The complete syntax definition is presented here for reference only in Table 16. The syntactic structures and their meanings will be explained in the examples.

resolution the active string 454 contains the result string.

The active string 454 initially consists of an invocation 462 containing a fully formed input data name 464 of the actuality expression 460. The interpreter/resolution apparatus 452 constantly searches the active string 454 for invocations 462 with validly formed input data names 464 to resolve and then searches the definition string 456 for the definition 456 corresponding to the invocation 462 to resolve the formed input data name 464. It 452 copies the definition 456 which may contain more invocations 462 into the active string 454, carries out transforms on the active string 454 related to the resolution of the invocation 462 in relation to the definition 456 and again searches for another invocation 462 with a validly formed input data name 464 to resolve. The resolution is complete when there are no more invocations 462 to be resolved and the active string 454 consists of result data name objects 466.

TABLE 16

SYNTAX DEFINITION METASYMBOLS

| | |
|---|---|
| = | term to structure equivalence |
| \| | OR |
| * | zero or more (post superscript) |
| + | one or more (post superscript) |
| *+ | zero or one (post superscript) |
| - | followed by |

TERM DEFINING SYNTAX

| | |
|---|---|
| phrase = | clause `\|` phrase;clause `\|` phrase?clause |
| clause = | redefinition*-resultant*-invocation*+-object* |
| redefinition = | invocname@(phrase) |
| resultant = | linkname<phrase> |
| invocation = | invocname(actualist-resultlist) |
| delayedinvoc = | invocname#(actualist-resultlist) |
| invocname = | invocation `\|` defname-formalref* `\|` defname*+-formalref+ |
| resultlist = | resultlink* |
| resultlink = | <linkname> |
| actualist = | actual `\|` actualist,actual |
| actual = | invocation*+-object*-resultref*+ |
| resultref = | $linkname |
| definition = | defname[(formalist-resultlist)body] |
| nonreplicable = | defname@[(formalist-resultlist)body] |
| body = | phrase `\|` phrase;definition+ |
| formalist = | namelist `\|` namelist,! `\|` !,namelist |
| namelist = | formalname `\|` namelist,formalname |
| object = | ·value* `\|` value*-formalref+ `\|` objectstruct |
| objectstruct = | {object} `\|` {phrase} `\|` {objectstruct*} |
| formalref = | *formalname `\|` *! |
| defname = | value+ |
| formalname = | value+ |
| linkname = | value+ |
| narrative = | \ any character string / |
| syntax = | ( \| ) \| [ \| ] \| { \| } \| < \| > \| , \| ; \| * \| @ \| ! \| \ \| / \| ? \| # |
| value = | Any set of two or more characters disjoint from the syntax character set. Nominally A to Z and 0 to 9. Blanks and narratives are white space. |

Figure 67:
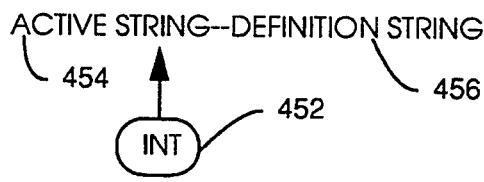
FIG. 67 illustrates a preferred embodiment apparatus for interpreting character strings.

Referring now to FIG. 1 and FIG. 67, the examples will assume that there is a single interpreter process 452 or resolution apparatus 452 that scans the string directly and resolves the expression by manipulating the string directly. The resolution environment will consist of two character strings the active string 454 and the definition string 456.

The definition string 456 is the collection of definitions 456 that makes up the possibility expression 458 for the process and it does not change during resolution. The activity of the resolution unfolds in the active string or active expression 454. The active string 454 begins with the actuality expression 460 and dynamically grows and shrinks in relation to definitions 456 from the definition string 456. At the completion of the In summary, a method and system for process expression and resolution is described. A first language structure comprising a possibility expression 458 having at least one definition 456 which is inherently and generally concurrent is provided. Further, a second language structure comprising an actuality expression 460 including a fully formed input data name 464 to be resolved is provided. Furthermore, a third language structure comprising an active expression 454 initially having at least one invocation 462 is provided wherein the invocation 462 includes an association with a particular definition 456 and the fully formed input data name 464 of the actuality expression 460. Subsequently, the process of resolving invocations 462 begins in the active expression 454 with fully formed input data names 464 in relation to their associated definition 456 to produce at least one or both of the following: (1) an invocation 462 with a fully formed input data name 464 and (2) a result data name 466.

The first, the second and the third language structures preferably are derived from a set of production rules selected from the group including a set of metasymbols, a set of terminals and a set of nonterminals. A production rule preferably includes a nonterminal followed by a term to structure equivalence (=) followed by a terminal or a nonterminal. Alternatively, a production rule preferably includes a nonterminal followed by a term to structure equivalence (=) followed by a plurality of terminals delimited by metasymbols. Alternatively, a production rule preferably includes a nonterminal followed by a term to structure equivalence (=) followed by a plurality of nonterminals delimited by metasymbols, or (4) a nonterminal followed by a term to structure equivalence (=) followed by at least one terminal and at least one nonterminal delimited by metasymbols.

The set of metasymbols preferably are selected from the group of metasymbols including:
= term to structure equivalence;
| OR;
* zero or more (post superscript);
+ one or more (post superscript);
*+ zero or one (post superscript); and
− followed by.

In addition, the set of terminals preferably includes (1) a set of syntax symbols preferably are selected from the group of syntax symbols including: '(', ')', '[', ']', '{', '}', '<', '>', ',', ';', '*', '@', '!', '\', '/', '?', and '#' as well as (2) a set of at least two value symbols disjoint from the set of syntax symbols. Further, the set of nonterminals preferably are selected from the group of nonterminals including: value, phrase, clause, redefinition, resultant, invocation, delayedinvoc, invocname, resultlist, resultlink, actualist, actual, resultref, definition, nonreplicable, body, formalist, namelist, object, objectstruct, formalref, defname, formalname, linkname, and narrative. Furthermore, the production rules are selected from the group of production rules found in Table 16.

In one preferred embodiment, the resolving process continues simultaneously resolving multiple invocations 462 in the active expression 454 until all of the invocations 462 have been resolved and a fully formed result data name 466 is left in the active expression 454. These terms and their relationships will be fully explained in the examples.

4.1 The Examples

Figure 68:
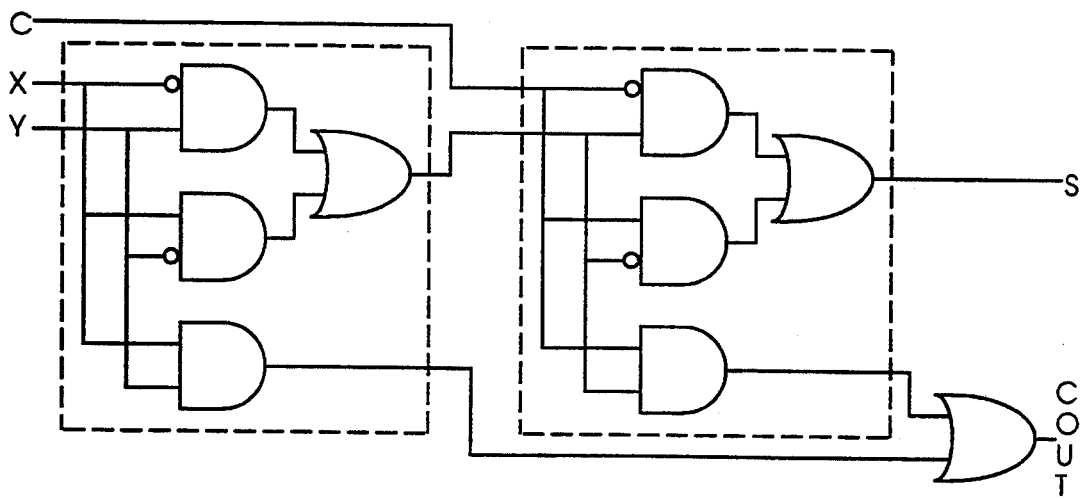
FIG. 68 shows an example process expression as a binary logic full adder circuit.

Referring now to FIG. 68, the first example expression is a binary full adder circuit. It is a simple process but is rich enough to embody most of the elements of the string expression. The example character string expression will be presented and its interpretive resolution described in detail. The resolution in all of the examples will be presented as progressive configurations of the active string 454. The presentations of the active string 454 are informal to allow convenient readability. Strictly formal rules and structures can be easily defined for the active string 454.

The logic circuit shown in FIG. 68 and the string expression shown in Table 17 both express the same process. The string expression draws association and resolution relationships in terms of invocations 462 and definitions 456 with place name correspondence relationships and syntactic structures instead of in terms of wires and logic gates but it expresses the same progression of input data name 464 formation dependency relationships and resolutions as the logic circuit does.

The complete resolution sequence for the string expression of the binary fulladder is presented in the following discussion shown in Table 17. The discussion begins with the active string 454 which consists of one invocation 462 (i.e., FULLADD(0, 1, 0 <CARRYOUT>)) and one resultref (i.e., {$CARRYOUT}). The actuality expression 460 is the first three actuals of the invocation 462 of FULLADD (i.e., 0, 1, 0).

TABLE 17

```
Active String:
    FULLADD(0, 1, 0 <CARRYOUT>) {$CARRYOUT}
Definition String:
    FULLADD[(X,Y,C <CARRY>)
        CARRY<OR($CARRY1,$CARRY2)>
        HALFADD(*C,HALFADD(*X,*Y <CARRY1>) <CARRY2>);
        HALFADD[(S,T <COUT>)
        COUT <AND(*S,*T)>
        OR(AND(NOT(*S),*T),AND(*S,NOT(*T)))
            OR[(A,B) *A*B( ) ;00[0] 01[1] 10[1] 11[1]]
            AND[(A,B) *A*B( ) ;00[0] 01[0] 10[0] 11[1]]
            NOT[(A) *A( );1[0] 0[1]]
        ]
    ]
```

4.1.1 The Invocation

An invocation 462, as shown in Table 18, is a parenthesis enclosure preceded by an invocname. The parenthesis enclose a list of associations consisting of an actual list followed by a result list. The invocname, as shown in Table 17, associates the invocation 462 with its resolving definition 456.

TABLE 18

| | |
|---|---|
| invocation = | invocname(actualist-resultlist) |
| invocname = | invocation \| defname-formalref* \| defname*+-formalref+ |

An invocation 462 is a place of input data name 464 formation and resolution in the string expression. The actualist represents the formation of the data name 464 to be resolved. It can consist of already present objects which are the actual data or it can consist of association relationships with the places in the phrase from which the objects will come from to form the input data name 464. The example FULLADD invocation 462 has a fully formed input data name 464 consisting of already present objects.

The resultlist associates results of the resolution of the invocation 462 to the places in the phrase to which they are to be delivered to form further input data names 464.

The invocname is a place name that associates the invocation 462 to the place of definition that will resolve the input data name 464 formed in the actualist of the invocation 462.

4.1.2 The Resultlist and Resultref

A resultlist consists of zero or more resultlinks. A resultlink consists of a linkname enclosed by less than and greater than syntax characters <>. A resultlink associates by name correspondence to one or more resultrefs which are the places in the phrase to where a result of the resolution of the input data name 464 of the invocation 462 is to be delivered. A resultref is a linkname preceded by a $. <CARRYOUT> is a resultlink in the association list of the example FULLADD invocation 462. It associates with the resultref $CARRYOUT in the example. Each of these elements is shown in Table 19 below.

TABLE 19

| | |
|---|---|
| resultlist = | resultlink* |
| resultlink = | <linkname> |
| resultref = | $linkname |

The resultlink and resultref association relationship is a means of delivering multiple results of an invocation 462 resolution to multiple places in an expression. When the invocation 462 of FULLADD is resolved $CARRYOUT will be replaced with the result from the definition 456 associated with <CARRYOUT> 466 in the actualist of the invocation 462.

4.1.3 The Actualist

The actualist consists of a list of zero or more actuals separated by comas. Each actual represents a part of the input data name 464. An actual can be a reference to some other place in the expression where its object will come from or it may be an already present object. An actual may be an invocation 462, an object, a resultref a combination of these or it may be an empty (NULL) string. When all of the actuals in an actualist are no longer references but consist of present objects the actualist is a fully formed and VALID input data name 464 and can be presented to the definition 456 associated with the invocation 462 to be resolved. Each of these elements is shown in Table 20 below.

TABLE 20

| | |
|---|---|
| actualist = | actual \| actualist,actual |
| actual = | invocation*+-object*-resultref*+ |

The actualist of the invocation 462 of FULLADD in the example consists of already present objects. It is a fully formed input data name 464 and ready to be resolved. The actualist of this first input invocation 462 of the active string 454 is the input data name 464 for the whole process and is the actuality expression 460 of the process.

4.1.4 The Invocname

The invocname of the invocation 462 associates the place of the invocation 462 to the place of the definition with the corresponding defname that will resolve the invocation's 462 formed input data name 464. The invocname itself can be deferred by association reference and formed during resolution so an invocation 462 itself is not fully formed and resolvable until both the invocname is fully formed and the input data name 464 represented by the actualist is fully formed.

The invocname of the FULLADD example invocation 462 contains no association references so it is a fully formed invocname name.

4.1.5 The Object

The actuals of the invocation 462 and the second element of the above phrase enclosed by braces { } are objects. An object represents data names and structured data names. The primitive object is a bounded string of characters whose bounding syntax characters do not specify it to be some other form of name in the phrase. For instance, the actuals in the actualist of the FULLADD invocation 462 0, 1, 0 are objects by this criteria.

All association references in the phrase resolve to objects. Every expression resolves ultimately to a structure of objects. Structures of objects are expressed by nested braces. The braces can enclose association references and even whole phrases. When the references and phrases are resolved data names 466 will be left inside the braces. One way to view a string expression is as an object structure filled with references to where the contents of the object come from. The resolution of the expression is the filling in of the object structure. Each of these elements is shown in Table 21 below.

TABLE 21

| | |
|---|---|
| object = | value* \| value*-formalref+ \| objectstruct |
| objectstruct = | {object} \| {phrase} \| {objectstruct*} |

The object in the example {$CARRYOUT} contains a resultref which will be resolved to a primitive object data name 466 delivered via the association with the resultlink in the FULLADD invocation 462.

4.1.6 Invocation Resolution

Since the invocname and the actualist of the example FULLADD invocation 462, shown in Table 22, are fully formed the invocation 462 itself is fully formed and the definition 456 with the corresponding name can be searched for in the definition string 456 and invoked to resolve the input data name 464 of the invocation 462. The corresponding definition 456 is the one with the defname FULLADD, also shown in Table 22.

TABLE 22

```
Invocation:
    FULLADD(0, 1, 0 <CARRYOUT>) {$CARRYOUT}
Definition:
    FULLADD[(X,Y,C <CARRY>)
    CARRY<OR($CARRY1,$CARRY2)>
    HALFADD(*C,HALFADD(*X,*Y <CARRY1>)
    <CARRY2>)]
```

4.1.7 The Definition

A definition 456, as shown in Table 23, is a bracket enclosure preceded by a defname and enclosing an association list followed by a definition body. The association list consists of a formallist followed by a result list.

TABLE 23

| | |
|---|---|
| definition = | defname[(formalist-resultlist)body] |

The invocation 462 and the definition 456 are complimentary syntax structures. An invocation 462 must always associate with a definition 456 by name correspondence between the invocname and the defname. The association lists of the two structures must correspond exactly. Both association lists are enclosed by the parenthesis.

The resultlists of the definition 456 and invocation 462 are identical. The formalist, as shown in Table 24, of the definition 456 is just a list of formalnames and one special matching syntax character ! separated by comas. The matching syntax character ! will be explained later.

TABLE 24

| formalist | = | namelist \| namelist,! \| !,namelist |
| namelist | = | formalname \| namelist,formalname |

The elements of the two association lists are associated by corresponding position in the list. In the example, shown in Table 25, 0 of the invocation 462 is associated with X of the definition 456, 1 with Y, 0 with C and <CARRYOUT> with <CARRY>.

TABLE 25

| Invocation: | FULLADD(0, 1, 0 <CARRYOUT>) |
| Definition: | FULLADD[(X,Y,C <CARRY>)...] |

The invocation 462 association list and definition 456 association list manage data name formation, validation and presentation to the resolving agent which is the phrase inside the definition 456. This association procedure was managed in the generally configurable process presented in section 3 by the boundary element. The boundary element watched the input data name 464 determined when it was fully formed then received it and presented the input data name 464 to the resolution element (DAP) that would resolve it.

The invocation 462 association list and the definition 456 association list can be viewed as two halves of a split boundary element. The invocation 462 actualist forms the input data name 464 and establishes when the input data name 464 is fully formed. When the input data name 464 is fully formed the associated definition 456 is invoked whose formalist presents the input data name 464 formed by the invocation 462 actualist to the phrase inside the definition 456 which will resolve the input data name 464. The correspondence between the elements of the association lists of an invocation 462 and a definition 456 is internal and local to the boundary association mechanism and can conveniently be represented syntactically by position correspondence.

4.1.8 The Body

The body of the definition 456 contains a phrase and possibly more definitions 456, as shown in Table 26.

TABLE 26

| body = | phrase \| phrase;definition+ |

The FULLADD definition 456 contains a phrase and the definition 456 of HALFADD.

4.1.9 The Phrase

A phrase is a clause or a sequence of clauses. A semicolon forces strictly sequential resolution of clauses. If two clause are separated by a semicolon the clause on the left of the semicolon must be fully resolved before the resolution of the clause to the right of the semicolon can begin. The ? indicates a conditional sequence. The clause to the left of the ? is resolved first. If it produces a result value then the clauses to the right of the ? are ignored. If it produces a NULL result then the next clause is evaluated. This continues until one clause produces a nonNULL result.

A clause is a structure of local data name 464 formation association relationships among resultants, invocations 462 and objects. Each of these elements is shown in Table 27 below.

TABLE 27

| phrase = | clause \| phrase;clause \| phrase?clause |
| clause = | redefinition*-resultant*-invocation*+-object* |

A clause can consist of zero or more resultants, zero or one invocations 462 and zero or more objects. A clause may have none of these and be an empty (NULL) string. Limiting a clause to a single invocation 462 may sound restricting but a single invocation 462 can consist of an enormously complex compound structure of many associated invocations 462.

When a definition 456 is invoked the association list and phrase of the definition 456 is copied from the possibility expression 458 into the active string 454 and the formalrefs in the phrase are replaced with the associated actuals from the invocation 462.

The clause of FULLADD consists of one resultant and one invocation 462 and will return two results. The first result is the carry value of the addition which will be returned via the resultant through the association path of resultant-resultlist-resultlist-resultref to replace the resultref $CARRYOUT. The second result is the place value of the addition which is the result of the invocation 462 in the phrase and which will be returned to replace the invocation 462 of FULLADD itself.

4.1.10 The Resultant

The first element of the phrase of FULLADD is a resultant. A resultant is a phrase enclosed by less than and greater than signs and preceded by a linkname, as shown below in Table 28.

TABLE 28

| resultant | = | linkname<phrase> |

The CARRY result will replace the resultref $CARRYOUT in the invoking phrase. This replacement is managed through several association links. The resultref $CARRYOUT is associated with its identically named syntactic complement the resultlink <CARRYOUT> in the invocation 462 association list. <CARRYOUT> is associated to the resultlink <CARRY> by position correspondence between the association lists of the invocation 462 and the definition 456. The resultant CARRY<OR($CARRY1,$CARRY2)> is associated by name correspondence with its syntactic complement the resultlink <CARRY> in the definition 456 association list. When the phrase enclosed by the resultant is resolved the result object will be returned via the association links to replace the resultref $CARRYOUT.

4.1.11 The Formalref

A formalref is a formalname preceded by an * or a *!, as shown in Table 29.

TABLE 29

| formalref | = | *formalname \| *! |

The formalref *! will be explained later. The formalrefs are associated by name correspondence to their syntactic complements the formalnames of the formalist of the enclosing definition 456 which in turn are associated to the actuals of the invoking invocation 462 by position correspondence between the association lists of the invocation 462 and the definition 456.

invocation 462 must be resolved first. The actuallist of the nested invocation 462 is fully formed and the invocname is formed so the invocation 462 itself is fully formed and ready to be resolved. The definition 456 of HALFADD can be invoked and its phrase copied into the active string 454. Each of these elements is shown in Table 31 below.

TABLE 31

Invocation:
    FULLADD(0, 1, 0 <CARRYOUT>) {$CARRYOUT}
Active String:
    FULLADD[(X,Y,C <CARRY>)
        CARRY<OR($CARRY1,$CARRY2)>
        HALFADD(0,HALFADD(0,1 <CARRY1>) <CARRY2>)]
        HALFADD[(S,T <COUT>)
            COUT <AND(*S,*T)>
            OR(AND(NOT(*S),*T),AND(*S,NOT(*T)))]

After copying the phrase of the definition 456 to the active string 454 the next order of business is to present the input data name 464 formed by the actualist of the invoking invocation 462 to the phrase that will resolve it. This is accomplished by resolving all of the formalrefs in the phrase. A formalref is resolved by replacing it with its associated actual from the actualist of the invoking invocation 462. An invocation 462 can be resolved only when all of its actualist is fully formed so all of the actuals replacing the formalrefs are objects.

The invocation 462 in the phrase consists of an invocation 462 of HALFADD with another invocation 462 of HALFADD nested as its second actual. The nested invocation 462 of HALFADD must be resolved first but its actuals are not resolved either. The actuals in the nested HALFADD are formalrefs.

The formalref *X resolves to 0, *Y resolves to 1 and *C resolves to 0. Each of these elements is shown in Table 30 below.

TABLE 30

Invocation:
    FULLADD(0, 1, 0 <CARRYOUT>) {$CARRYOUT}
Active String:
    FULLADD[(X,Y,C <CARRY>)
        CARRY<OR($CARRY1,$CARRY2)>
        HALFADD(0,HALFADD(0,1 <CARRY1>) <CARRY2>)]

After the resolution of the formalrefs the phrase can be scanned for resolvable invocations 462 or resultants. The CARRY resultant contains two resultrefs that associate to resultlinks in each of the HALFADD invocations 462 so it cannot be resolved until both HALFADD invocations 462 are resolved. One HALFADD invocation 462 is nested inside the other so the nested The formalrefs of the HALFADD phrase are resolved, as shown in Table 32. For this invocation 462 *S resolves to 0 and *T resolves to 1.

TABLE 32

Invocation:
    FULLADD(0, 1, 0 <CARRYOUT>) {$CARRYOUT}
Active String:
    FULLADD[(X,Y,C <CARRY>)
        CARRY<OR($CARRY1,$CARRY2)>
        HALFADD(0,HALFADD(0,1 <CARRY1>) <CARRY2>)]
        HALFADD[(S,T <COUT>)
            COUT <AND(0,1)>
            OR(AND(NOT(0),1),AND(0,NOT(1)))]

After the resolution of the formalrefs there are three invocations 462 in the phrase with fully formed names. The two nested invocations 462 of NOT and the invocation 462 of AND in the resultant. The fact that all three input data names 464 are fully formed means that there are no dependency relationships among the invocations 462. The three invocations 462 can be resolved simultaneously or in any order. If three interpreters 452 are available each invocation 462 can be resolved by a different interpreter 452. The result of each invocation 462 is associated with a unique place in the string so the simultaneous delivery of results will not conflict. It must only be assured that two interpreters 452 do not attempt to resolve the same invocation 462. Definitions 456 are arbitrarily replicable so that if two simultaneous interpreters 452 require the same definition 456 each can make its own copy of the definition 456 in the active string 454 and each can proceed with the resolution of its invocation 462 quite independently of the other.

The invocation 462 of AND will be resolved first by copying the definition 456 into the active string 454. The whole definition 456 is actually shown for convenience of discussion below in Table 33.

TABLE 33

Invocation:
    FULLADD(0, 1, 0 <CARRYOUT>) {$CARRYOUT}
Active String:
    FULLADD[(X,Y,C <CARRY>)
        CARRY<OR($CARRY1,$CARRY2)>

TABLE 33-continued

```
HALFADD(0,HALFADD(0,1 <CARRY1>) <CARRY2>) ]
HALFADD[(S,T <COUT>)
    COUT <AND(0,1)>
    OR(AND(NOT(0),1),AND(0,NOT(1))) ]
        AND[(A,B) *A*B() ;00[0] 01[0] 10[0] 11[1] ]
```

The invocation 462 in the phrase of the AND definition 456 is an instance of an invocname being formed during resolution. It is also an example of data names becoming place names during the resolution of the expression. The invocname is formed when the formalrefs are resolved. It cannot be predetermined which terminal definition 456 inside the AND definition 456 will be invoked. The formation of the invocname corresponds to the formation of an input data name 464 at the input of an AND logic gate. The definitions 456 enclosed by the AND definition 456 correspond to the set of transform rules associated with the AND logic gate. The formation of the invocname determines which definition 456 (transform rule) will be invoked to carry out the name transformation.

A definition 456 with a phrase with no further association references is a terminal definition 456 and is the most primitive expressional element. It corresponds directly to a transform rule. A set of such definitions 456 as are inside the definition 456 of AND forms a transform rule set for AND. The AND definition 456 works exactly like a pure value expression. A name is formed. The correspondingly named transform rule is invoked and the name is transformed according to the rule.

Every expression 454 must resolve ultimately to a progression of invocations 462 of terminal definitions 456 with no further reference appeals. Everything else is just bookkeeping to form the correct ultimate progression of invocations 462 of terminal definitions 456, as shown in Table 35 below.

TABLE 35

```
Invocation:
    FULLADD(0, 1, 0 <CARRYOUT>) {$CARRYOUT}
Active String:
    FULLADD[(X,Y,C <CARRY>)
        CARRY<OR($CARRY1,$CARRY2)>
        HALFADD(0,HALFADD(0,1 <CARRY1>) <CARRY2>) ]
        HALFADD[(S,T <COUT>)
            COUT <AND(0,1)>
            OR(AND(NOT(0),1),AND(0,NOT(1))) ]
                AND[(A,B) 0 ;00[0] 01[0] 10[0] 11[1] ]
```

The formalrefs *A and *B are resolved. For this invocation 462 *A resolves to 0 and *B resolves to 1 as shown below in Table 34.

TABLE 34

```
Invocation:
    FULLADD(0, 1, 0 <CARRYOUT>) {$CARRYOUT}
Active String:
    FULLADD[(X,Y,C <CARRY>)
        CARRY<OR($CARRY1,$CARRY2)>
        HALFADD(0,HALFADD(0,1 <CARRY1>) <CARRY2>) ]
        HALFADD[(S,T <COUT>)
            COUT <AND(0,1)>
            OR(AND(NOT(0),1),AND(0,NOT(1))) ]
                AND[(A,B) 01() ;00[0] 01[0] 10[0] 11[1] ]
```

The resolution of the formalrefs in this instance resulted in an invocname being formed. The association list of the invocation 462 is empty. 01( ) will invoke the definition 456 01[0]. The phrase of this definition 456 has no further association references and is a primitive object so the phrase is directly the result of the invocation 462. The result object is returned to replace the entire invocation 462. So the invocation 462 01( ) is resolved to 0.

There are no further unresolved references in the phrase of AND so the phrase is fully resolved and the result object is returned to resolve the invocation 462 of AND. The two invocations 462 of NOT are similarly resolved in terms of the definition 456 of NOT. The definitions 456 of AND and NOT having performed their duty are deleted from the active string 454, as shown below in Table 36.

TABLE 36

```
Invocation:
    FULLADD(0, 1, 0 <CARRYOUT>) {$CARRYOUT}
Active String:
    FULLADD[(X,Y,C <CARRY>)
        CARRY<OR($CARRY1,$CARRY2)>
        HALFADD(0,HALFADD(0,1 <CARRY1>) <CARRY2>) ]
        HALFADD[(S,T <COUT>)
            COUT <0>
            OR(AND(1,1),AND(0,0)) ]
```

Now the actualists of the two ANDS are fully formed and the COUT resultant is an object. The two ANDs can be resolved simultaneously or in any order. The COUT resultant can also deliver its result value through its association links to any associated resultrefs which in this case is the $CARRY1. COUT<0> associates by name correspondence to <COUT> in the definition 456 association list which associates by position correspondence to <CARRY1> in the invocation 462 association list which by name correspondence associates to $CARRY1 elsewhere in the invocation's 462 phrase. The $CARRY1 reference is resolved to 0 and the resultant, having performed its duty is deleted from the active string 454.

The two AND invocations 462 are resolved by invoking the definition 456 of AND just like before, as shown below in Table 37.

TABLE 37

Invocation:
    FULLADD(0, 1, 0 <CARRYOUT>) {$CARRYOUT}
Active String:
    FULLADD[(X,Y,C <CARRY>)
        CARRY<OR(0,$CARRY2)>
        HALFADD(0,HALFADD(0,1 <CARRY1>) <CARRY2>) ]
        HALFADD[(S,T <COUT>)
            OR(1, 0)]

The OR invocation 462 now has a fully resolved actualist making a fully formed invocation 462 that can be resolved. It is resolved by invoking the definition 456 of OR just like the AND invocations 462 were resolved as shown in Table 38.

TABLE 38

Invocation:
    FULLADD(0, 1, 0 <CARRYOUT>) {$CARRYOUT}
Active String:
    FULLADD[(X,Y,C <CARRY>)
        CARRY<OR(0,$CARRY2)>
        HALFADD(0,HALFADD(0,1 <CARRY1>) <CARRY2>) ]
        HALFADD[(S,T <COUT>)
            1]

There are no further unresolved references in the HALFADD phrase so the result object can be returned by replacing the entire HALFADD invocation 462 with the result object. So the nested HALFADD invocation 462 resolves to 1 and the HALFADD definition 456 is deleted from the active string 454, as shown in Table 39.

TABLE 39

Invocation:
    FULLADD(0, 1, 0 <CARRYOUT>) {$CARRYOUT}
Active String:
    FULLADD[(X,Y,C <CARRY>)
        CARRY<OR(0,$CARRY2)>
        HALFADD(0,1 <CARRY2>) ]

The other HALFADD invocation 462 now has a fully formed actualist and can be resolved by invoking the definition 456 of HALFADD just like before. This will resolve the result reference $CARRY2 to 0 and the invocation 462 itself to 1, as shown in Table 40.

TABLE 40

Invocation:
    FULLADD(0, 1, 0 <CARRYOUT>) {$CARRYOUT}
Active String:
    FULLADD[(X,Y,C <CARRY>)
        CARRY<OR(0,0)>
        1]

The OR invocation 462 in the CARRY resultant now has a validly formed actualist and can be resolved, as shown in Table 41.

TABLE 41

Invocation:
    FULLADD(0, 1, 0 <CARRYOUT>) {$CARRYOUT}
Active String:
    FULLADD[(X,Y,C <CARRY>)
        CARRY<0>
        1]

There are no further unresolved references in the CARRY resultant so it can be resolved by delivering the result object to the associated resultrefs which in this case is the $CARRYOUT reference. The CARRY resultant can then deleted from the active string 454, as shown in Table 42.

TABLE 42

FULLADD(0, 1, 0 <CARRYOUT>) {0}
FULLADD[(X,Y,C <CARRY>)
    1]

There are no further references in the phrase for the FULLADD definition 456 so the result object can be returned to resolve the FULLADD invocation 462 and the FULLADD definition 456 can be deleted from the active string 454, as shown in Table 43.

TABLE 43

Invocation:
    1 {0}

The FULLADD invocation 462 is now fully resolved and the result object structure is left in the active string 454. The place value is 1 and the carry value is 0.

4.1.12 Summary Of the Example

The character string expression 454 and the circuit diagram both express the same process. They both express the same progression of data name 464 formation dependency and resolution relationships. The association relationships in the character string expression 454 form transmission pathways for data objects that correspond identically to the interconnection transmission paths of the logic circuit.

The first step of resolution of the string expression 454 is to transmit the input data name 464 formed by the actual list of the FULLADD invocation 462 along association pathways into the phrase of the FULLADD definition 456 by replacing each formalref in the phrase with its associated actual object. The input data name 464 objects then become actual list objects in another invocation 462 and are similarly transmitted along association pathways to the phrase in the HALFADD definition 456 and find themselves in the actual lists of yet other invocations 462. The AND invocation 462 invokes the AND definition 456 and the input data objects are once again transmitted along association pathways to the phrase in the AND definition 456 but this time they are not associated to the actual list but are associated to the invocname of the invocation 462. The characters previously forming a data name 464 are now forming a place name within the expression 454. The association list of the invocation 462 is empty because this is an invocation of a terminal definition 456 with a constant phrase. The constant phrase of the terminal definition 456 is returned to replace the invocation 462 and results wind their way backwards through result return association pathways. These result return association pathways are the definition-to-invocation 462 association and the resultant-to-resultlink-to-resultref associations.

The data objects flow through the character string expression just like voltage levels flow through the wires of a logic circuit. They eventually reach a terminal definition 456 where they are combined to form an invocation 462 name, just like an input name 464 forming at the input to a logic gate. The set of definitions 456 inside a terminal definition 456 such as the AND definition 456 is the set of value transform rules that form the truth table for the AND function just like the transistor circuit that effectively forms the truth table of an AND logic gate.

Most of the expression 454 consists of managing the flow of data name objects to get the right objects together at the right time and in the right place to form the right input data names 464 to be properly transformed by terminal definitions 456. These association relationships in the string expression 454 are delivery pathways for deferred specifications that were not specified in the definitions 456 of the possibility expression 458 because their exact form was uncertain and could not be predeterminable.

4.2 Object Structures, Actualists and Iteration

A resolved object is a bounded syntax structure of values with no association relationship with any place else in the expression. Compositional object structures are represented by nested brace relationships. The most primitive object is a single character. The first stage of composition is just the direct association of characters as a contiguous string. Each character is inherently delimited in the contiguous string so the first stage of composition does not need to be explicitly delimited. A number for instance can be expressed as 4359 instead of as {4}{3}{5}{9}. Further stages of compositional relationships must be explicitly delimited by balanced braces. An array of three numbers is represented as {{234}{123}{567}}. Further stages of composition are expressed by more nesting. A 3×3 matrix of numbers for instance would be expressed as shown in Table 44.

TABLE 44

| { | {{234}{123}{567}} | |
|---|---|---|
| | {{987}{654}{321}} | |
| | {{375}{295}{158}} | } |

An object structure is decomposed as it passes through an actualist because its next lower level of composition can appear as multiple actuals. The essential question when an invocation 462 associates with a definition 456 is what are the boundaries of the actuals in the actualist? What are the sequence of actuals to be matched by the sequence of formalnames in the formalist? The general rule for determining actuals in an actualist of an invocation 462 is that if unencapsulated commas are present, then the commas determine the boundaries of the actuals. If commas are encapsulated inside an object, they do not bound actuals. If commas are not present, the elements boundaries are determined by the outermost object boundaries within the invocation 462 parenthesis. The string actually matched as an actual to be transmitted to a definition 456 does not include its delimiting syntax. With the delimiting syntax left behind one layer of bounding syntax is stripped from the object structure. A few examples, as shown in Table 45, will best convey the general idea.

TABLE 45

INV({{234}{123}{567}}) has 1 actual {234}{123}{567}.
INV({234}{123}{567}) has 3 actuals 234 and 123 and 567.
INV({{234}{123},{567}}) has 2 actuals {234}{123} and {567}.
INV({567}) has 1 actual 567.
INV({{234}{123}}{567}) has 2 actuals {234}{123} and 567.
INV(567) has 3 actuals 5 and 6 and 7.
INV(7) has 1 actual 7.
INV({234}{123}567) has 5 actuals 234 and 123 and 5 and 6 and 7.
INV({234}{1,2,3},567) has 2 actuals {234}{1,2,3} and 567.

Object structures are decomposed during resolution by the syntax stripping rule. A single object {{234}{123}{567}} will turn into its component objects {234}{123}{567} with one passage through an invocation 462 actualist. Decomposition can be suppressed by commas in the association list. If commas delimit the actuals then the commas get stripped rather than a layer of braces.

4.2.1 Iteration

The resolution of an object structure which can have composition stages of unpredeterminable size must involve iteration through each element of each composition stage to decompose each stage to its component elements. Each iteration must break off one component of the composition level. The primary facility for this is the formalref syntax element *! that matches the remaining actuals of an arbitrarily long actualist that are not matched by explicit formalrefs in the formalist of a definition 456. It can match the left or the right of a list depending on its position in the formalist. The following in Table 46 are some examples.

TABLE 46

| Match left | DEF[(!, A) . . . ] | DEF[(!, A, B) . . . ] |
|---|---|---|
| Match right | DEF[(A, !) . . . ] | DEF[(A, B, !) . . . ] |

The ! does not strip bounding syntax of the actuals that it matches. The whole point is to retain the object structure through iterations of decomposition. For instance with the formal list INV[(!, A) the formalrefs *! and *A will match the indicated strings for the following examples (shown in Table 47).

TABLE 47

INV(6789) *! will match 678. *A will match 9.
INV({67}{89}{34}) *! will match {67}{89}. *A will match 34.
INV(6,7,8,9) *! will match 6,7,8. *A will match 9.
INV(67,89) *! will match 67. *A will match 89.

Termination is determined by recognizing an empty actualist. The empty actualist is recognized with the resolution rule that an invocation 462 that fails to form an input name 464 is always replaced by the NULL string. If the association list of an invocation 462 is NULL there is no input name 464 to resolve so it has no significance in the expression 454. The invocation 462 in fact never happens.

The significance of this for iteration is that iteration terminates when there are no more object elements to resolve. If there are no more object elements the association lists of the invocations 462 doing the resolution will become NULL.

The following two examples will illustrate in detail the resolution of an object structure via iteration through the structure.

4.3 Arbitrary Length Integer Addition

The following possibility expression 458, shown in Table 48 will add two integers of any length.

TABLE 48

```
Definition:
    INTEGERADD[(A,B)
        ITERATE(BODY(*A), TAIL(*A), BODY(*B), TAIL(*B), 0)
        ITERATE[(V, W, X, Y, Z)
            ITERATE(BODY(*V), TAIL(*V), BODY(*X), TAIL(*X),
                $CARRY)
            DIGITADD( *W, *Y, *Z, <CARRY> );
            DIGITADD[(R, S, T <COUT>)
                COUT<$C>
                *R*S*T(<C>);
                    0[(<CARRY>) CARRY <   >   ]
                    1[(<CARRY>) CARRY <   > 1 ]
                    00[(<CARRY>) CARRY < 0 > 0 ]
                    01[(<CARRY>) CARRY < 0 > 1 ]
                    10[(<CARRY>) CARRY < 0 > 1 ]
                    11[(<CARRY>) CARRY < 1 > 0 ]
                    000[(<CARRY>) CARRY < 0 > 0 ]
                    001[(<CARRY>) CARRY < 0 > 1 ]
                    010[(<CARRY>) CARRY < 0 > 1 ]
                    011[(<CARRY>) CARRY < 1 > 0 ]
                    100[(<CARRY>) CARRY < 0 > 1 ]
                    101[(<CARRY>) CARRY < 1 > 0 ]
                    110[(<CARRY>) CARRY < 1 > 0 ]
                    111[(<CARRY>) CARRY < 1 > 1 ]
            ]
        ]
        BODY[(!, A) *! ]
        TAIL[(!, A) *A ]
    ]
```

It will be noticed that DIGITADD is expressed in terms of terminal definitions 456 with long definition names. This is quite different from the previous example of DIGITADD. The two examples express the same process. The tradeoffs involved are the same tradeoffs discussed in section 2. The long terminal definition names work perfectly well in the string expression but may not map directly to other forms of expressions that cannot support long named transform rules with position significance. DIDITADD can be directly expressed as set transform rules because there is no uncertainty about the size of the input data names 464 formed for digit addition.

DIGITADD is expressed this way for this example to make the preceding point and to keep the resolution discussion to a reasonable length. The resolution of an invocation 462 of INTEGERADD will be presented in detail. Details of resolution presented in the previous example will not be detailed again but will simply be indicated (See Table 49).

TABLE 49

```
Invocation:
    INTEGERADD(110,10)
Definition:
    INTEGERADD[(A,B)
        ITERATE(BODY(*A), TAIL(*A), BODY(*B), TAIL(*B), 0 )
    ]
```

The active string 454 is begun with the invocation 462 of the input data name 464 of INTEGERADD presenting two numbers of different lengths in its actualist as the actuality expression 460 to be resolved (see Table 50). The invocation 462 list is fully formed so the definition 456 of INTEGERADD can be immediately invoked.

TABLE 50

```
Invocation:
    INTEGERADD(110,10)
Active String:
    INTEGERADD[(A,B)
        ITERATE(BODY(110),TAIL(110),BODY(10),TAIL(10),0)
            BODY[(!, A) *! ]
            TAIL[(!, A) *A ]
    ]
```

After the substitution of actuals for formalrefs the four invocations 462 of BODY and TAIL are fully formed and their definitions 456 can be invoked. It will be noticed that the rightmost actual of ITERATE is a resolved object beginning the add with a carryin of 0.

The formalists of both of these definitions 456 match one rightmost actual and the ! matches the rest of the actuals to the left of the rightmost actual. BODY returns the leftmost portion of the actualist. TAIL returns only the rightmost element of the actualist, as shown in Table 51.

TABLE 51

Invocation:
　　INTEGERADD(110,10)
Active String:
　　INTEGERADD[(A,B)
　　　ITERATE(BODY(110),TAIL(110),BODY(10),TAIL(10), 0)
　　　　BODY[(!, A) 11 ]
　　　　TAIL[(!, A) 0 ]
　　]

Only the first BODY and the first TAIL with the actualist 110 will be detailed. After formalref substitution BODY and TAIL are completely resolved and can return their results, as shown in Table 52.

TABLE 52

Invocation:
　　INTEGERADD(110,10)
Active String:
　　INTEGERADD[(A,B)
　　　ITERATE( 11, 0, 1, 0, 0 ) ]
　　　ITERATE[(V, W, X, Y, Z)
　　　　ITERATE( BODY(*V), TAIL(*V), BODY(*X),
　　　　　TAIL(*X), $CARRY )
　　　　DIGITADD( *W, *Y, *Z, <CARRY> ) ]

After the results of the BODY and TAIL invocations 462 are returned the ITERATE invocation 462 is fully formed and the definition 456 of ITERATE can be invoked, as shown in Table 53.

TABLE 53

Invocation:
　　INTEGERADD(110,10)
Active String:
　　INTEGERADD[(A,B)
　　　ITERATE( 11, 0, 1, 0, 0 ) ]
　ITERATE[(V, W, X, Y, Z)
　　ITERATE( BODY(11), TAIL(11), BODY(1), TAIL(1),
　　　$CARRY )
　　DIGITADD( 0, 0, 0, <CARRY> ) ]
　　DIGITADD[(R, S, T <COUT>)
　　　COUT<$C>
　　　*R*S*T(<C>) ]

After formalref substitution the BODY and TAIL and DIGITADD invocations 462 are fully formed and their definitions 456 can be invoked, as shown in Table 54.

TABLE 54

Invocation:
　　INTEGERADD(110,10)
Active String:
　　INTEGERADD[(A,B)
　　　ITERATE( 11, 0, 1, 0, 0 ) ]
　　　ITERATE[(V, W, X, Y, Z)
　　　　ITERATE( 1, 1, , 1, $CARRY )
　　　　DIGITADD( 0, 0, 0, <CARRY> ) ]
　　　　DIGITADD[(R, S, T <COUT>)
　　　　　COUT<$C>
　　　　　000(<C>) ]

TABLE 54-continued

000[(<CARRY>) CARRY< 0 > 0 ]

The BODY and TAIL invocations 462 have returned their results. It will be noticed that BODY(1) returned a null result because there wasn't any actuals left of the rightmost element. After formalref substitution for DIGITADD the invocation 462 in the phrase inside DIGITADD is fully formed.

The definition 456 named 000 can now be invoked. 000 is a terminal definition 456 with an empty formalist and a phrase that is already fully resolved. There are two results to return. One result returns by direct substitution of the invocation 462. The other result returns via the resultant to $C, as shown in Table 55.

TABLE 55

Invocation:
　　INTEGERADD(110,10)
Active String:
　　INTEGERADD[(A,B)
　　　ITERATE( 11, 0, 1, 0, 0 ) ]
　　　ITERATE[(V, W, X, Y, Z)
　　　　ITERATE(1, 1, , 1, $CARRY )
　　　　DIGITADD( 0, 0, 0, <CARRY> ) ]
　　　　DIGITADD[(R, S, T <COUT>)
　　　　　COUT<0>
　　　　　0 ]

The phrase of DIGITADD is now fully resolved and both results can be returned. The one by direct substitution of the invocation 462 and the other via the result reference association path to $CARRY, as shown in Table 56.

TABLE 56

Invocation:
　　INTEGERADD(110,10)
Active String:
　　INTEGERADD[(A,B)
　　　ITERATE( 11, 0, 1, 0, 0 ) ]
　　　ITERATE[(V, W, X, Y, Z)
　　　　ITERATE( 1, 1, , 1, 0 )
　　　　0 ]
　　　ITERATE[(V, W, X, Y, Z)
　　　　ITERATE(BODY(*V), TAIL(*V), BODY(*X),
　　　　　TAIL(*X), $CARRY)
　　　　DIGITADD( *W, *Y, *Z, <CARRY> ) ]

The second invocation 462 of ITERATE is now fully formed and its definition 456 can be invoked again, as shown in Table 57.

TABLE 57

Invocation:
　　INTEGERADD(110,10)
Active String:
　　INTEGERADD[(A,B)
　　　ITERATE( 11, 0, 1, 0, 0 ) ]
　　　ITERATE(V, W, X, Y, Z)
　　　　ITERATE( 1, 1, , 1, 0 )
　　　　0 ]
　　　ITERATE[(V, W, X, Y, Z)
　　　　ITERATE( BODY(1), TAIL(1), BODY( ),
　　　　　TAIL( ), $CARRY )
　　　　DIGITADD( 1, 1, 0, <CARRY> ) ]
　　　　DIGITADD[(R, S, T <COUT>)
　　　　　COUT<$C>
　　　　　*R*S*T(<C>) ]

Formalref substitution results in several fully formed invocations 462. One BODY and one TAIL invocation 462 failed to form a valid input name 464 in their actualist and since the definition 456 has a formalist they will resolve to a NULL string. The DIGITADD invocation 462 is fully formed so its definition 456 can be invoked again, as shown in Table 58.

TABLE 58

Invocation:
  INTEGERADD(110,10)
Active String:
  INTEGERADD[(A,B)
    ITERATE( 11, 0, 1, 0, 0 ) ]
    ITERATE(V, W, X, Y, Z)
      ITERATE( 1, 1, , 1, 0 )
      0 ]
      ITERATE[(V, W, X, Y, Z)
        ITERATE( , 1, , , $CARRY )
        DIGITADD( 1, 1, 0, <CARRY> ) ]
        DIGITADD[(R, S, T <COUT>)
          COUT<$C>
          110(<C>) ]
          110[(<CARRY>) CARRY< 1 > 0 ]

The formalref substitution in DIGITADD this time results in an invocation 462 of the definition 456 named 110. Definition 456 110 returns 0 by substitution and returns 1 via the resultant, as shown in Table 59.

TABLE 59

Invocation:
  INTEGERADD(110,10)
Active String:
  INTEGERADD[(A,B)
    ITERATE( 11, 0, 1, 0, 0 ) ]
    ITERATE[(V, W, X, Y, Z)
      ITERATE( 1, 1, , 1, 0 )
      0 ]
        ITERATE[(V, W, X, Y, Z)
          ITERATE( , 1, , , $CARRY )
          DIGITADD( 1, 1, 0, <CARRY> ) ]
          DIGITADD[(R, S, T <COUT>)
            COUT<1>
            0 ]

The phrase of DIGITADD is fully resolved and both results can be returned, as shown in Table 60.

TABLE 60

Invocation:
INTEGERADD(110,10)
Active String:
  INTEGERADD[(A,B)
    ITERATE( 11, 0, 1, 0, 0 ) ]
    ITERATE[(V, W, X, Y, Z)
      ITERATE( 1, 1, , 1, 0 )
      0 ]
        ITERATE[(V, W, X, Y, Z)
          ITERATE( , 1, , , 1 )
          0 ]
          ITERATE[(V, W, X, Y, Z)
            ITERATE( BODY(*V), TAIL(*V),
              BODY(*X), TAIL(*X), $CARRY )
            DIGITADD( *W, *Y, *Z, <CARRY> ) ]

The ITERATE invocation 462 is now fully formed and its definition 456 can be invoked, as shown in Table 61.

TABLE 61

Invocation:
  INTEGERADD(110,10)
Active String:
  INTEGERADD[(A,B)
    ITERATE( 11, 0, 1, 0, 0 ) ]
    ITERATE[(V, W, X, Y, Z)
      ITERATE( 1, 1, , 1, 0 )
      0 ]
      ITERATE[(V, W, X, Y, Z)
        ITERATE( , 1, , , 1 )
        0 ]

TABLE 61-continued

ITERATE[(V, W, X, Y, Z)
  ITERATE( BODY( ), TAIL( ), BODY( ),
    TAIL( ), $CARRY )
  DIGITADD( 1, , 1, <CARRY> ) ]
  DIGITADD[(R, S, T <COUT>)
    COUT<$C>
    *R*S*T(<C>) ]

Formalref substitution gave all of the BODY and TAIL invocations 462 NULL actualists so they will resolve to NULL strings. The DIGITADD invocation 462 is fully formed so its definition 456 can be invoked again, as shown in Table 62.

TABLE 62

Invocation:
  INTEGERADD(110,10)
Active String:
  INTEGERADD[(A,B)
    ITERATE( 11, 0, 1, 0, 0 ) ]
    ITERATE[(V, W, X, Y, Z)
      ITERATE( 1, 1, , 1, 0 )
      0 ]
      ITERATE[(V, W, X, Y, Z)
        ITERATE( , 1, , , 1 )
        0 ]
        ITERATE[(V, W, X, Y, Z)
          ITERATE( , , , , $CARRY )
          DIGITADD( 1, , 1, <CARRY> ) ]
          DIGITADD[(R, S, T <COUT>)
            COUT<$C>
            11(<C>) ]
            11[(<CARRY>) CARRY< 1 > 0 ]

This time since one of the list elements of the DIGITADD invocation 462 was NULL the formalref substitution forms a two character invocname 11. The definition 456 named specifies a 0 direct substitution return and a 1 result reference return. All of the BODY and TAIL invocations 462 in the ITERATE invocation 462 have returned NULL strings, as shown in Table 63.

TABLE 63

Invocation:
  INTERGERADD(110,10)
Active String:
  INTERGERADD[(A,B)
    ITERATE( 11, 0, 1, 0, 0 ) ]
    ITERATE[(V, W, X, Y, Z)
      ITERATE( 1, 1, , 1, 0 )
      0 ]
      ITERATE[(V, W, X, Y, Z)
        ITERATE( , 1, , , 1 )
        0 ]
        ITERATE[(V, W, X, Y, Z)
          ITERATE( , , , , $CARRY )
          DIGITADD( 1, , 1, <CARRY> ) ]
          DIGITADD[(R, S, T <COUT>)
            COUT<1>
            0 ]

The results of the invocation of 11 are returned to the DIGITADD phrase, as shown in Table 64.

TABLE 64

Invocation:
  INTEGERADD(110,10)
Active String:
  INTEGERADD[(A,B)
    ITERATE( 11, 0, 1, 0, 0 ) ]
    ITERATE[(V, W, X, Y, Z)
      ITERATE[( 1, 1, , 1, 0 )
      0 ]
      ITERATE[(V, W, X, Y, Z)
        ITERATE( , 1, , , 1 )
        0]

TABLE 64-continued
```
ITERATE[(V, W, X, Y, Z)
  ITERATE( , , , , 1 )
  0;
  ITERATE[(V, W, X, Y, Z)
    ITERATE( , , , , 1)
    0;
    ITERATE(BODY(*V),TAIL(*V),
      BODY(*X),TAIL(*X),
      $CARRY)
    DIGITADD(*W,*Y,*Z,<CARRY>)]
```

Returning the DIGITADD results to the ITERATE invocation 462 still forms a valid input name 464 so ITERATE must be invoked again, as shown in Table 65.

TABLE 65
```
Invocation:
  INTEGERADD(110,10)
Active String:
  INTEGERADD[(A,B)
    ITERATE( 11, 0, 1, 0, 0 ) ]
    ITERATE[(V, W, X, Y, Z)
      ITERATE( 1, 1, , 1, 0 )
      0 ]
      ITERATE[(V, W, X, Y, Z)
        ITERATE( , 1, , , 1 )
        0 ]
        ITERATE[(V, W, X, Y, Z)
          ITERATE( , , , , 1 )
          0 ].
          ITERATE[(V, W, X, Y, Z)
            ITERATE(BODY( ), TAIL( ),
              BODY( ), TAIL( ), $CARRY)
            DIGITADD( , , 1,<CARRY>) ]
            DIGITADD[(R, S, T <COUT>)
              COUT<$C>
              *R*S*T(<C>) ]
```

Formalref substitution results in DIGITADD forming an input name 464 so DIGITADD must be invoked again. All the BODY and TAIL invocations 462 have NULL actualists so will return NULL strings, as shown in Table 66.

TABLE 66
```
Invocation:
  INTEGERADD(110,10)
Active String:
  INTEGERADD[(A,B)
    ITERATE( 11, 0, 1, 0, 0 ) ]
    ITERATE[(V, W, X, Y, Z)
      ITERATE( 1, 1, , 1, 0 )
      0 ]
      ITERATE[(V, W, X, Y, Z)
        ITERATE( , 1, , , 1 )
        0 ]
        ITERATE[(V, W, X, Y, Z)
          ITERATE( , , , , 1 )
          0 ]
          ITERATE[(V, W, X, Y, Z)
            ITERATE( , , , ,$CARRY)
            DIGITADD( , , 1,<CARRY>) ]
            DIGITADD[(R, S, T <COUT>)
              COUT<$C>
              1(<C>) ]
              1[(<CARRY>)CARRY< >1]
```

After formalref substitution the invocname of 1 is formed. The definitions 456 of 1 and 0 inside DIGITADD are special cases. The only way a single digit name can form is if the primary numbers are depleted and the single digit is the last carry value and the addition is completed. The termination is managed by returning a NULL carry value. Therefore, the definition 456 named 1 returns a 1 by direct substitution and returns a NULL via the resultant. The definition 456 of 0 returns NULL for both results, as shown in Table 67.

TABLE 67
```
Invocation:
  INTEGERADD(110,10)
Active String:
  INTEGERADD[(A,B)
    ITERATE( 11, 0, 1, 0, 0 ) ]
    ITERATE[(V, W, X, Y, Z)
      ITERATE( 1, 1, , 1, 0 )
      0 ]
      ITERATE[(V, W, X, Y, Z)
        ITERATE( , 1, , , 1 )
        0 ]
        ITERATE[(V, W, X, Y, Z)
          ITERATE( , , , , 1 )
          0 ]
          ITERATE[(V, W, X, Y, Z)
            ITERATE( , , , ,$CARRY)
            DIGITADD( , , 1,<CARRY>) ]
            DIGITADD[(R, S, T <COUT>)
              COUT< >
              1 ]
```

Both of the DIGITADD results can now be returned, as shown in Table 68.

TABLE 68
```
Invocation:
  INTEGERADD(110,10)
Active String:
  INTEGERADD[(A,B)
    ITERATE( 11, 0, 1, 0, 0 ) ]
    ITERATE[(V, W, X, Y, Z)
      ITERATE( 1, 1, , 1, 0 )
      0 ]
      ITERATE[(V, W, X, Y, Z)
        ITERATE( , 1, , , 1 )
        0 ]
        ITERATE[(V, W, X, Y, Z)
          ITERATE( , , , , 1 )
          0 ]
          ITERATE[(V, W, X, Y, Z)
            ITERATE( , , , , )
            1 ]
```

Because the result returned to $CARRY was NULL the ITERATE invocation 462 failed to form an input name 464 and will be replaced with NULL, as shown in Table 69.

TABLE 69
```
Invocation:
  INTEGERADD(110,10)
Active String:
  INTEGERADD[(A,B)
    ITERATE( 11, 0, 1, 0, 0 ) ]
    ITERATE[(V, W, X, Y, Z)
      ITERATE( 1, 1, , 1, 0 )
      0 ]
      ITERATE[(V, W, X, Y, Z)
        ITERATE( , 1, , , 1 )
        0 ]
        ITERATE[(V, W, X, Y, Z)
          ITERATE( , , , , 1 )
          0 ]
          ITERATE[(V, W, X, Y, Z)
            1 ]
```

The phrase of the last invocation 462 of ITERATE is now fully resolved and the result object can be returned to replace its invocation 462, as shown in Table 70.

TABLE 70
```
Invocation:
  INTEGERADD(110,10)
Active String:
```

TABLE 70-continued

```
INTEGERADD[(A,B)
  ITERATE( 11, 0, 1, 0, 0 ) ]
  ITERATE[(V, W, X, Y, Z)
    ITERATE(1, 1, , 1, 0 )
    0 ]
    ITERATE[(V, W, X, Y, Z)
      ITERATE( , 1, , , 1 )
      0 ]
    ITERATE[(V, W, X, Y, Z)
      1
      0 ]
```

The next to last invocation 462 is now resolved and its result can be returned, as shown in Table 71.

TABLE 71

```
Invocation:
  INTEGERADD(110,10)
Active String:
  INTEGERADD[(A,B)
    ITERATE( 11, 0, 1, 0, 0 ) ]
    ITERATE[(V, W, X, Y, Z)
      ITERATE( 1, 1, , 1, 0 )
      0 ]
      ITERATE[(V, W, X, Y, Z)
        1
        0
        0 ]
```

The next one is now fully resolved and its result can be returned, as shown in Table 72.

TABLE 72

```
Invocation:
  INTEGERADD(110,10)
Active String:
  INTEGERADD[(A,B)
    ITERATE( 11, 0, 1, 0, 0 ) ]
    ITERATE[(V, W, X, Y, Z)
      1
      0
      0
      0 ]
```

The first invocation 462 of ITERATE is fully resolved and its result can be returned, as shown in Table 73.

TABLE 73

```
Invocation:
  INTEGERADD(110,10)
Active String:
  INTEGERADD[(A,B)
    1
    0
    0
    0 ]
```

The phrase of INTEGERADD is now fully resolved and its result 466 can be returned, as shown in Table 74.

TABLE 74

```
Invocation:
  1000
```

Consolidating the values on a single line and substituting them for the invocation 462 of INTEGERADD provides the correct answer in the active string 454 to the invocation 462 of INTEGERADD.

4.4 Resolution of Multiple Level Composite Structure

The next example of VECTORADD, shown in Table 75, illustrates the iterative decomposition and resolution of a higher level composite object structure. The expression 454 must not only account for the decomposition of the input data 464 object structure but must also account for the composition of the result 466 object structure.

TABLE 75

```
VECTOADD[(A,B)
  {ITERATE(BODY(*A), TAIL(*A), BODY(*B), TAIL(*B))};
  ITERATE[(V, W, X, Y, Z)
  ITERATE#(BODY(*V), TAIL(*V), BODY(*X), TAIL(*X))
  {INTEFERADD#(*W, *Y)}
  BODY[(A) DECOMPOSE(*A); DECOMPOSE[(!, B) {*!}]]
  TAIL[(A) DECOMPOSE(*A); DECOMPOSE[(!, B) *B]]
]
```

It will be noticed that the same names are used for definitions 456 inside VECTORADD as were used inside INTEGERADD. Since these are encapsulated inside each definition 456 they are local to each and cannot be referred to from outside the definition 456. The BODY and TAIL definitions 456 are performing essentially the same service but are quite different from their counterparts inside DIGITADD. How BODY and TAIL work in decomposing an object structure depends on how the object structure is composed in terms of the deferred specification associations and on how it is presented in an actualist. There are many possibilities but once the possibility expression 458 is rendered the composition structure and actualist presentation format of the actuality expression 460 is determined. An input invocation 462 could for instance present two three element vectors solely in terms of the object structure syntax or as separated by commas, as shown in Table 76.

TABLE 76

```
VECTROADD({{110}{10}{11}} {{111}{1011}{10}})
VECTROADD({{110}{10}{11}}, {{111}{1011}{10}})
```

Either actualist will work but the details of how the definition 456 phrase strips the syntax will be different for each. The example possibility expression 458 assumes the comma in the actuality expression 460. A detailed presentation of the resolution of the example expression 458 follows, as shown in Table 77.

TABLE 77

| Invocation: |
| --- |
| VECTORADD({{110}{10}{11}}, {{111}{1011}{10}}) |
| Definition: |
| VECTORADD[(A,B) {ITERATE(BODY(*A), TAIL(*A), BODY(*B), TAIL(*B))}] |

The active string 454 begins with the input invocation 462 which presents the actuality expression 460 in its actualist as two object structures expressing two three element vectors of integers. The invocation 462 is fully formed so the definition 456 of VECTORADD can be invoked. The phrase in VECTORADD is an object structure enclosing an invocation 462. The braces of the object structure will enclose the result of the invocation so that the result of VECTORADD will be an object structure, as shown in Table 78.

TABLE 78

| Invocation: |
| --- |
| VECTORADD({{110}{10}{11}}, {{111}{1011}{10}}) |
| Active String: |
| VECTORADD[(A,B) |

TABLE 78-continued

```
{ITERATE(BODY({{110}{10}{11}}), TAIL({{110}{10}{11}}),
BODY({{111}{1011}{10}}), TAIL({{111}{1011}{10}}))
 BODY[(A) DECOMPOSE(*A) ;DECOMPOSE[(!, B) {*!}]]
 TAIL[(A) DECOMPOSE(*A) ;DECOMPOSE[(!, B) *B]]
]
```

The actuals are distributed to the formalrefs of the phrase. The delimiting syntax for the actuals of the VECTORADD invocation 462 actualist is the comma so the comma is dropped but all of the braces remain as part of each actual.

All of the BODY and TAIL invocations 462 are fully formed so they can be invoked and resolved simultaneously or in any order, as shown in Table 79.

TABLE 79

Invocation:
VECTORADD({{110}{10}{11}}, {{111}{1011}{10}})
Active String:
```
VECTORADD[(A,B)
 {ITERATE(BODY({{110}{10}{11}}), TAIL({{110}{10}{11}}),
 BODY({{111}{1011}{10}}), TAIL({{111}{1011}{10}}))
 BODY[(A) DECOMPOSE({110}{10}{11});DECOMPOSE[(!, B) {*!}]]
 TAIL[(A) DECOMPOSE({110}{10}{11});DECOMPOSE[(!, B) *B]]
]
```

The invocations 462 of the first BODY and first TAIL will be followed. The invocation 462 BODY({{110}{10}{11}}) has one actual because the delimiting syntax is the outermost braces of the object structure. The actual is {110}{10}{11}. Because the outermost braces are the delimiting syntax they are stripped when formalref substitution is carried out. So the string {110}{10}{11} is substituted for the formal reference *A in the DECOMPOSE invocation 462. This opens up the object structure so that the component objects can be accessed. The DECOMPOSE invocation 462 receives three actuals from the substitution of one formalref, as shown in Table 80.

TABLE 80

Invocation:
VECTORADD({{110}{10}{11}}, {{111}{1011}{10}})
Active String:
```
VECTORADD[(A,B)
 {ITERATE(BODY({{110}{10}{11}}), TAIL({{110}{10}{11}}),
 BODY({{111}{1011}{10}}), TAIL({{111}{1011}{10}}))
 BODY[(A) DECOMPOSE({110}{10}{11});
DECOMPOSE[(!, B) {{110}{10}}]]
 TAIL[(A) DECOMPOSE({110}{10}{11});
DECOMPOSE[(!, B) 11]]
]
```

The definitions 456 of DECOMPOSE can now be invoked. They are isolated within the definitions 456 of BODY and TAIL so there is no ambiguity about which definition 456 of DECOMPOSE goes with which invocation 462 of DECOMPOSE.

The DECOMPOSE definition 456 inside TAIL matches the rightmost actual. The DECOMPOSE inside BODY matches the rest of the actuals to the left of the rightmost actual. The DECOMPOSE inside BODY reencapsulates the matched actuals with braces to restore the original object structure. The ! does not strip delimiting syntax from matched actuals. The whole point of ! is to maintain syntactic structure for later decomposition. The DECOMPOSE for TAIL simply matches the rightmost actual to extract it from the list. Since the enclosing braces are the delimiting syntax they are stripped from the actual during formalref substitution.

So the BODY and TAIL definitions 456 extract integers one at a time from the vector object structure through successive invocations of ITERATE, as shown in Table 81.

TABLE 81

Invocation:
VECTORADD({{110}{10}{11}}, {{111}{1011}{10}})
Active String:
```
VECTORADD[(A,B)
 {ITERATE(BODY({{110}{10}{11}}), TAIL({{110}{10}{11}}),
 BODY({{111}{1011}{10}}), TAIL({{111}{1011}{10}}))
 BODY[(A) {{110}{10}}; ]
 TAIL[(A) 11; ]
]
```

The BODY phrase resolves to {{110}{10}} which is a two element vector structure. The TAIL phrase resolves to 11 which was the rightmost element of the vector structure. The other vector is decomposed similarly by invocations 462 of BODY and TAIL, as shown in Table 82.

TABLE 82

Invocation:
VECTORADD({{110}{10}{11}}, {{111}{1011}{10}})
Active String:
```
VECTORADD[(A,B)
 {ITERATE({{110}{10}}, 11, {{111}{1011}}. 10)};
 ITERATE[(V, W, X, Y, Z)
 ITERATE#(BODY(*V), TAIL(*V), BODY(*X), TAIL(*X))
 {INTEGERADD#(*W, *Y)}
]
```

After substituting the results of the BODY and TAIL invocations 462 the ITERATE invocation 462 is fully formed and the definition 456 of ITERATE can be invoked. The phrase of this definition 456 will add the extracted integers and invoke ITERATE again to extract another pair of integers from the vectors. The workings of INTEGERADD were detailed in the last example and will not be detailed in this example. It will be noticed that the invocation 462 of INTEGERADD is inside an object structure so that its result will become part of a result object structure, as shown in Table 83.

TABLE 83

Invocation:
VECTORADD({{110}{10}{11}}, {{111}{1011}{10}})
Active String:
```
VECTORADD[(A,B)
 {ITERATE({{110}{10}}, 11, {{111}{1011}}, 10)};
 ITERATE[(V, W, X, Y)
 ITERATE#(BODY({{110}{10}}), TAIL({{110}{10}}),
 BODY({{111}{1011}}), TAIL({{111}{1011}}))
 INTEGERADD#(11, 10)}]
]
```

Formalref substitution results in the BODY and TAIL invocations 462 being fully formed. These can all proceed simultaneously or in any order. The INTEGERADD invocation 462 is also fully formed but its resolution is delayed because it is a delayedinvoc.

4.4.1 The Delayedinvoc

The delayedinvoc is an invocation 462 that is suppressed from being invoked in the phrase it is specified in, as shown in Table 84. All the references of the invocation 462 will be resolved within the phrase so that the invocname, and actualist are fully resolved. Only the resolution of the invocation 462 itself is delayed.

TABLE 84 delayedinvoc = invocname# (actualist-resultlist)

The delayedinvoc will be returned as a result with the other resolved objects of the phrase. When it is returned the # is stripped and it is transformed into a regular invocation 462 that can be resolved, as shown in Table 85.

TABLE 85

Invocation:
VECTORADD({{110}{10}{11}}, {{111}{1011}{10}})
Active String:
VECTORADD[(A,B)
 {ITERATE({{110}{10}}, 11, {{111}{1011}}, 10)};
 ITERATE[(V, W, X, Y)
 ITERATE#({{110}}, 10, {{111}}, 1011)
 {INTEGERADD#(11, 10)}]
]

Since the ITERATE and INTERGERADD invocations 462 in the phrase are delayedinvocs these invocations 462 are not resolved in the phrase but are returned as result objects to the invoking invocation 462. When they are returned they are transformed into regular invocations 462. So the phrase in ITERATE is fully resolved and can be returned to replace the ITERATE invocation 462, as shown in Table 86.

TABLE 86

Invocation:
VECTORADD({{110}{10}{11}}, {{111}{1011}{10}})
Active String:
VECTORADD[(A,B)
 {ITERATE({{110}}, 10, {{111}}, 1011)
 {INTEGERADD(11, 10)}}
 ITERATE[(V, W, X, Y, Z)
 ITERATE#(BODY(*V), TAIL(*V), BODY(*X), TAIL(*X))
 {INTEGERADD#(*W, *Y)}]
]

The return operation turns the delayedinvocs into regular invocations 462 which are then resolvable. Assuming that the ITERATE invocations 462 are resolved much faster than the INTEGERADD invocations 462 the effect will be of spawning multiple concurrent INTEGERADDs. It will be assumed for this example that the INTEGERADD invocations 462 take arbitrarily different times to resolve.

The definitions 456 of ITERATE and INTEGERADD can now be invoked, as shown in Table 87. The invoking and resolution of INTEGERADD will not be detailed.

TABLE 87

Invocation:

TABLE 87-continued

VECTORADD({{110}{10}{11}}, {{111}{1011}{10}})
Active String:
VECTORADD[(A,B)
 {ITERATE({{110}}, 10, {{111}}, 1011)
 {INTEGERADD(11, 10)}}]
 ITERATE[(V, W, X, Y)
 ITERATE#(BODY({{110}}), TAIL({{110}}),
  BODY({{111}}), TAIL({{111}}))
 {INTEGERADD#(10, 1011)}
 BODY[(A) DECOMPOSE(*A); DECOMPOSE[(!, B) {*!}]]
 TAIL[(A) DECOMPOSE(*A); DECOMPOSE[(!, B) *B]]
]

Formalref substitutions again leave the BODY, TAIL and INTEGERADD invocations 462 fully formed so their definitions 456 can be invoked, as shown in Table 88.

Because this is the last stage of decomposition of the vectors the invocations 462 of BODY and TAIL will be detailed again.

TABLE 88

Invocation:
VECTORADD({{110}{10}{11}}, {{111}{1011}{10}})
Active String:
VECTORADD[(A,B)
 {ITERATE({{110}}, 10, {{111}}, 1011)
 {INTEGERADD(11, 10)}}
 ITERATE[(V, W, X, Y)
 ITERATE#(BODY({{110}}), TAIL({{110}}),
  BODY({{111}}), TAIL({{111}}))
 {INTEGERADD#(10, 1011)}]
 BODY[(A) DECOMPOSE({110}); DECOMPOSE[(!, B) {*!}]]
 TAIL[(A) DECOMPOSE({110}); DECOMPOSE[(!, B) *B]]
]

The formalist substitution leaves one actual in the invocation 462 of each DECOMPOSE invocation 462, as shown in Table 89.

TABLE 89

Invocation:
VECTORADD({{110}{10}{11}}, {{111}{1011}{10}})
Active String:
VECTORADD[(A,B)
 {ITERATE({{110}}, 10, {{111}}, 1011)
 {INTEGERADD(11, 10)}}
 ITERATE[(V, W, X, Y)
 ITERATE#(BODY({{110}}), TAIL({{110}}),
  BODY({{111}}), TAIL({{111}}))
 {INTEGERADD#(10, 1011)}]
 BODY[(A) DECOMPOSE({110}); DECOMPOSE[(!, B) { }]]
 TAIL[(A) DECOMPOSE({110}); DECOMPOSE[(!, B) 110 ]
]

This single actual of the DECOMPOSE invocation 462 is the rightmost actual and there are no actuals to the left of it so *B of the TAIL definition 456 of DECOMPOSE matches the actual and *! of the BODY definition 456 of DECOMPOSE matches the NULL string, as shown in Table 90.

TABLE 90

Invocation:
VECTORADD({{110}{10}{11}}, {{111}{1011}{10}})
Active String:
VECTORADD [(A,B)
 {ITERATE( {{110}}, 10, {{111}}, 1011 )
 { INTEGERADD( 11, 10 ) } }
 ITERATE[(V, W, X, Y)
 ITERATE#( BODY({{110}}), TAIL({{110}}),
  BODY({{111}}), TAIL({{111}}) )
 { INTEGERADD#( 10, 1011 ) } ]
 BODY[(A) { }; ]

TABLE 90-continued

TAIL[(A) 110; ]
]

So the phrase of BODY becomes an empty object structure and the phrase of TAIL becomes the last vector element, as shown in Table 91.

TABLE 91

Invocation:
    VECTORADD({{110}{10}{11}}, {{111}{1011}{10}})
Active String:
    VECTORADD[(A, B)
        {ITERATE( {{110}}, 10, {{111}}, 1011 )
        { INTEGERADD( 11, 10 ) } }
        ITERATE[(V, W, X, Y)
            ITERATE#( {}, 110, {},111 )
            { INTEGERADD#( 10, 1011 ) } ]
    ]

Substituting the result objects 466 from body and TAIL leave the phrase of ITERATE fully resolved. Again since the invocations 462 in the phrase are delayedinvocs they are not resolved but are returned as result objects 466, as shown in Table 92.

TABLE 92

Invocation:
    VECTORADD({{110}{10}{11}}, {{111}{1011}{10}})
Active String:
    VECTORADD[(A,B)
        {ITERATE( { }, 110, { }, 111 )
        { INTEGERADD( 10, 1011 ) }
        { INTEGERADD( 11, 10 ) } }
        ITERATE[(V, W, X, Y, Z)
            ITERATE#( BODY(*V), TAIL(*V), BOD(*X), TAIL(*X) )
            { INTEGERADD#( *W, *Y ) } ]
    ]

After substituting the results for the invocation 462 of ITERATE the new invocations 462 of ITERATE and INTEGERADD become resolvable and their definitions 456 can be invoked. This sets the stage for the last invocation 462 of ITERATE, as shown in Table 93.

TABLE 93

Invocation:
    VECTORADD({{110}{10}{11}}, {{111}{1011}{10}})
Active String:
    VECTORADD[(A,B)
        {ITERATE( { }, 110, { }, 111 )
        { INTEGERADD( 10, 1011 ) }
        { INTEGERADD( 11, 10 ) } }
        ITERATE[(V, W, X, Y, Z)
            ITERATE#(BODY({}), TAIL ({}), BODY ({}), TAIL ({})
            { INTEGERADD#( 110, 111 ) } ]
    ]

Formalref substitution leaves an empty object structure in the actualists of the BODY and TAIL invocations 462. The last invocation 462 of INTEGERADD is also fully formed, as shown in Table 94.

TABLE 94

Invocation:
    VECTORADD({{110}{10}{11}}, {{111}{1011}{10}})
Active String:
    VECTORADD[(A,B)
        {ITERATE( { }, 110, { }, 111 )
        { INTEGERADD( 10, 1011 ) }
        { INTEGERADD( 11, 10 ) } }
        ITERATE[(V, W, X, Y, Z)

TABLE 94-continued

ITERATE#(BODY({}), TAIL({}), BODY({}), TAIL({}))
        { INTEGERADD#( 110, 111 ) } ]
        BODY[(A) DECOMPOSE( ) ;DECOMPOSE[(!, B) { *! } ] ]
        TAIL[(A) DECOMPOSE( ) ;DECOMPOSE[(!, B) *B ] ]
    ]

Formalref substitution striping off the braces leaves the actualist of the DECOMPOSE invocations 462 empty or NULL, as shown in Table 95.

TABLE 95

Invocation:
    VECTORADD({{110}{10}{11}}, {{111}{1011}{10}})
Active String:
    VECTORADD[(A,B)
        {ITERATE( { }, 110, { }, 111 )
        { INTEGERADD( 10, 1011 ) }
        { INTEGERADD( 11, 10 ) } }
        ITERATE[(V, W, X, Y, Z)
        .   ITERATE#(BODY({}), TAIL({}), BODY({}), TAIL({}))
            { INTEGERADD#( 110, 111 ) } ]
        BODY[(A) ;]
        TAIL[(A) ;]
    ]

Since they failed to form an input name the invocations 462 automatically become NULL without appeal to their definitions 456, as shown in Table 96.

TABLE 96

Invocation:
    VECTORADD({{110}{10}{11}}, {{111}{1011}{10}})
Active String:
    VECTORADD[(A,B)
        {ITERATE( { }, 110, { }, 111 )
        { INTEGERADD( 10, 1011 ) }
        { INTEGERADD( 11, 10 ) } }
        ITERATE[(V, W, X, Y, Z)
            ITERATE#( , , )
            { INTEGERADD#( 110, 111 ) } ]
    ]

After the NULL strings from BODY and TAIL are returned the last ITERATE invocation 462 fails to form an input data name 464. The phrase is fully resolved and can be returned to replace the invocation 462, as shown in Table 97.

TABLE 97

Invocation:
    VECTORADD({{110}{10}{11}}, {{111}{1011}{10}})
Active String:
    VECTORADD[(A, B)
        {ITERATE(, , )
        { INTEGERADD( 110, 111 ) }
        { INTEGERADD( 10, 1011 ) }
        { INTEGERADD( 11, 10 ) } } ]

The ITERATE invocation 462 is now resolvable but it failed to form an input data name 464 so it resolves to NULL, as shown in Table 98.

TABLE 98

Invocation:
    VECTORADD({{110}{10}{11}}, {{111}{1011}{10}})
Active String:
    VECTORADD[(A,B)
        {{ INTEGERADD( 110, 111 ) }
        { INTEGERADD( 10, 1011 ) }
        { INTEGERADD( 11, 10 ) } } ]

This leaves three INTEGERADD invocations 462 to be resolved. Their definitions 456 have been concurrently invoked and are churning away and their results may be returned at any time. Assume that the middle invocation 462 wins the race and returns its value first, as shown in Table 99.

TABLE 99

Invocation:
    VECTORADD({{110}{10}{11}}, {{111}{1011}{10}})
Active String:
    VECTORADD[(A,B)
        {{ INTEGERADD( 110, 111 ) }
        { 1101 }
        { INTEGERADD( 11, 10 ) } } ]

The middle invocation 462 of INTEGERADD is resolved and replaced with its result value, as shown in Table 100.

TABLE 100

Invocation:
    VECTORADD({{110}{10}{11}}, {{111}{1011}{10}})
Active String:
    VECTORADD[(A,B)
        {{ INTEGERADD( 110, 111 ) }
        { 1101 }
        { 101 } } ]

The first invocation 462 of ITERATE is now completed so the result object can be returned to its associated invocation 462, as shown in Table 101.

TABLE 101

Invocation:
    VECTORADD({{110}{10}{11}}, {{111}{1011}{10}})
Active String:
    VECTORADD[(A,B)
        {{1101}
        {1101}
        {101}}]

The last invocation 462 of INTEGRERADD is finally resolved and the entire phrase of VECTORADD becomes fully resolved. The VECTORADD result object can now be returned to replace the VECTORADD invocation 462, as shown in Table 102.

TABLE 102

Invocation:
    {{1101}{1101}{101}}

Rearranging the result onto a single line and returning it to replace the invocation 462 leaves the result object structure in the active string 454 representing the result vector.

4.5 Strict Sequence and Nonreplicable Definitions

There are other structures of the string expression 458 not yet covered by the examples. It may occasionally be necessary or convenient to express strict sequentiality. The semicolon specifies that all of the clauses to the left of the semicolon must be resolved before any clauses to the right of the semicolon can be resolved, as shown in Table 103.

TABLE 103 phrase = clause | phrase;clause | phrase?clause

This can be used to express initialization activity to be carried out before any other activity or to faithfully express the characteristics of another phrase which is strictly sequential.

4.5.1 Nonreplicable Definitions

A nonreplicable definition 456 is just what the name implies. It cannot be copied for purposes of concurrent activity. All of the definitions 456 shown so far are arbitrarily replicable. If several invocations 462 simultaneously refer to the same definition 456 all the invocations 462 can proceed simultaneously each with its own private copy of the definition 456. There are no dependency relationships among separate invocations 462 of the same definition 456.

There are expressional circumstances where a definition 456 cannot be replicated or copied. One circumstance is where dependency relationships do exist. An example of this might be to stably maintain globally referencable objects that are occasionally updated and the update must be indivisible. Most objects in an expression are maintained dynamically in the active string 454 as they flow through phrases which appear and disappear. A nonreplicable definition 456 is constant element of expression in the string. Another circumstance is where a definition 456 simply cannot be replicated. The definition 456 for instance may be expressed in hardware and cannot physically be copied by the available resolution procedures.

The essence of these circumstances is that the definition 456 cannot be replicated to support concurrent resolution activity. Invocations 462 of the definition 456 must be serialized so that only one invocation 462 at a time is being resolved by the definition 456. There may be several invocations 462 simultaneously referring to a nonreplicable definition 456 but their access must be managed so that only one at a time is actually resolved by the definition 456.

A nonreplicable definition 456 is identified by the syntactic modifier @, as shown in Table 104.

TABLE 104 nonreplicable = defname@ [(formalist-resultlist)body]

Any definition 456 can be a nonreplicable but the content of a nonreplicable is usually just an object. This object can be replaced with a redefinition. A redefinition is an invocation 462 with the same syntactic modifier @, as shown in Table 105.

TABLE 105 redefinition = invocname@ (phrase)

A redefinition will replace the content of the nonreplicable definition 456 with the resolved object of the phrase. Since the redefinition, like an invocation 462, must be fully resolved there is no possibility of replacing the body of a nonreplicable definition 456 with a phrase. The body can only be replaced with an object structure. Since there can only be one copy of the definition 456 and since only one reference at a time can access the definition 456 there is no ambiguity of update or of subsequent reference.

A nonreplicable definition 456 is a place in the string expression to maintain objects apart from the dynamic volatility of expression resolution in the active string 454. A nonreplicable can be used to represent memory aspects of expressions wherever explicit memory storage is required. It can also be used to explicitly represent the memory storage aspects of existing expressions.

Sets of nonreplicable definitions 456 with unique names can be treated as a general memory stores just like the various memory aspects of traditional architectures and languages.

The following example, shown in Table 106, illustrates part of an expression 458 of a simple CPU architecture. INTEGERADD is a high level command to add two integers together. The objects in its association list however, are not the objects but the names of the nonreplicable definitions 456 that the objects are stored in. They are the addresses of the memory locations.

TABLE 106

```
\ High level command /
INTEGERADD(623 ,456, 295)
\ Machine intruction level /
INTEGERADD[(A, B, S)
    LOAD( ACCUM, *A); ADD/ACCUM, *B);
    STORE(ACCUM, *S) ]
\ Micro instruction level /
LOAD[(REGISTER, ADDRESS)
    ADDRBUS( *ADDRESS, MAR);
    READMEM();
    DATABUS(MDR, *REGISTER) ]
ADD[(REGISTER, ADDRESS)
    ADDRBUS( *ADDRESS, MAR);
    READMEM();
    ADDFUN( ) ]
STORE [(REGISTER, ADDRESS)
    ADDRBUS( *ADDRESS, MAR)
    DATABUS( *REGISTER, MDR);
    WRITEMEM() ]
WRITEMEME [ MAR()@(MDR( ) ) ]
READMEM@[MDR@( MAR( ) ( ) ) ]
ADDFUN[ACCUM (ADDCIRCUIT( ACCUM( ),
MDR( ) ) ) ]
\ Bus transaction level /
ADDRBUS@[(FROM, TO)
    *TO@( *FROM() ) ]
DATABUS  [(FROM, TO)
    *TO  ( *FROM() ) ]
\ general memory storage elements /
:
295@[5]
:
456@[3]
:
623@[0]
:
\ Control registers /
ACCUM@[0]   \ accumulator /
MDR@[0]        \ Memory data register /
MAR@[0]        \ Memory address register /
```

All of the noncopyable parts of the expression 458 are expressed as nonreplicable definitions 456. The memory elements, the control registers and data registers are all nonreplicable memory elements. The busses are nonreplicable but are not memory elements but are just not copyable. Resolution of invocations 462 is strictly serialized during resolution as with real busses in real architectures.

The invocations 462 inside the INTEGERADD definition 456 are sequentialized by the semicolon delimiter. Each invocation 462 express one machine level instruction. Each machine level instruction is defined as a sequence of micro level or register transfer level instructions. The register transfers are carried out by bus transactions. Each bus is expressed by a nonreplicable definition 456.

The narrative syntax structure is also introduced in this example, as shown in Table 197. Anything between opening and closing slashes is treated as comment and ignored during resolution. In addition, the narrative comments can be nested.

TABLE 107 narrative = \ any character string /

4.6 Indefinite Iteration Loops

The indefinitely active resolution loop necessary for process resolution can be expressed with the delayedinvoc. The example, as shown in Table 108, will execute a sequence of instructions stored in nonreplicable definitions 456 representing memory.

TABLE 108

```
Definition:
    EXECUTE[(ADDRESS)
        EXECUTE#($NEXT)
        SETUP(READMEM(*ADDRESS) <NEXT>)
        SETUP[(OP, A, B, R, NEXADDR <NEXT>)
            *OP(*A, *B, *R) NEXT<*NEXADDR>
        ]
    ]
Invocation:
    EXECUTE(6983)
Active String:
    EXECUTE[(ADDRESS)
        EXECUTE#($NEXT)
        SETUP(READMEM(6983) <NEXT>)
        SETUP[(OP, A, B, R, NEXADDR <NEXT>)
            *OP(*A, *B, *R) NEXT<*NEXADDR>
        ]
    ]
```

The EXECUTE invocation 462 is fully formed. The actual of the EXECUTE invocation 462 is the name of the nonreplicable with the next instruction. The definition 456 of EXECUTE is invoked and formalref substitution is performed, as shown in Table 109.

TABLE 109

```
Invocation:
    EXECUTE(6983)
Active String:
    EXECUTE[(ADDRESS)
        EXECUTE#($NEXT)
        SETUP({ADD}{543}{798}{453}{6984} <NEXT>)
        SETUP[(OP, A, B, R, NEXADDR <NEXT>)
            *OP(*A, *B, *R) NEXT<*NEXADDR>
        ]
    ]
```

The nonreplicable definition 456 named 6983 contains {ADD}{543}{798}{453}{6984}. SETUP is fully formed and its definition 456 can be invoked, as shown in Table 110.

TABLE 110

```
Invocation:
    EXECUTE(6983)
Active String:
    EXECUTE[(ADDRESS)
        EXECUTE#($NEXT)
        SETUP({ADD}{543}{798}{453}{6984} <NEXT>)
        SETUP[(OP, A, B, R, NEXADDR <NEXT>)
            ADD(543, 798, 453) NEXT<6984>
        ]
    ]
```

SETUP sets up the instruction to be resolved. After formalref substitution there is an invocation 462 of ADD that can proceed and the resultant NEXT can return its object to the resultref $NEXT, as shown in Table 111.

TABLE 111

Invocation:

TABLE 111-continued

```
EXECUTE(6983)
Active String:
    EXECUTE [(ADDRESS)
        EXECUTE#(6984)
        SETUP ({ADD}{543}{798}{453}{6984} <NEXT>)
        SETUP [(OP, A, B, R, NEXADDR <NEXT>)
            ADD(543, 798, 453)
    ]
]
```

The resultant is deleted. Eventually the invocation 462 of ADD completes and because it operating indirectly through memory locations a NULL string is returned. The result for SETUP is then NULL and the NULL string is returned to the invocation 462 in EXECUTE. This leaves only the delayedinvoc as the result of the EXECUTE phrase to be returned, as shown in Table 112.

TABLE 112

```
Invocation:
    EXECUTE(6983)
Active String:
    EXECUTE[(ADDRESS)
        EXECUTE#(6984)
    ]
```

When the delayedinvoc is returned the # is removed and the invocation 462 becomes resolvable. So the invocation 462 of EXECUTE turns into another invocation 462 of EXECUTE with a different actual data name, as shown in Table 113.

TABLE 113

```
Invocation:
    EXECUTE(6984)
```

This cycle can continue indefinitely until the value of NEXADDR is a NULL string and the delayedinvoc of EXECUTE is returned with a NULL actualist whereupon the invocation 462 itself is replaced with the NULL string and nothing further occurs until another invocation 462 of EXECUTE is seeded.

4.7 The Failure Alternative

An invocation 462 can fail on two ways, as shown in Table 114. It might fail to form an input data name 464 or it might fail to associate with a corresponding definition 456 because a correspondingly named definition 456 does not exist in the string 454. In either case the failed invocation 462 is replaced with the NULL or empty string. In many cases of failure it might be desired to specify alternative clauses to proceed in case of failure. The failure alternative provides this facility.

The failure alternative is specified by a ? that delimits clauses of a phrase.

TABLE 114

| phrase = clause \| phrase;clause \| phrase?clause |
|---|

The clauses are resolved in order from left to right. If the leftmost clause generates a nonNULL result object then that object is the result object for the entire phrase and all clauses to the right of the ? are ignored and discarded. If the first clause fails to generate a result object and resolves to a NULL string then the next clause to the right of the first ? is resolved. If this clause fails then the next is tried and so on. If all the clauses are resolved to the NULL string then the NULL string is returned as the result object of the phrase The alternative clause might be an exception reporting function or an alternative specification for resolving the input name 464. The following example illustrates the failure alternative structure, as shown in Table 115.

TABLE 115

```
Definition:
FATHER[(A)
  FATHERLIST(*A) ? SPOUSE#(ALTERNATEMOTHER#
  (*A))
  ALTERNATEFATHER[(A)    FATHERLIST(*A)]
  FATHERLIST[(A)
    *A();
    JOHN [TOD]
    BIL [BOB]
  ]
  SPOUSE[(A)
    *A();
    TOD [ALICE]
    JOHN [MARTHA]
    ALICE [TOD]
  ]
  MOTHER[(A)
    MOTHERLIST(*A) ? SPOUSE#
    (ALTERNATEFATHER#(*A))]
  ALTERNATEMOTHER[(A)    MOTHERLIST(*A)]
  MOTHERLIST[(A)
    *A();
    MARY [JANE]
    TOM [BETTY]
  ]
]
```

The invocation 462 MOTHER(JOHN) will not resolve directly. There is no definition 456 for JOHN( ) inside MOTHER so the invocation 462 will fail and the next alternative will be tried which tries to find the spouse of the father of JOHN. These are delayedinvocs and will be returned to replace the invocation 462 MOTHER(JOHN). If either the FATHER invocation 462 or the SPOUSE invocation 462 fails then the result will be NULL.

4.8. Process Expression as Uncertainty and Deferred Specification

Uncertainty is the essence of process expression. At every place of resolution in a process there is an uncertain specification to be resolved that could not be prespecified in the possibility expression 458. The question is which of several possible process activities will proceed. The possible activities can be prespecified and the question can be preformulated but the answer to the question cannot be prespecified. Which possible activity will actually proceed must be deferred until the time of resolution when the deferred specification is provided by the actuality expression 460. The actuality expression 460 determines which possible activity will proceed and with the uncertainty resolved the selected process activity can proceed.

The form of expression of the possibilities 458, the question and the answer must all correspond. The specification provided by the actuality expression 460 must effectively answer the question as posed by the possibility expression 458. If the question is posed in terms of molecular shape the answer must be delivered as a molecular shape. Answers in terms of voltage patterns must resolve questions posed in terms of voltage patterns. No matter what actual form of expression these elements assume the answer can be characterized in general as a formed name that selects a named possibility. The possibility expression 458 establishes the names of the possibilities and poses the question in terms of those names. The actuality expression 460 forms and delivers a name 466 that will answer the question posed by the possibility expression 458.

4.8.1 Uncertainty of Name Formation

Uncertainty of name formation is the first and most primitive uncertainty of process expression. The primary concern of a pure value expression is which value transform names will be formed by the asserted values of the freely associating variables. When variables are directly associated the question is still which value transform rule names will be formed by their asserted values.

While the name 464 that will form cannot be prespecified the place within the process expression where the name 464 is to come from can be prespecified. For pure value expressions 454 this is the particular value domain that the asserts result values that can form the name 464 in question. For variable association expressions 454 the name 464 is formed by the variables directly associated with the place of resolution. For directionalized variable association expressions 454 expressed in terms of interaction loci each interaction locus is a place of name formation and resolution within the expression 454. The input data name 464 of each interaction locus is formed by the result variables directly associated with its input variables.

These direct name 464 formation association relationships specifying where a formed name will come from can be prespecified and can be an integral part of the possibility expression 458. The expression of a name 464 formation association relationship might be a wire, a memory address, a gravity well, physical proximity, a name correspondence, value correspondence and so forth. Such name 464 formation association relationships can form large directly associated networks of places of name resolution.

In a string expression 454 an invocation 462 represents a place of input data name 464 formation. The input data name 464 is formed by the actualist of the invocation 462. Each part of the input data name 464 is represented by an actual in the actualist of the invocation 462. For an invocation 462 whose name 464 formation is deferred each actual of the actualist will be an association reference to some other place in the expression where its part of the deferred data name will come from. The association reference may be a nested syntax structure or a name correspondence relationship, as shown in Table 116.

TABLE 116

```
CARRY<OR($CARRY1,$CARRY2)>
HALFADD(*C,HALFADD(*X,*Y <CARRY1>)
<CARRY2>)
```

In the above example phrase, shown in Table 116, the two actuals of the nested inner HALFADD invocation 462 and the first actual of the outer HALFADD invocation 462 are formalrefs associated by name correspondence to formalnames in the formalist of the enclosing definition 456. The second actual of the outer HALFADD invocation 462 is associated by nested syntax structure to the replacement result of the invocation 462 of the nested HALFADD invocation 462. The two actuals in the OR invocation 462 in the first line are resultrefs associated by name correspondence to resultlinks in each of the HALFADD invocations 462. Every element of the phrase is a deferred specification and is an association reference to some other place in the expression 458.

As long as input data name 464 formation dependency relationships can be fully predetermined they can be expressed as association relationships in a single phrase.

4.8.2 Uncertainty of Where a Name Will Come From

At some point in the specification of a phrase a new kind of uncertainty arises. For a particular group of input data name 464 parts (actuals) it is not only not possible to predetermine what name will be formed but it is also not possible to predetermine where these input data name 464 parts will come from.

This uncertainty arises from several circumstances. An inherent source of uncertainty of association arises when the size of a formed data name 464 cannot be predetermined. An integer for instance is composed of an arbitrary number of digits. A vector is composed of an arbitrary number of integers. And so on. It cannot in general be predetermined how many of the smaller input data names 464 (digits) the larger input data names 464 (integers) are composed of. It cannot therefore be predetermined how many smaller names 464 must be resolved to resolve the larger name 464. For instance, in resolving an integer addition, the number of digit addition input data names 464 formed to be resolved by digit addition cannot be predetermined. All the places of digit addition input data name 464 formation in the process expression cannot be predetermined.

Another source of uncertainty can arise because a generally useful phrase has been expressed that is applicable in many contexts and must be globally and arbitrarily available. A generally formed input data name 464 might, for instance, form in the context of another uncertainly formed input data name 464. So it cannot in general be predetermined where commonly formed input data names 464 will be formed during resolution of a process.

Another source of uncertainty in a process expression is explicit conditionality (see Table 117).

If it cannot be predetermined where data name 464 parts of a particular phrase will come from, then the specification of the association relationships themselves must be deferred.

TABL1 117

```
COUT<AND(*S,*T)>
OR(AND(NOT(*S),*T),AND(*S,NOT(*T))),
```

In the above phrase, shown in Table 117, from the full adder example all the direct association relationships within this phrase are syntactic nesting relationships. The NOT invocations 462 are nested in the AND invocations 462 and the AND invocations 462 are nested in the OR invocation 462. *X, *Y, *C, *S and *T in the above phrase represent input data name 464 parts that cannot be directly associated within the phrase and whose source within the process expression cannot be predetermined. These will be called orphan name parts.

These orphan data name parts of a single phrase have one property in common. All of the data name 464 parts must be present simultaneously to form the input data name 464 for the invocation 462 to resolve. If one orphan data name part is not present the input data name 464 is not fully formed and the invocation 462 is not fully formed. So it must be insured that all the orphan name parts are present before resolution proceeds. Since all of the data name 464 parts must be available simultaneously they can all be treated as a single input data name 464 to be formed. The orphan data name parts of the various input data names 464 inside the phrase can be gathered together and deferred as a single composite input data name 464 for the phrase as a whole which must be completely formed before being presented to the phrase and resolved. A composite input data name 464 can be formed anywhere in the process expression. There must be a means of associating a name 464 formed anywhere in the process expression with the phrase that will receive and resolve the name 464.

The phrase itself must be encapsulated as a single place in the process expression. At each place of name 464 formation the name 464 must be assembled and it must be determined when the name 464 is completed and can be resolved. The formed name 464 is associated with the phrase by associating the place of name 464 formation with the place of the phrase in the process expression.

Since it cannot be predetermined where a name 464 will be formed in the process expression this association relationship cannot be expressed by a syntactic relationship such as nesting but can only be expressed by a place name correspondence relationship between the two places. The place of the phrase must be named and the place of name 464 formation must be syntactically associated with a place name which corresponds to the place name of the phrase. The assembled name 464 must then be associated with the resolving phrase such that each part of the formed name 464 corresponds to the correct orphan name part of the composed input data name 464 of the phrase.

The encapsulation of a phrase and the deferred formation of a composite input data name 464 will be called a reference boundary.

4.8.3 The Reference Boundary

For the string expression 454 the reference boundary consists of two parts; the definition 456 and the invocation 462. The definition 456 provides the encapsulation of the phrase and consolidation of the orphan data name parts into a single composite input data name 464 at one place in the process expression. The invocation 462 provides the place of formation and validation of the composite input data name 464 and associates it with the definition 456 containing the resolving phrase.

A definition 456 collects the orphan name parts of the phrase in the formalist of the definition 456. The formalist becomes the single composite data name 464 to be formed. The orphan name parts in the phrase are represented by formalrefs which are associated by name correspondence to the formalnames of the formalist. The formalrefs representing the orphan name parts in the phrase of the following example definition 456 are *X, *Y, and *C. They correspond to the names (X, Y, C) in the formal list of the definition 456. The defname is the name of the place of the definition 456 that encapsulates the phrase, as shown in Table 118.

TABLE 118

FULLADD[X,Y,C <CARRY>)
CARRY<OR($CARRY1,$CARRY2)>
HALFADD(*C,HALFADD(*X,*Y <CARRY1>)

TABLE 118-continued

<CARRY2>)

The deferred composite input data name 464 composed of the orphan name parts of the phrase becomes a single input data name 464 to the definition 456. Just like any other input data name 464 in the process expression it must be fully formed before being resolved by the definition 456.

Composite input data name 464 formation is represented by invocations 462. The actualist of the invocation 462 is the composite input data name 464 to be formed and the invocname of the invocation 462 is the association to the place of the correspondingly named definition 456 that encapsulates the phrase that will resolve the formed composite input data name 464.

The association relationship between the invocation 462 and the definition 456 can be deferred when the formation of the invocname is deferred or when the formation of the entire invocation 462 is deferred. The invocname of the invocation 462 is deferred just like any other deferred specification in the expression 454 by association relationships with the place in the expression 454 where the name 464 will come from. When the deferred invocname is delivered, the invocation 462 can be associated with the correspondingly named definition 456. Until the deferred invocname is delivered it cannot be determined which definition 456 the invocation 462 will associate with.

An example of a deferred invocation 462 name formation is the OR definition 456 from the example, as shown in Table 119.

TABLE 119

OR[(A,B) *A*B() 00[0] 01[1] 10[1] 11[1]]

The formalrefs *A*B will form the invocname of the invocation 462 which can then be associated to one of the terminal definitions 456 inside the OR definition 456.

The formation of the entire invocation 462 is deferred in the cases of indefinite generative iteration as in the INTEGERADD and VECTORADD examples. To add two integers of unknown length for instance it is known that FULLADD must invoked but it is not known how many times FULLADD must be invoked. Complete invocations 462 must be formed and associated as they are needed during resolution.

4.8.4 The Hierarchical Structure of Compound Uncertainty

This reference boundary created by the definition 456 establishes a hierarchical relationship between the place of reference of the definition 456 and the places of reference of the orphan data names in the phrase. The orphan data names' places of reference are isolated within and nested within the definition's 456 place of reference within the process expression.

The encapsulation by the definition 456 is an extended deference of name formation specification. The definition 456 boundary means that the deferred orphan names have to travel a longer association pathway to get to their place of effective specification. They have to associate through the invocation 462 actualist, through the definition 456 formalist to the formalrefs in the expression. As definitions 456 encapsulate definitions 456 building hierarchical levels of reference these association pathways get longer and longer.

The places of the most primitive deferred input data name 464 formations leave specification holes in the expression 458. Extended association relationships through levels of name composition by definition encapsulation grows each deferred specification into a long pathway of deference. Each primitive deferred specification in the ultimately presented actuality expression 460 which is just a structure of deferred specifications must travel along its proper pathway of deference and complete its assigned specification. The possibility expression 458 of a process is uncertainties on top of uncertainties expressed by a compound structure of deferred specifications.

The deferred specifications get composed through stages of definition encapsulation until all the deferred specification of the entire process expression are composed into one single monstrously complicated composite input data name 464 constituting the form of the actuality expression 460 for the process. The structure of the actuality expression 460 must correspond to the structure of the association pathways of deferred specifications in the possibility expression 458. Each individual deferred specification of the actuality expression 460 must get on its proper path and proceed through all the pathway branchings to its proper place in the possibility expression 458 so that all of the possible activity of the process is specified and occurs.

The fitting of the specifications of the actuality expression 460 into the proper places of deferred specification in the possibility expression 458 is a matter of decomposing the actuality expression 460 in the reverse order of its composition as deferred specifications.

Almost all of the effort of resolution is directed to decomposing the actuality expression 460 to its individual specifications and delivering each specification to its place of original deferment in the possibility expression 458. When each specification arrives at its place of deferment a small piece of process activity is fully specified and can be carried out. Quantitatively these small processes are a small part of the overall resolution effort and qualitatively they are quite trivial. Complexity and its costs resides in decomposing the compound structure of the input data name 464 determined by the structure of the deferred specifications. An example in a more familiar form may illustrate the universality of this point more clearly. The example is an integer matrix addition routine in a typical sequential language expression form on a typical sequential computer (see Table 120). MATRIX1 is added to MATRIX2 to produce MATRIX3 all of which are N by M.

TABLE 120

PROCEDURE MATRIXADD (MATRIX1, MATRIX2, MATRIX3, N, M)
BEGIN
  FOR I = 1 TO N
  FOR J = 1 TO M
    MATRIX3(I, J) = MATRIX1(I, J) + MATRIX2(I,J)
  ENFOR
  ENDFOR
END

The actuality expression 460 corresponding to this process expression is three identically sized matrices and the scalar values N and M. The uncertain deferred specifications in this process are the sizes of the matrices and the actual values of the matrices. In this example, the data is initially guided along its pathways indirectly by manipulating addresses representing the data but the effect is the same as if the data were actually moving.

The outer loop of the process decomposes each matrix to its component vectors, associates the corresponding vectors of each matrix and presents them to the inner loop. The inner loop decomposes each vector to integers, associates the corresponding integers of each vector and presents them to the integer add function.

The integer add function is expressed by a sequence of instructions. At this point, data elements move directly through the expression 454 instead of indirectly by manipulating addresses. The sequence of instructions first moves the corresponding integers from memory to associate them directly to the ALU. The expression for integer addition itself resides in the hardware in the form of a logic circuit in the ALU. This logic circuit first decomposes each integer to digits, associates the corresponding digits together by direct electrical connection and presents them to the definition 456 for digit addition.

Assuming a binary representation of the integers the associated digits are presented to a full adder circuit. The full adder circuit is a combinational logic circuit that implements the eight transform rules of the truth table for binary digit addition. The full adder circuit is expressed in terms of associated logic gates. Each logic gate is a terminal definition 456 that transforms its input data name 464 directly with no further decomposition. The association structure of logic gates combine their result bits to compose the result integer of the integer addition definition.

The further instructions of the integer add function then move the result from the ALU to its correct memory location to compose the result vector for vector addition. This continues bit by bit, integer by integer and vector by vector until both matrices are added.

The characterization of the process resolution was uniform and consistent even though three totally different expression environments were involved. The software procedure, the instructions that collect the integers and present them to the ALU and the logic circuits of the ALU. Each very different expression 454 was doing exactly the same thing. Each was managing the decomposition of its input data 464 structure and guiding the decomposed data elements through the process expression 458 to the point where the unpredeterminable deferred input names 464 were presented to terminal definitions 456 in the correct progression. It is all just bookkeeping and traffic management to get the correct progression of names formed for terminal definitions 456 that will realize the process as a progression of primitive process activities.

The whole point is to get the right bits to the right logic gates in the right progression. Each bit of MATRIX1 and MATRIX2 are properly associated with the correct progression of logic gates and bit by bit MATRIX3 is created with all bits in their correct relationships. It is this progression of invocations 462 of terminal definitions 456 that performs the transformation activity of the process. The rest is just bookkeeping.

The invocations 462 of terminal definitions 456 form the leaves of a resolution tree built of trunks, branches and twigs forming association pathways from the input data 464 structure to the terminal definitions 456.

4.8.5 Arbitrary Reference Boundaries

Reference boundaries are necessary in an expression 458 to accommodate uncertainties such as the unprespecifiable number of vectors in a matrix or the unprespecifiable number of integers in a vector but a reference boundary can also arise from arbitrary choice. For instance, in the FULLADD example the definition 456 of HALFADD is arbitrary and unnecessary. The process can be expressed without that particular reference boundary, as shown in Table 121.

TABLE 121

FULLADD definition with nested HALFADD definition

```
FULLADD[(X,Y,C <CARRY>)
  CARRY<OR($CARRY1,$CARRY2)>
  HALFADD(*C,HALFADD(*X,*Y <CARRY1>)
  <CARRY2>)
]
```

FULLADD definition without nested definition

```
FULADD[(X,Y,C, <CARRY>)
  FIRSTSUM<OR(AND(NOT(*X),*Y),AND(*X,NOT(*Y)))>
  CARRY<OR(AND(*X,*Y),AND(*C,$FIRSTSUM)>
  OR(AND(NOT(*C),$FIRSTSUM),AND(*C,NOT
  ($FIRSTSUM)))
]
```

In the first example, the HALFADD definition 456 provided distribution of the intermediate firstsum result through its association list and created a hierarchical level of definition 456. The single expression example above uses the result reference to distribute the intermediate sum within a single expression. Whichever expression is used is purely a matter of choice. The definition 456 HALFADD is not necessary because there is nothing uncertain about S and T in terms of X and Y and C inside the definition 456 of FULLADD. HALFADD can only be referenced from inside FULLADD. S and T can be expressed in terms of X, Y and C. The place of all the possible invocations 462 of HALFADD in relation to the definition 456 of HALFADD are predetermined. There is no uncertainty in terms of the definition 456 about where HALFADD will be invoked from or how many times it will be invoked. The HALFADD definition 456 is therefore not necessary but is an arbitrary embellishment of the expression 458. An arbitrary definition 456 might be defined simply to make the expression 458 more readable or to make it conform to some other form of expression 458.

The next level of definition 456 FULLADD is not arbitrary but represents a genuinely uncertain aspect of the expression 458. How the name for each invocation 462 of FULLADD will be formed cannot be predetermined because it is uncertain how many times FULLADD will be invoked. Large numbers are expressed as compositions of digits and the number of digits involved cannot in general be prespecified. The size of nun%hers can be fixed but that is not a general solution. The only general solution is to be able to invoke FULLADD an arbitrary number of times from arbitrary places in the expression 458. This uncertainty of reference requires that FULLADD be a reference boundary.

4.9 Referential Expression

A string expression 458 is different from other expression forms in that it only has to specify its expression. It 458 does not have to autonomously perform the expression. It 458 is thereby a purely referential form of process expression. It 458 does not provide its own resolution resources. It 458 must rely on the resources of an external agent of activity such as a generally configurable process or a direct interpreter 452.

Because a string expression 458 only has to specify and not autonomously perform it can indulge in a certain economy of expression. The string expression itself need not provide a distinct instantiation of a definition 456 for every invocation 462 that forms an input data name 464 for it 458. It need only express one instance of the definition 456 which the activity agent can use over and over sequentially or can replicate and use concurrently. This is in contrast to a DAP expression that must provide an instantiation of an interaction locus for each formed name 464 in the expression 458.

The string expression 458 is only a partial specification of the process. The ultimate structure of each process is constructed during resolution as definitions 456 are used or replicated to resolve formed names 464. The ultimate structure of a resolved process grows out of the relationship between the possibility expression 458 and the actuality expression 460. Because definitions 456 from a possibility expression 458 can be copied and used as required a particular possibility expression 458 can accommodate the resolution of actuality expressions 460 possessing a great deal of uncertainty of structure. The resolving process grows piece by piece in the active string 454 as definitions 456 are used or copied from the possibility expression 458 in accordance with the resolution needs of the actuality expression 460.

For instance, a single expression 458 of matrix addition can accommodate matrices of any size. Perhaps it can also accommodate integer numbers, real numbers or complex numbers. Within limits the possibility expression 458 will adjust to fit the uncertainties of the input data 464 structure by growing a matching structure to engulf and transform the input data 464 structure. A particular process expression can resolve to very different progressions of terminal invocations 462 depending on the deferred specifications supplied by the actuality expression 460.

4.10 Summary

It was established in section 3 that the relationships of process expression could be expressed as relationships among names in the same form of expression as deferred specifications. It was also established that any arbitrary set of names and arbitrary relationships among those names could be mapped into the generally configurable process. So any convenient external form of expression could be used to specify a process in terms of association relationships among names and that expression could be resolved by mapping it into a generally configurable process. The convenient external expression that was chosen to explore is a favorite of humans, i.e., the character string. One of many possible character string forms of process expression was defined and presented.

A string expression is just one form of process expression capable of expressing deferred specifications through hierarchical stages of compound uncertainty so that complex questions can be posed about complex relationships. The question at the bottom of every string expression is which variables are going to be associated bearing which values that form input data names 464 to invoke which value transform rules. It is all still just variables, values, value transform rules and variable association rules.

The input data structure (actuality expression 460, deferred specifications through multiple levels of uncertainty) is just a complex, compound structure of variable associations. This structure has to be sorted out to the point where value interactions can occur and then composed again to the result structure.

A process may be performing a profound mathematical computation or a profound nonmathematical procedure such as cell metabolism but from the point of view of expression it is just sorting out input data structures to the point where primitive data elements interact to produce primitive result data elements and reorganizing these into the final result data structure. The central question of computer science must be what is the essential nature of process expression itself regardless of what kind of process any expression might be performing.

Although the present invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the present invention as claimed.

What is claimed is:

1. A method of process expression and resolution, comprising the steps of:
   (a) providing a first language structure comprising a possibility expression having at least one definition which is inherently and generally concurrent;
   (b) providing a second language structure comprising an actuality expression including a fully formed input data name to be resolved;
   (c) providing a third language structure comprising an active expression initially having at least one invocation, the invocation comprising an association with a particular definition and the fully formed input data name of the actuality expression; and
   (d) resolving invocations in the active expression with fully formed input data names in relation to their associated definition to produce at least one or both of the following: (1) an invocation with a fully formed input data name and (2) a result data name.

2. The method of claim 1 wherein the first, the second and the third language structures are derived from a set of production rules selected from the group consisting essentially of: a set of metasymbols, a set of terminals and a set of nonterminals.

3. The method of claim 2 wherein the set of metasymbols comprise metasymbols selected from the group consisting essentially of:
   (a) = term to structure equivalence;
   (b) | OR;
   (c) * zero or more (post superscript);
   (d) + one or more (post superscript);
   (e) *+ zero or one (post superscript); and
   (f) − followed by.

4. The method of claim 2 wherein the set of terminals comprise a set of syntax symbols and a set of at least two value symbols disjoint from the set of syntax symbols.

5. The method of claim 4 wherein the set of syntax symbols comprise syntax symbols selected from the group consisting essentially of: '(', ')', '[', ']', '{', '}', '<', '>', ',', ';', '*', '@', '!', '\', '/', '?', and '#'.

6. The method of claim 2 wherein the set of nonterminals comprise nonterminals selected from the group consisting essentially of: phrase, clause, redefinition, resultant, invocation, delayedinvoc, invocname, resultlist, resultlink, actualist, actual, resultref, definition, nonreplicable, body, formalist, namelist, object, objectstruct, formalref, defname, formalname, linkname, and narrative.

7. The method of claim 2 wherein each production rule comprises either (1) a nonterminal followed by a term to structure equivalence (=) followed by a terminal or a nonterminal, (2) a nonterminal followed by a term to structure equivalence (=) followed by a plurality of terminals delimited by metasymbols, (3) a nonterminal followed by a term to structure equivalence (=) followed by a plurality of nonterminals delimited by metasymbols, or (4) a nonterminal followed by a term to structure equivalence (=) followed by at least one terminal and at least one nonterminal delimited by metasymbols.

8. The method of claim 7 wherein:
   (a) the set of metasymbols comprise metasymbols selected from the group consisting essentially of:
      (i) = term to structure equivalence;
      (ii) | OR;
      (iii) * zero or more (post superscript);
      (iv) + one or more (post superscript);
      (v) *+ zero or one (post superscript); and
      (vi) − followed by;
   (b) the set of terminals comprise:
      (i) a set of syntax symbols comprising syntax symbols selected from the group consisting essentially of: '(', ')', '[', ']', '{', '}', '<', '>', ',', ';', '*', '@', '!', '\', '/', '?', and '#'; and
      (ii) a set of at least two value symbols disjoint from the set of syntax symbols; and
   (c) the set of nonterminals comprise nonterminals selected from the group consisting essentially of: value, phrase, clause, redefinition, resultant, invocation, delayedinvoc, invocname, resultlist, resultlink, actualist, actual, resultref, definition, nonreplicable, body, formalist, namelist, object, objectstruct, formalref, defname, formalname, linkname, and narrative.

9. The method claim 8 wherein the first, the second and the third language structures are derived from a set of production rules selected from the group consisting essentially of:
   (a) value=at least two value symbols
   (b) phrase=clause | phrase; clause | phrase?clause
   (c) clause=redefinition*-resultant *-invocation*+-object*
   (d) redefinition=invocname@(phrase)
   (e) resultant=linkname<phrase>
   (f) invocation=invocname (actualist-resultlist)
   (g) delayedinvoc=invocname#(actualist-resultlist)
   (h) invocname=invocation | defname-formalref* | defname*+-formalref+
   (i) resultlist=resultlink*
   (j) resultlink= <linkname>
   (k) actualist=actual | actualist,actual
   (l) actual=invocation*+-object*-resultref*+
   (m) resultref=$linkname
   (n) definition=defname [(formalist-resultlist)body]
   (o) nonreplicable=defname@[(formalist-resultlist)-body]
   (p) body=phrase | phrase;definition+
   (q) formalist=namelist | namelist,! | !, namelist
   (r) namelist=formalname | namelist, formalname
   (s) object=value* | value*-formalref+ | objectstruct (t) objectstruct={object}|{phrase}|{objectstruct*}
(u) formalref=*formalname|*!
(v) defname=value+
(w) formalname=value+
(x) linkname=value+
(y) narrative= \ any character string /.

10. The method of claim 1 wherein the step of resolving comprises simultaneously resolving multiple invocations in the active expression until all of the invocations have been resolved and a fully formed result data name is left in the active expression.

11. A process expression and resolution system, comprising:
   (a) first language structure comprising a possibility expression having at least one definition which is inherently and generally concurrent;
   (b) second language structure comprising an actuality expression including a fully formed input data name to be resolved;
   (c) third language structure comprising an active expression initially having at least one invocation, the invocation comprising an association with a particular definition and the fully formed input data name of the actuality expression; and
   (d) resolution means for resolving invocations in the active expression with fully formed input data names in relation to their associated definition to produce at least one or both of the following: (1) an invocation with a fully formed input data name and (2) a result data name.

12. The process expression and resolution system of claim 11 wherein the first, the second and the third language structures are derived from a set of production rules selected from the group consisting essentially of: a set of metasymbols, a set of terminals and a set of nonterminals.

13. The process expression and resolution system of claim 12 wherein the set of metasymbols comprise metasymbols selected from the group consisting essentially of:
   (a) = term to structure equivalence;
   (b) | OR;
   (c) * zero or more (post superscript);
   (d) + one or more (post superscript);
   (e) *+ zero or one (post superscript); and
   (f) − followed by.

14. The process expression and resolution system of claim 12 wherein the set of terminals comprise a set of syntax symbols and a set of at least two value symbols disjoint from the set of syntax symbols.

15. The process expression and resolution system of claim 14 wherein the set of syntax symbols comprise syntax symbols selected from the group consisting essentially of: '(', ')', '[', ']', '{', '}', '<', '>', ',', ';', '*', '@', '!', '\', '/', '?', and '#'.

16. The process expression and resolution system of claim 12 wherein the set of nonterminals comprise nonterminals selected from the group consisting essentially of:
   phrase, clause, redefinition, resultant, invocation, delayedinvoc, invocname, resultlist, resultlink, actualist, actual, resultref, definition, nonreplicable, body, formalist, namelist, object, objectstruct, formalref, defname, formalname, linkname, and narrative.

17. The process expression and resolution system of claim 12 wherein each production rule comprises either (1) a nonterminal followed by a term to structure equivalence (=) followed by a terminal or a nonterminal, (2) a nonterminal followed by a term to structure equivalence (=) followed by a plurality of terminals delimited by metasymbols, (3) a nonterminal followed by a term to structure equivalence (=) followed by a plurality of nonterminals delimited by metasymbols, or (4) a nonterminal followed by a term to structure equivalence (=) followed by at least one terminal and at least one nonterminal delimited by metasymbols.

18. The process expression and resolution system of claim 17 wherein:
   (a) the set of metasymbols comprise metasymbols selected from the group consisting essentially of:
      (i) = term to structure equivalence;
      (ii) | OR;
      (iii) * zero or more (post superscript);
      (iv) + one or more (post superscript);
      (v) *+ zero or one (post superscript); and
      (vi) − followed by;
   (b) the set of terminals comprise:
      (i) a set of syntax symbols comprising syntax symbols selected from the group consisting essentially of: '(', ')', '[', ']', '{', '}', '<', '>', ',', ';', '*', '@', '!', '\', '/', '?', and '#'; and
      (ii) a set of at least two value symbols disjoint from the set of syntax symbols; and
   (c) the set of nonterminals comprise nonterminals selected from the group consisting essentially of:
      value, phrase, clause, redefinition, resultant, invocation, delayedinvoc, invocname, resultlist, resultlink, actualist, actual, resultref, definition, nonreplicable, body, formalist, namelist, object, objectstruct, formalref, defname, formalname, linkname, and narrative.

19. The process expression and resolution system of claim 18 wherein the first, the second and the third language structures are derived from a set of production rules selected from the group consisting essentially of:
   (a) value=at least two value symbols
   (b) phrase=clause|phrase;clause|phrase?clause
   (c) clause=redefinition*-resultant*-invocation*+-object*
   (d) redefinition=invocname@(phrase)
   (e) resultant=linkname<phrase>
   (f) invocation=invocname(actualist-resultlist)
   (g) delayedinvoc=invocname#(actualist-resultlist)
   (h) invocname=invocation|defname-formalref*|defname*+-formalref+
   (i) resultlist=result link*
   (j) resultlink= <linkname>
   (k) actualist=actual|actualist,actual
   (l) actual=invocation*+-object *-resultref*+
   (m) resultref=$linkname
   (n) definition=defname[(formalist-resultlist)body]
   (o) nonreplicable=defname@[(formalist-resultlist)-body]
   (p) body=phrase|phrase;definition+
   (q) formalist=namelist|namelist,!|!,namelist
   (r) namelist=formalname|namelist,formalname
   (s) object=value*|value*-formalref+|objectstruct
   (t) objectstruct={object}|{phrase}|{objectstruct*}
   (u) formalref=*formalname|*!
   (v) defname=value+
   (w) formalname=value+
   (x) linkname=value+
   (y) narrative= \ any character string /.

20. The process expression and resolution system of claim 11 wherein the resolution means comprises means for simultaneously resolving multiple invocations in the active expression until all of the invocations have been resolved and a fully formed result data name is left in the active expression.

* * * * *